US010952548B2

(12) United States Patent
Pollpeter et al.

(10) Patent No.: US 10,952,548 B2
(45) Date of Patent: Mar. 23, 2021

(54) ILLUMINATED MERCHANDISER, RETROFIT KIT AND RELATED METHODS

(71) Applicant: Retail Space Solutions LLC, Milwaukee, WI (US)

(72) Inventors: Eric Jeffery Pollpeter, Cedarburg, WI (US); Matthew Alan Wills, Grafton, WI (US); Craig Alan Fluegge, Menomonee Falls, WI (US); Julia Padvoiskis, Milwaukee, WI (US)

(73) Assignee: Retail Space Solutions LLC, Milwaukee, WI (US)

( * ) Notice: Subject to any disclaimer, the term of this patent is extended or adjusted under 35 U.S.C. 154(b) by 345 days.

(21) Appl. No.: 15/787,509

(22) Filed: Oct. 18, 2017

(65) Prior Publication Data

US 2018/0103775 A1 Apr. 19, 2018

Related U.S. Application Data

(60) Provisional application No. 62/409,845, filed on Oct. 18, 2016.

(51) Int. Cl.
*A47F 3/00* (2006.01)
*F21S 4/28* (2016.01)
(Continued)

(52) U.S. Cl.
CPC .............. *A47F 3/001* (2013.01); *A47F 1/126* (2013.01); *F21S 4/28* (2016.01); *F21V 17/108* (2013.01);
(Continued)

(58) Field of Classification Search
CPC .......... A47F 11/10; A47F 3/001; A47F 1/126; A47F 5/0093; A47F 5/0043;
(Continued)

(56) References Cited

U.S. PATENT DOCUMENTS 2,510,944 A   6/1950   Auerbach
2,598,862 A   6/1952   Tonn
(Continued)

FOREIGN PATENT DOCUMENTS

CA   2781515 A1   12/2012
CN   2781936 Y    5/2006
(Continued)

OTHER PUBLICATIONS

Fixtures Close Up, Pusher Paddle Message Rant, Jul. 28, 2010, 14 pp.

(Continued)

*Primary Examiner* — Rajarshi Chakraborty
*Assistant Examiner* — Fatima N Farokhrooz
(74) *Attorney, Agent, or Firm* — Andrus Intellectual Property Law, LLP

(57) ABSTRACT

A product display merchandiser comprising a base configured to be coupled to a shelving unit, a tray defined by at least one sidewall, wherein the tray is movable relative to the base, a lens positioned at a front end of the tray, and a lighting element configured to illuminate the lens. A retrofitting system comprising a light pipe and a body for connecting the light pipe to a merchandiser.

25 Claims, 42 Drawing Sheets

(51) Int. Cl.
*A47F 1/12* (2006.01)
*F21V 17/10* (2006.01)
*F21V 8/00* (2006.01)
F21S 4/26 (2016.01)
F21W 131/405 (2006.01)
F25D 27/00 (2006.01)
F21Y 113/10 (2016.01)
A47F 5/00 (2006.01)

(52) U.S. Cl.
CPC .... *G02B 6/0095* (2013.01); *A47B 2220/0077* (2013.01); *A47F 5/0093* (2013.01); *F21S 4/26* (2016.01); *F21W 2131/405* (2013.01); *F21Y 2113/10* (2016.08); *F25D 27/00* (2013.01)

(58) Field of Classification Search
CPC .. G02B 6/0095; F21S 4/28; F21S 4/26; F21V 17/108; A47B 2220/0077; F21Y 2113/10; F21W 2131/405; F25D 27/00
See application file for complete search history.

(56) References Cited

U.S. PATENT DOCUMENTS

| | | |
|---|---|---|
| 2,674,723 A | 4/1954 | Hurlbut |
| 2,755,452 A | 7/1956 | Rogie |
| 3,605,064 A | 9/1971 | Routh |
| 3,622,938 A | 11/1971 | Ito |
| 3,886,348 A | 5/1975 | Jonathan |
| 4,018,497 A | 4/1977 | Bulanchuk |
| 4,042,291 A | 8/1977 | Moriyama |
| 4,245,874 A | 1/1981 | Bishop |
| 4,502,103 A | 2/1985 | Collins |
| 4,688,869 A | 8/1987 | Kelly |
| 4,689,726 A | 8/1987 | Kretzschmar |
| 4,736,279 A | 4/1988 | Yamai |
| 4,747,025 A | 5/1988 | Barton |
| 4,799,133 A | 1/1989 | Strzalko |
| 4,886,462 A | 12/1989 | Fierro |
| 4,973,796 A | 11/1990 | Dougherty |
| 4,994,943 A | 2/1991 | Aspenwall |
| 4,996,636 A | 2/1991 | Lovett |
| 5,012,936 A | 5/1991 | Crum |
| 5,022,720 A | 6/1991 | Fevig |
| 5,034,861 A | 7/1991 | Sklenak |
| 5,072,343 A | 12/1991 | Buers |
| D330,090 S | 10/1992 | Walter |
| 5,154,641 A | 10/1992 | McLaughlin |
| 5,190,186 A | 3/1993 | Yablans |
| 5,205,638 A | 4/1993 | Squitieri |
| 5,334,037 A | 8/1994 | Gabrius |
| 5,348,485 A | 9/1994 | Briechle |
| 5,366,099 A | 11/1994 | Schmid |
| 5,390,802 A | 2/1995 | Pappagallo |
| 5,425,648 A | 6/1995 | Farham |
| 5,476,396 A | 12/1995 | De Castro |
| 5,542,552 A | 8/1996 | Yablans |
| 5,553,412 A | 9/1996 | Briechle |
| 5,605,237 A | 2/1997 | Richardson |
| 5,608,643 A | 3/1997 | Wichter |
| 5,639,258 A | 6/1997 | Clark |
| 5,649,363 A | 7/1997 | Rankin, VI |
| 5,665,304 A | 9/1997 | Heinen |
| 5,671,362 A | 9/1997 | Cowe |
| 5,685,664 A | 11/1997 | Parham |
| 5,690,415 A | 11/1997 | Krehl |
| 5,722,747 A | 3/1998 | Baron |
| 5,722,847 A | 3/1998 | Haag |
| 5,743,428 A | 4/1998 | Rankin, VI |
| 5,758,585 A | 6/1998 | Latchinian |
| 5,791,487 A | 8/1998 | Dixon |
| 5,816,696 A | 10/1998 | Beisler |
| 5,831,515 A | 11/1998 | Stewart |
| 5,839,588 A | 11/1998 | Hawkinson |
| 5,855,283 A | 1/1999 | Johnson |
| 5,881,910 A | 3/1999 | Rein |
| 5,894,933 A | 4/1999 | Crews |
| 5,902,034 A | 5/1999 | Santosuosso |
| 5,902,150 A | 5/1999 | Sigl |
| 5,915,824 A | 6/1999 | Straat |
| 5,924,790 A | 7/1999 | Ponton |
| 5,964,373 A | 10/1999 | Hucknall |
| 5,992,652 A | 11/1999 | Springs |
| 6,093,037 A | 7/2000 | Lin |
| 6,142,317 A | 11/2000 | Merl |
| 6,155,438 A | 12/2000 | Close |
| 6,179,434 B1 | 1/2001 | Saraiji |
| 6,181,299 B1 | 1/2001 | Frederick |
| 6,196,648 B1 | 3/2001 | Henriott |
| 6,231,205 B1 | 5/2001 | Slesinger |
| D445,615 S | 7/2001 | Burke |
| 6,254,247 B1 | 7/2001 | Carson |
| 6,259,965 B1 | 7/2001 | Steele |
| 6,269,285 B1 | 7/2001 | Mignault |
| 6,276,810 B1 | 8/2001 | Vosshenrich |
| 6,283,608 B1 | 9/2001 | Straat |
| 6,302,557 B1 | 10/2001 | Santosuosso |
| 6,325,523 B1 | 12/2001 | Santosuosso |
| 6,351,964 B1 | 3/2002 | Brancheau |
| 6,364,273 B1 | 4/2002 | Otema |
| 6,375,015 B1 | 4/2002 | Wingate |
| 6,382,431 B1 | 5/2002 | Burke |
| 6,430,467 B1 | 8/2002 | D Amelio |
| 6,443,317 B1 | 9/2002 | Brozak, Jr. |
| 6,464,089 B1 | 10/2002 | Rankin, VI |
| 6,484,891 B2 | 11/2002 | Burke |
| 6,502,012 B1 | 12/2002 | Nelson |
| 6,527,565 B1 | 3/2003 | Johns |
| 6,539,280 B1 | 3/2003 | Valiulis |
| 6,550,269 B2 | 4/2003 | Rudick |
| 6,558,017 B1 | 5/2003 | Saraiji |
| 6,561,617 B2 | 5/2003 | Silverbrook |
| 6,599,145 B2 | 7/2003 | Singh |
| 6,622,874 B1 | 9/2003 | Hawkinson |
| 6,671,578 B1 | 12/2003 | D Amelio |
| 6,684,126 B2 | 1/2004 | Omura |
| 6,735,498 B2 | 5/2004 | Hertz |
| 6,749,207 B2 | 6/2004 | Nadeau |
| D493,009 S | 7/2004 | Ken |
| 6,772,888 B2 | 8/2004 | Burke |
| 6,808,407 B1 | 10/2004 | Cannon |
| 6,827,463 B2 | 12/2004 | Chuang |
| 6,827,465 B2 | 12/2004 | Shemitz |
| 6,859,677 B2 | 2/2005 | Mitterholzer |
| 6,886,699 B2 | 5/2005 | Johnson |
| 6,918,679 B2 | 7/2005 | Wu |
| D521,286 S | 5/2006 | Colmenares |
| 7,036,947 B2 | 5/2006 | Chuang |
| 7,056,007 B2 | 6/2006 | Chiu |
| 7,066,342 B2 | 6/2006 | Baechle |
| 7,111,735 B2 | 9/2006 | Lowry |
| 7,121,675 B2 | 10/2006 | Ter-Hovhannisian |
| 7,137,517 B2 | 11/2006 | Lowry |
| 7,163,305 B2 | 1/2007 | Bienick |
| 7,175,034 B2 | 2/2007 | Nook |
| 7,184,857 B1 | 2/2007 | Hertz |
| 7,233,241 B2 | 6/2007 | Overhultz |
| 7,286,696 B2 | 10/2007 | Erickson |
| 7,289,656 B2 | 10/2007 | Engelbart |
| 7,293,663 B2 | 11/2007 | Lavery |
| 7,347,335 B2 | 3/2008 | Rankin, VI |
| 7,367,685 B2 | 5/2008 | Moll |
| 7,419,062 B2 | 9/2008 | Mason |
| 7,428,327 B2 | 9/2008 | Erickson |
| 7,434,951 B2 | 10/2008 | Bienick |
| 7,463,368 B2 | 12/2008 | Morden |
| 7,477,780 B2 | 1/2009 | Boncyk |
| 7,513,637 B2 | 4/2009 | Kelly |
| 7,529,597 B1 | 5/2009 | Hertz |
| 7,535,337 B2 | 5/2009 | Overhultz |
| 7,545,517 B2 | 6/2009 | Rueb |
| 7,551,765 B2 | 6/2009 | Thomas |
| 7,574,822 B1 | 8/2009 | Moore |
| 7,597,448 B1 | 10/2009 | Zarian |

(56) References Cited

U.S. PATENT DOCUMENTS

| | | |
|---|---|---|
| 7,597,462 B2 | 10/2009 | Misof |
| 7,600,887 B2 | 10/2009 | Sherman |
| 7,614,350 B2 | 11/2009 | Tuttle |
| 7,614,761 B2 | 11/2009 | Tanaka |
| 7,641,072 B1 | 1/2010 | Vlastakis |
| 7,664,305 B2 | 2/2010 | Erickson |
| 7,681,744 B2 | 3/2010 | Johnson |
| 7,689,460 B2 | 3/2010 | Natori |
| 7,693,757 B2 | 4/2010 | Zimmerman |
| 7,703,614 B2 | 4/2010 | Schneider |
| 7,726,831 B2 | 6/2010 | Shibusawa |
| 7,758,233 B2 | 7/2010 | Chang |
| 7,766,502 B2 | 8/2010 | Tress |
| 7,792,711 B2 | 9/2010 | Swafford |
| 7,794,132 B2 | 9/2010 | Cunius |
| 7,806,543 B2 | 10/2010 | Swofford |
| 7,823,734 B2 | 11/2010 | Hardy |
| 7,824,055 B2 | 11/2010 | Sherman |
| 7,824,056 B2 | 11/2010 | Madireddi |
| 7,824,057 B2 | 11/2010 | Shibusawa |
| 7,854,334 B2 | 12/2010 | Nagel |
| 7,871,176 B2 | 1/2011 | Kelly |
| 7,909,183 B2 | 3/2011 | Oh |
| 7,929,750 B2 | 4/2011 | Erickson |
| 7,940,181 B2 | 5/2011 | Ramachandra |
| 7,949,568 B2 | 5/2011 | Fano |
| 7,950,817 B2 | 5/2011 | Zulim |
| 7,954,979 B2 | 6/2011 | Sommers |
| 7,976,181 B2 | 7/2011 | Kelly |
| 8,002,181 B2 | 8/2011 | Ulrich |
| 8,002,441 B2 | 8/2011 | Barkdoll |
| 8,009,864 B2 | 8/2011 | Linaker |
| 8,047,657 B2 | 11/2011 | Ikeda |
| 8,066,398 B2 | 11/2011 | Hartman |
| 8,068,659 B2 | 11/2011 | Engelbart |
| 8,070,309 B2 | 12/2011 | Otsuki |
| 8,075,160 B1 | 12/2011 | Zarian |
| 8,083,078 B2 | 12/2011 | Omura |
| 8,113,678 B2 | 2/2012 | Babcock |
| 8,118,164 B2 | 2/2012 | Brown |
| 8,131,055 B2 | 3/2012 | Clarke |
| 8,136,956 B2 | 3/2012 | Oketani |
| 8,142,047 B2 | 3/2012 | Acampora |
| 8,164,274 B2 | 4/2012 | Pas |
| 8,172,096 B2 | 5/2012 | Van De Steen |
| 8,177,404 B2 | 5/2012 | Weng |
| 8,189,855 B2 | 5/2012 | Opalach |
| 8,190,289 B2 | 5/2012 | Lockwood |
| 8,190,497 B2 | 5/2012 | O'Dell |
| 8,210,367 B2 | 7/2012 | Nagel |
| 8,215,795 B2 | 7/2012 | Pichel |
| 8,224,720 B2 | 7/2012 | Cohen |
| 8,260,456 B2 | 9/2012 | Siegel |
| 8,292,095 B2 | 10/2012 | Howlett |
| 8,319,607 B2 | 11/2012 | Grimlund |
| 8,353,425 B2 | 1/2013 | Lockwood |
| 8,386,075 B2 | 2/2013 | Lockwood |
| 8,413,826 B2 | 4/2013 | Schneider |
| 8,413,843 B2 | 4/2013 | Vardaro |
| 8,419,205 B1 | 4/2013 | Schmuckle |
| 8,429,004 B2 | 4/2013 | Hamilton |
| 8,433,432 B2 | 4/2013 | Matsushita |
| 8,443,988 B2 | 5/2013 | Niederhuefner |
| 8,448,815 B2 | 5/2013 | Sholl |
| 8,453,851 B2 | 6/2013 | Ciesick |
| 8,490,424 B2 | 7/2013 | Roche |
| 8,506,109 B2 | 8/2013 | Stukenberg |
| 8,545,045 B2 | 10/2013 | Tress |
| 8,562,167 B1 | 10/2013 | Meier |
| 8,581,738 B2 | 11/2013 | Maggiore |
| 8,602,230 B2 | 12/2013 | Bergdoll |
| 8,607,997 B2 | 12/2013 | Bergdoll |
| 8,616,757 B2 | 12/2013 | Leadford |
| 8,630,924 B2 | 1/2014 | Groenevelt |
| 8,631,956 B2 | 1/2014 | Dowd |
| 8,646,935 B2 | 2/2014 | Karan |
| 8,651,296 B2 | 2/2014 | Beaty |
| 8,676,377 B2 | 3/2014 | Siegel |
| 8,678,232 B2 | 3/2014 | Mockus |
| 8,684,268 B2 | 4/2014 | Pas |
| 8,695,878 B2 | 4/2014 | Burnside |
| 8,720,702 B2 | 5/2014 | Nagel |
| 8,746,916 B2 | 6/2014 | Oketani |
| 8,800,811 B2 | 8/2014 | Sherretts |
| 8,812,378 B2 | 8/2014 | Swafford |
| 8,814,399 B2 | 8/2014 | Osawa |
| 8,820,545 B2 | 9/2014 | Kologe |
| 8,823,355 B2 | 9/2014 | Hachmann |
| 8,823,521 B2 | 9/2014 | Overhultz |
| 8,858,013 B2 | 10/2014 | Attey |
| 8,864,334 B2 | 10/2014 | Swafford, Jr. |
| 8,908,903 B2 | 12/2014 | Deng |
| 8,910,801 B2 | 12/2014 | Johnson |
| 8,925,745 B2 | 1/2015 | Theisen |
| 8,938,396 B2 | 1/2015 | Swafford |
| 8,939,779 B1 | 1/2015 | Lindblom |
| 8,941,495 B2 | 1/2015 | Wiese |
| 8,941,645 B2 | 1/2015 | Grimaud |
| 8,972,291 B2 | 3/2015 | Rimnac |
| 8,978,901 B2 | 3/2015 | Hogeback |
| 8,978,903 B2 | 3/2015 | Hardy |
| 8,978,904 B2 | 3/2015 | Hardy |
| 8,979,296 B2 | 3/2015 | Wiemer |
| 8,985,352 B2 | 3/2015 | Bergdoll |
| 8,998,005 B2 | 4/2015 | Hardy |
| 9,016,484 B2 | 4/2015 | Kologe |
| 9,022,637 B2 | 5/2015 | Meyer |
| 9,033,239 B2 | 5/2015 | Winkel |
| 9,038,833 B2 | 5/2015 | Ciesick |
| 9,044,089 B1 | 6/2015 | Sandhu |
| 9,044,105 B2 | 6/2015 | McClaughry |
| 9,052,994 B2 | 6/2015 | Lockwood |
| 9,057,513 B2 | 6/2015 | Lindblom |
| 9,070,261 B2 | 6/2015 | Hardy |
| 9,072,394 B2 | 7/2015 | Hardy |
| 9,091,587 B2 | 7/2015 | Kawamura |
| 9,101,230 B2 | 8/2015 | Sosso |
| 9,107,497 B1 | 8/2015 | Al-Habsi |
| 9,107,515 B2 | 8/2015 | Hardy |
| 9,119,488 B2 | 9/2015 | Lockwood |
| 9,121,583 B2 | 9/2015 | Takeuchi |
| 9,129,494 B2 | 9/2015 | Valiulis |
| 9,131,787 B2 | 9/2015 | Berglund |
| 9,138,075 B2 | 9/2015 | Hardy |
| 9,138,076 B2 | 9/2015 | Hardy |
| 9,149,130 B2 | 10/2015 | Yuen |
| 9,149,132 B2 | 10/2015 | Hardy |
| 9,167,914 B2 | 10/2015 | Rankin, VI |
| 9,179,788 B2 | 11/2015 | Hardy |
| 9,185,999 B2 | 11/2015 | Hardy |
| 9,188,291 B2 | 11/2015 | Cassidy |
| 9,204,736 B2 | 12/2015 | Lindblom |
| 9,222,645 B2 | 12/2015 | Breslow |
| 9,228,735 B2 | 1/2016 | Liu |
| 9,239,136 B1 | 1/2016 | Petersen |
| 9,254,049 B2 | 2/2016 | Nagel |
| 9,279,544 B1 | 3/2016 | Dankelmann |
| 9,364,100 B2 | 6/2016 | Browning |
| 9,384,684 B2 | 7/2016 | Theisen |
| 9,404,645 B1 | 8/2016 | Feng |
| 9,424,446 B2 | 8/2016 | Baarman |
| 9,456,704 B2 | 10/2016 | Bhargava |
| 9,483,896 B2 | 11/2016 | Lockwood |
| 9,509,110 B1 | 11/2016 | Buck |
| 9,691,308 B2 | 6/2017 | Meyer |
| 9,775,447 B2 | 10/2017 | Wiemer |
| 9,829,178 B2 | 11/2017 | Breslow |
| 9,986,852 B2 | 6/2018 | Chenoweth |
| 2002/0072323 A1 | 6/2002 | Hakemann |
| 2002/0146282 A1 | 10/2002 | Wilkes |
| 2002/0147597 A1 | 10/2002 | Connors |
| 2002/0171335 A1 | 11/2002 | Held |
| 2004/0050811 A1 | 3/2004 | Leahy |
| 2004/0073334 A1 | 4/2004 | Terranova |

(56) References Cited

U.S. PATENT DOCUMENTS

| | | |
|---|---|---|
| 2004/0117243 A1 | 6/2004 | Chepil |
| 2004/0208372 A1 | 10/2004 | Boncyk |
| 2005/0040123 A1 | 2/2005 | Ali |
| 2005/0171854 A1 | 8/2005 | Lyon |
| 2005/0173605 A1 | 8/2005 | Villeneuve |
| 2005/0254262 A1 | 11/2005 | Chiu |
| 2005/0279722 A1 | 12/2005 | Ali |
| 2006/0067089 A1 | 3/2006 | Hocquard |
| 2006/0071774 A1 | 4/2006 | Brown |
| 2006/0097875 A1 | 5/2006 | Ott |
| 2006/0207778 A1 | 9/2006 | Walter |
| 2007/0022644 A1 | 2/2007 | Lynch |
| 2007/0042614 A1 | 2/2007 | Marmaropoulos |
| 2007/0273513 A1 | 11/2007 | White |
| 2007/0290585 A1 | 12/2007 | Moeller |
| 2008/0055914 A1 | 3/2008 | O'Rourke |
| 2008/0077510 A1 | 3/2008 | Dielemans |
| 2008/0083353 A1 | 4/2008 | Tuttle |
| 2008/0121146 A1 | 5/2008 | Burns |
| 2008/0144934 A1 | 6/2008 | Raynaud |
| 2008/0151535 A1 | 6/2008 | De Castris |
| 2008/0277361 A1 | 11/2008 | Primiano |
| 2008/0278932 A1 | 11/2008 | Tress |
| 2008/0306787 A1 | 12/2008 | Hamilton |
| 2009/0037244 A1 | 2/2009 | Pemberton |
| 2009/0039040 A1 | 2/2009 | Johnson |
| 2009/0223916 A1 | 9/2009 | Kahl |
| 2009/0279295 A1 | 11/2009 | Van Der Poel |
| 2010/0087953 A1 | 4/2010 | Garson |
| 2010/0089846 A1 | 4/2010 | Navarro Ruiz |
| 2010/0102685 A1 | 4/2010 | Ward |
| 2010/0103701 A1 | 4/2010 | Bartlett |
| 2010/0195317 A1 | 8/2010 | Oketani |
| 2010/0201522 A1 | 8/2010 | White |
| 2011/0044030 A1 | 2/2011 | Pichel |
| 2011/0203148 A1 | 8/2011 | Li |
| 2011/0203496 A1 | 8/2011 | Garneau |
| 2011/0204009 A1 | 8/2011 | Karan |
| 2011/0215060 A1 | 9/2011 | Niederhuefner |
| 2011/0218889 A1 | 9/2011 | Westberg |
| 2011/0273867 A1 | 11/2011 | Horst |
| 2011/0304316 A1 | 12/2011 | Hachmann |
| 2012/0230018 A1 | 9/2012 | Wiemer |
| 2012/0233041 A1 | 9/2012 | O'Dell |
| 2012/0274189 A1 | 11/2012 | Attey |
| 2012/0279934 A1 | 11/2012 | Thomas |
| 2012/0281095 A1 | 11/2012 | Trenciansky |
| 2012/0308969 A1 | 12/2012 | Rataul |
| 2012/0310398 A1 | 12/2012 | Rataul |
| 2012/0310570 A1 | 12/2012 | Pyne |
| 2013/0024023 A1 | 1/2013 | Siegel |
| 2013/0107498 A1 | 5/2013 | McClaughry |
| 2013/0107501 A1 | 5/2013 | Ewald |
| 2013/0144416 A1 | 6/2013 | Rataul |
| 2013/0155815 A1 | 6/2013 | Wulff |
| 2013/0176398 A1 | 7/2013 | Bonner |
| 2013/0226742 A1 | 8/2013 | Johnson |
| 2013/0229789 A1 | 9/2013 | Yoshida |
| 2013/0238516 A1 | 9/2013 | Moock |
| 2013/0286651 A1 | 10/2013 | Takeuchi |
| 2013/0299439 A1 | 11/2013 | Sid |
| 2013/0337668 A1 | 12/2013 | Ernest |
| 2013/0341292 A1 | 12/2013 | Johnson |
| 2013/0343014 A1 | 12/2013 | Browning |
| 2014/0006229 A1 | 1/2014 | Birch |
| 2014/0008382 A1 | 1/2014 | Christianson |
| 2014/0009372 A1 | 1/2014 | Fernando |
| 2014/0032379 A1 | 1/2014 | Schuetz |
| 2014/0055978 A1 | 2/2014 | Gantz |
| 2014/0055987 A1 | 2/2014 | Lindblom |
| 2014/0057604 A1 | 2/2014 | Kolanowski |
| 2014/0104826 A1 | 4/2014 | Bergdoll |
| 2014/0110481 A1 | 4/2014 | Burnside |
| 2014/0129395 A1 | 5/2014 | Groenovelt |
| 2014/0153279 A1 | 6/2014 | Weyer |
| 2014/0175034 A1 | 6/2014 | Hardy |
| 2014/0201040 A1 | 7/2014 | Birch |
| 2014/0201041 A1 | 7/2014 | Meyer |
| 2014/0201042 A1 | 7/2014 | Meyer |
| 2014/0207606 A1 | 7/2014 | Harrison |
| 2014/0224875 A1 | 8/2014 | Slesinger |
| 2014/0254136 A1 | 9/2014 | Oraw |
| 2014/0291346 A1 | 10/2014 | Mockus |
| 2014/0299620 A1 | 10/2014 | Swafford |
| 2014/0305889 A1 | 10/2014 | Vogler |
| 2014/0316916 A1 | 10/2014 | Hay |
| 2014/0324642 A1 | 10/2014 | Winkel |
| 2014/0333541 A1 | 11/2014 | Lee |
| 2014/0344118 A1 | 11/2014 | Parpia |
| 2014/0353265 A1 | 12/2014 | Rankin, VI |
| 2015/0024615 A1 | 1/2015 | Lindblom |
| 2015/0026020 A1 | 1/2015 | Overhultz |
| 2015/0036326 A1 | 2/2015 | Maciulewicz |
| 2015/0046299 A1 | 2/2015 | Yan |
| 2015/0053237 A1 | 2/2015 | Lee |
| 2015/0055328 A1 | 2/2015 | Irii |
| 2015/0070928 A1* | 3/2015 | Rau ..................... G02B 6/0081 362/604 |
| 2015/0073947 A1 | 3/2015 | Higgins |
| 2015/0076093 A1 | 3/2015 | Theisen |
| 2015/0079823 A1 | 3/2015 | Lindblom |
| 2015/0088701 A1 | 3/2015 | Desmarais |
| 2015/0088703 A1 | 3/2015 | Yan |
| 2015/0123973 A1 | 5/2015 | Larsen |
| 2015/0125835 A1 | 5/2015 | Wittich |
| 2015/0128398 A1 | 5/2015 | Benlevi |
| 2015/0134403 A1 | 5/2015 | Schwartz |
| 2015/0160651 A1 | 6/2015 | Tateno |
| 2015/0173529 A1 | 6/2015 | Hester-Redmond |
| 2015/0193723 A1 | 7/2015 | Carbonell |
| 2015/0193759 A1 | 7/2015 | Fukuda |
| 2015/0235502 A1 | 8/2015 | Lockwood |
| 2015/0241034 A1 | 8/2015 | Dankelmann |
| 2015/0241035 A1 | 8/2015 | Dankelmann |
| 2015/0289680 A1 | 10/2015 | Sosso |
| 2016/0061429 A1 | 3/2016 | Waalkes |
| 2016/0091177 A1 | 3/2016 | Houle |
| 2016/0097516 A1 | 4/2016 | Howard |
| 2016/0104985 A1 | 4/2016 | Ewing |
| 2016/0132822 A1* | 5/2016 | Swafford ................ A47F 1/126 705/28 |
| 2016/0157635 A1 | 6/2016 | Hardy |
| 2016/0174733 A1 | 6/2016 | Cinici |
| 2016/0209941 A1 | 7/2016 | Hadas |
| 2016/0213168 A1 | 7/2016 | Nuttall |
| 2016/0313051 A1 | 10/2016 | Alt |
| 2018/0047243 A1 | 2/2018 | Swafford, Jr. |
| 2018/0107973 A1 | 4/2018 | Overhultz |
| 2019/0239660 A1* | 8/2019 | Smith .................. G02B 6/0095 |

FOREIGN PATENT DOCUMENTS

| | | |
|---|---|---|
| CN | 101574214 | 11/2009 |
| CN | 202681155 U | 1/2013 |
| CN | 204862262 | 12/2015 |
| CN | 205560499 U | 9/2016 |
| DE | 19531866 | 2/1997 |
| DE | 20111800 | 10/2001 |
| DE | 10153495 A1 | 5/2003 |
| DE | 102010050500 | 5/2012 |
| DE | 202014001867 U1 | 3/2014 |
| EP | 268209 A2 | 5/1988 |
| EP | 0441354 A1 | 8/1991 |
| EP | 0683998 | 11/1995 |
| EP | 1057164 A1 | 12/2000 |
| EP | 1541064 A1 | 6/2005 |
| EP | 1579789 A1 | 9/2005 |
| EP | 2220965 | 8/2010 |
| EP | 2292120 | 3/2011 |
| EP | 2732729 A1 | 5/2014 |
| GB | 2291788 | 2/1996 |
| GB | 2297896 | 8/1996 |
| GB | 2325148 | 11/1998 |
| GB | 2359405 | 8/2001 |

(56) References Cited

FOREIGN PATENT DOCUMENTS

| | | |
|---|---|---|
| GB | 2390214 A | 12/2003 |
| RU | 2014112705 | 10/2015 |
| TW | 201513811 A | 4/2015 |
| WO | 1995016375 | 6/1995 |
| WO | 9708667 | 3/1997 |
| WO | 9908950 | 2/1999 |
| WO | 2000024297 A1 | 5/2000 |
| WO | 2003060839 | 7/2003 |
| WO | 03079852 A1 | 10/2003 |
| WO | 2005023060 A1 | 3/2005 |
| WO | 2006023954 | 3/2006 |
| WO | 2006067396 | 6/2006 |
| WO | 2007140161 | 12/2007 |
| WO | 2007146740 | 12/2007 |
| WO | 2008152973 A1 | 12/2008 |
| WO | 2010024507 A1 | 3/2010 |
| WO | 2011062727 | 11/2011 |
| WO | 2011159995 | 12/2011 |
| WO | 2012009822 | 1/2012 |
| WO | 2012015361 A1 | 2/2012 |
| WO | 2012018774 | 2/2012 |
| WO | 2012074781 | 6/2012 |
| WO | 2012165190 | 12/2012 |
| WO | 2012165191 A1 | 12/2012 |
| WO | 2013192487 | 12/2013 |
| WO | 2013192491 | 12/2013 |
| WO | 2014137620 | 9/2014 |
| WO | 2014173629 A1 | 10/2014 |
| WO | 2014200998 | 12/2014 |
| WO | 2015061429 | 4/2015 |
| WO | 2015061437 | 4/2015 |
| WO | 2017074891 | 5/2017 |

OTHER PUBLICATIONS

Patent Cooperation Treaty, International Searching Authority, Notification of Transmittal of the International Search Report and the Written Opinion of the International Searching Authority, or the Declaration issued in International Application No. PCT/US2017/057225, dated Apr. 12, 2018, 9 pp.
DCI-ARTFORM, Grocery.dcim.com/Products/SpaceGrid-I.aspx, "SpaceGrid I Trays-Enhance Frozen Food Appeal and Profitability", 2014, 3 pp.
DCI-ARTFORM, Grocery.dcim.com/Products/SpaceGrid-II.aspx, "SpaceGrid II Trays-Maximize Profitability in Key Store Perimeter Categories", 2014, 2 pp.
Phoenix Displays LLC, Phoenixdisplays.com/displays.html, "Phoenix Displays LLC—Manufacturer of Forward-Facing Product Displays", 2014, 3 pp.
Trion Industries, Inc., Triononline.com/product/wonderfar-merchandising-system/, "Trion Wonderbar Merchandising System", 2017, 2 pp.
Patent Cooperation Treaty, International Searching Authority, Notification of Transmittal of the International Search Report and the Written Opinion of the International Searching Authority or the Declaration issued in International Application No. PCT/US2017/013973, dated May 25, 2017, 13 pp.
Intelectual Property Office, British Examination Report under Section 18(3) Corresponding to Application No. GB1414037.0, dated Apr. 13, 2017, 6 pp.
Intellectual Property Office, British Search Report under Section 17(5) for GB1414037.0, dated Dec. 1, 2014 (pp. 3).
International Search Report issued for PCT/US12/28250; dated Mar. 8, 2012, 3 pp.
International Search Report issued in International Application No. PCT/ US12/28250, dated Jul. 5, 2012, 1 p. (being resubmitted due to error in previously-cited date).
Patent Treaty Cooperation, International Search Report and Written Opinion for PCT/GB2015/052296 dated Feb. 16, 2016 (pp. 17).
POS Tuning Udo Vobhenrich GMBH & Co. KG, POS-T Tuning LED Lighting of Trays, Sep. 9, 2010, 20 pp.
Streater, Streatlite Connector specifications page, Jun. 8, 2012, 1 p.
Trinity LLC, Trinity Credentials Presentation, Jul. 2013, 10 pp. (cover & title pp. 3, 13-18, 32).

\* cited by examiner

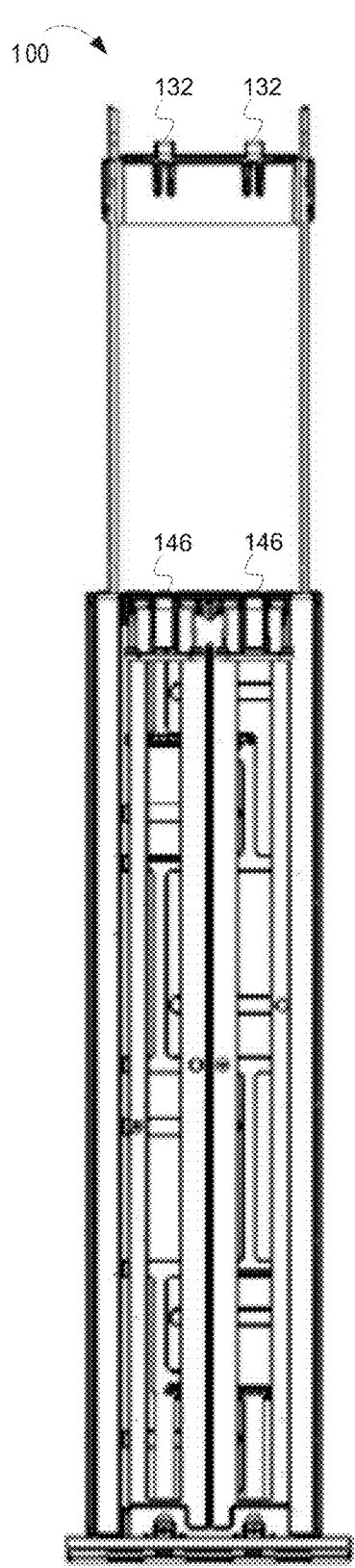 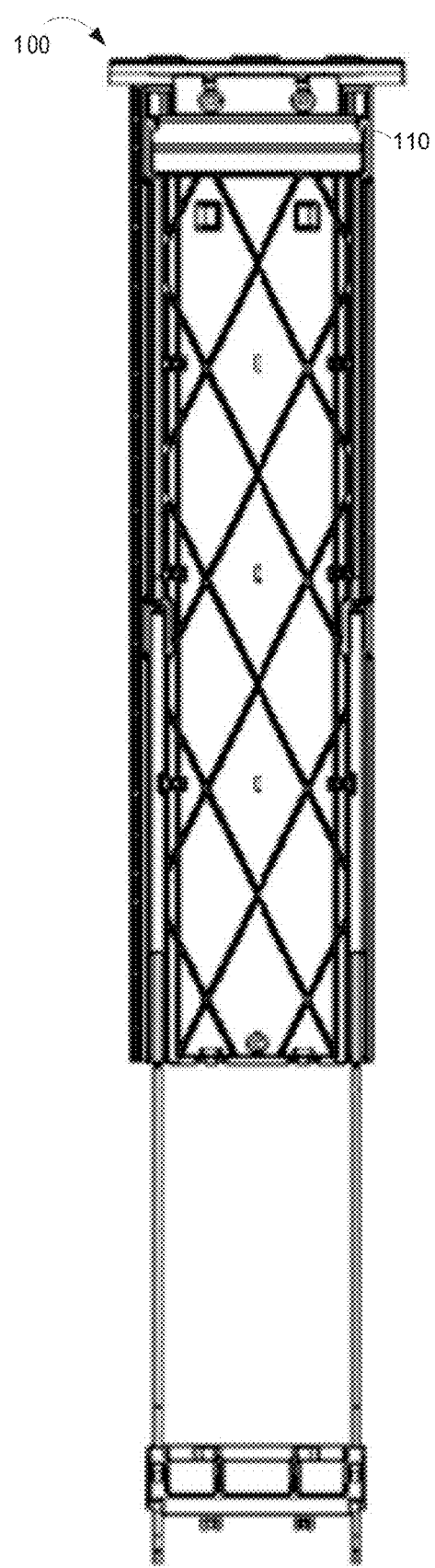
FIG. 1J
FIG. 1K

ILLUMINATED MERCHANDISER, RETROFIT KIT AND RELATED METHODS

RELATED APPLICATIONS

This application claims the benefit of U.S. Provisional Application No. 62/409,845, filed Oct. 18, 2016 which is incorporated herein by reference in its entirety.

FIELD

This invention relates generally to product displays and, more particularly, to illuminated merchandisers for front-facing product merchandise for displaying and dispensing product to consumers and/or kits for retrofitting product display merchandisers to be illuminated.

BACKGROUND

Product displays, such as merchandisers, are frequently used in retail environments to display products for sale. It is advantageous for these product displays to be configured to provide consumers easy access to the displayed product as well as facilitate easy reloading by store employees. In addition to ease of use considerations, manufacturers of product displays seek to minimize materials and manufacturing costs associated with the product displays.

One problem with conventional merchandisers is that they typically require intricate structures to make them more user friendly to both end consumers and the retail store clerks or associates who stock and/or restock the merchandisers with displayed product. For example, tray or drawer-type merchandisers that pull out like a drawer to assist store associates in stocking/restocking the merchandiser often require intricate structures that are expensive to manufacture, hard to assemble, and often require operation of inconveniently located release mechanisms to get the tray or drawer to slide out from the display for stocking or restocking purposes.

In addition, conventional tray or drawer type merchandisers require the displayed product to be pressed against pushers during stocking/restocking which can make the merchandiser harder to stock/restock and can cause damage to the product being stocked/restocked depending on how much force is exerted against the product between the person stocking/restocking the displayed product and the pushers of the merchandiser.

While some conventional merchandisers allow flexibility by offering adjustable width side members so that the merchandiser can be used to merchandise products of different size, conventional merchandisers do not allow the merchandiser to be repurposed from displaying one product to two separate products or vice versa.

Additionally, conventional merchandiser may block light from the ambient lighting of the stores or from lights integrated in the shelving unit from illuminating the products. Further, conventional attempts to illuminate displays do so inefficiently and/or in ways that do not illuminate the displayed product in desired manners.

Accordingly, it has been determined that a need exists for improved product display merchandisers that are not only easy to use, for both consumers and store associates, but also minimally expensive to produce and that offer improved features and functions over conventional merchandisers.

BRIEF DESCRIPTION OF THE FIGURES

Embodiments of the invention are illustrated in the figures of the accompanying drawings in which:

FIGS. 1H, 1I, 1J, and 1K are alternate perspective, left side elevation, top view, and bottom view, respectively, of the product display merchandiser of FIGS. 1A-1G illustrating the merchandiser with the tray in a second, extended position.

FIG. 9A is a perspective view of the illuminated merchandiser in a retracted position.

FIG. 9B is an exploded view of the illuminated merchandiser of FIG. 9A.

FIG. 9C is a bottom perspective view of the illuminated merchandiser of FIGS. 9A-9B in a retracted position.

FIG. 9D is a bottom perspective view of the illuminated merchandiser of FIGS. 9A-9C in an extended position.

FIG. 9E is a perspective view of the lens of the illuminated merchandiser of FIGS. 9A-9D.

FIG. 9F is a perspective view of an alternative lens of the illuminated merchandiser of FIGS. 9A-9D.

FIG. 9G is a front elevated view illustrating illuminated indicia on the merchandiser of FIGS. 9A-9D.

FIG. 9H is a front elevated view illustrating illuminated indicia on the merchandiser of FIGS. 9A-9D.

Figure 1A:
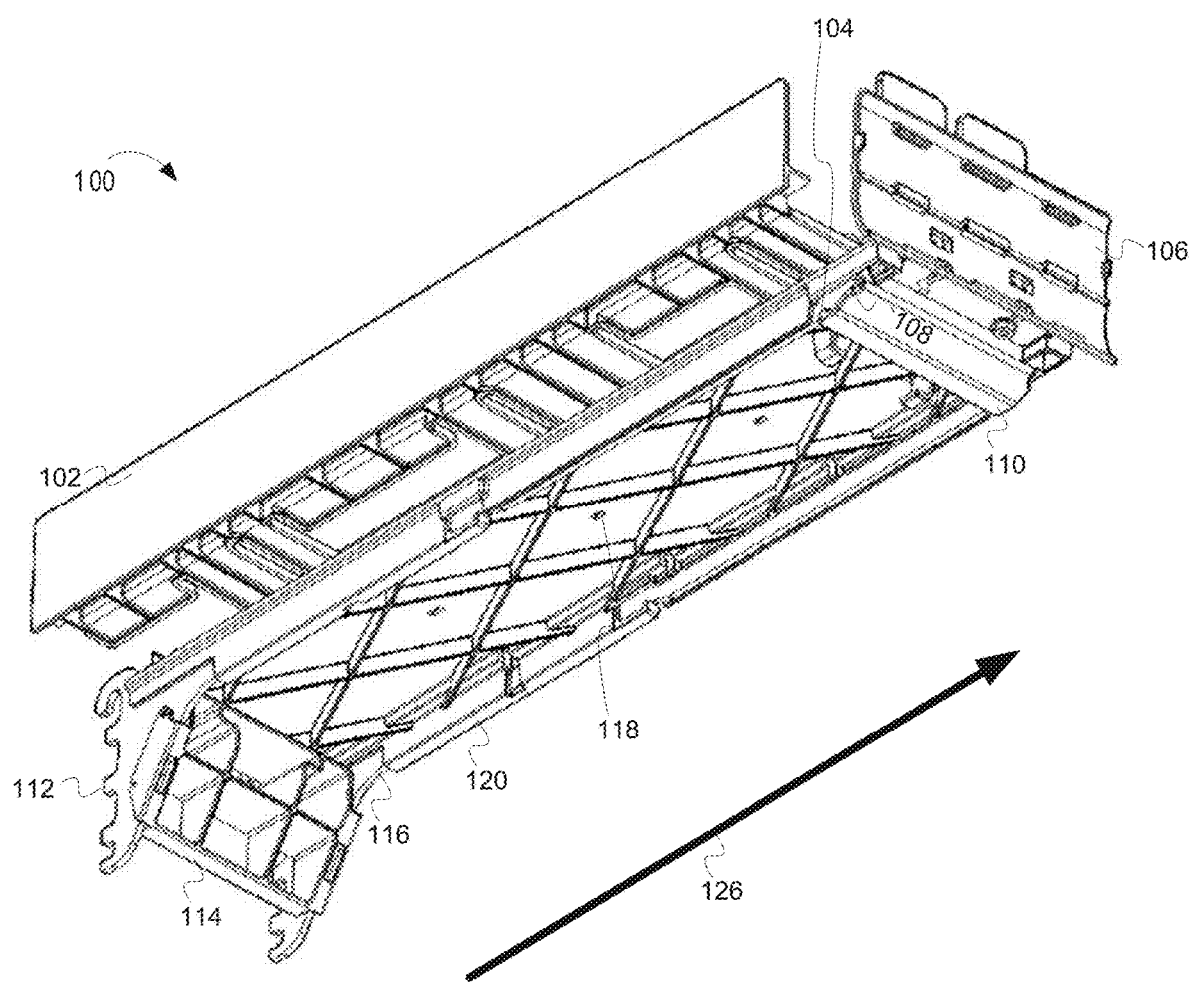
FIG. 1A is a perspective view of a product display merchandiser according to some embodiments of the inventive subject matter taken from below and in front of the merchandiser (or the lower right front of the unit) and illustrating an exemplary baseless design with the left side member or wing in a first, retracted position and the right side member or wing in a second, extended position.

Elements in the figures are illustrated for simplicity and clarity and have not necessarily been drawn to scale or to include all features, options or attachments. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DESCRIPTION OF THE EMBODIMENTS

Many variations of product displays are discussed herein and even further are contemplated in view of this disclosure.

The product displays discussed herein are configured, and designed, to hold and display product that is for sale and to front face this product so that the next item in the display is moved to the front of the display as the product in front of it is removed from the merchandiser. While many variations of product display are described and contemplated herein, FIGS. 1A-1M, and the associated text, generally depict and describe a first embodiment of a product display, wherein the product display has a baseless design, FIG. 2 and its associated text generally depict a second embodiment, FIG. 3 and its associated text generally depict a third embodiment, FIGS. 4A-P, and the associated text, generally depict and describe a fourth embodiment of a product display merchandiser, wherein the product display merchandiser has an adjustable width and a unique stabilizing structure, FIGS. 5A-5E, and the associated text, generally depict and describe a fifth embodiment of a product display merchandiser, wherein the product display merchandiser has an alternate mechanism for adjusting the position of, and securing, the sidewalls or wings and alternate structures for retaining displayed product in the merchandiser when the lens is removed, FIGS. 6A-6B, and the associated text, generally depict and describe a sixth embodiment of a product display merchandiser, wherein the product display merchandiser includes a mechanism to securely attach a bracket engagement member to a rear stabilizer, and FIGS. 7A-7B, and the associated text, generally depict and describe a seventh embodiment of a product display merchandiser, wherein the product display merchandiser includes one or more removable sidewalls or wings for use in unison with one or more other product display merchandisers. Although seven main embodiments are shown, it is understood that features from any one embodiment may be combined with features of other embodiments to come-up with yet further embodiments that are intended to be covered by this disclosure and the following claims despite not being illustrated in a specific drawing figure for same.

FIGS. 1A-1M illustrate an exemplary embodiment of a product display merchandiser 100. The product display merchandiser 100 includes a tray 102 for holding a product to be displayed. The tray 102 is supported underneath by arms, support members, brackets, or "blades" 116. The arms 116 include bracket engagement members 112 that attach to a rear support member (not shown), such as a vertical upright of a conventional gondola or other store shelving system. The rear support member can be any suitable support member such as conventional grid-type systems, bar type systems, shelves, etc. The product display merchandiser 100 can also have one or more stabilizers positioned in various locations on the product display merchandiser 100. For example, FIG. 1 depicts a stabilizer 114 positioned between the bracket engagement members 112 near the rear of the product display merchandiser 100. In some embodiments, the product display merchandiser 100 can include a stabilizer, in addition to or in lieu of the stabilizer 114, near the front of the product display merchandiser 100. The stabilizer 114 (as well as any other stabilizers) can be sized so as to accommodate trays of multiple dimensions. The product display merchandiser 100 can also include a lens 106 for holding and displaying signage, preventing product from falling out of the tray 102, etc. Such a lens can be formed from any suitable material and in any suitable manner. For example, the lens can be extruded or injection molded plastic. Additionally, in one form, the lens can have perforations which allow for easy snap-off type custom-sizing of the lens.

In use, the product display merchandiser 100 has multiple positions. In one embodiment, the product display merchandiser 100 can have a closed position (best shown in FIGS. 1A-1B, and 1E-1G) for presenting product and an open position (best shown in FIGS. 1H-1K) for restocking product. In the closed position, a majority of the tray 102 is positioned over top of the arms 116. In the open position, the majority of the tray 102 is not positioned over top of the arms 116. The tray 102 travels along the arms 116 from the closed position to the open position in a direction indicated by arrow 126. As depicted in FIG. 1, the tray 102 includes tracks 120 through which the arms 116 extend. The tracks 120 can take any suitable form. For example, the tracks 120 can comprise a number of individual pieces protruding from the tray 102, a continuous or semi-continuous channel running along the tray 102, etc. Additionally the tracks 120 (and/or arms 116) can include ball bearings or any other suitable friction-reducing mechanism.

In some embodiments, the product display merchandiser 100 includes a mechanism that resists movement of the tray 102 between the open and closed positions. Such a mechanism can prevent the tray 102 from moving from the closed position to the open position unintentionally. For example, the product display merchandiser 100 can include a handle 110 (also seen in FIG. 1K) with first engagement members 108. The arms 116 can include second engagement members 104 that are complimentary to the first engagement members 108. Such first engagement members 108 and second engagement members 104 are well-depicted in FIG. 1E. The engagement members are engaged when the tray 102 is in the closed position. Such engagement resists and/or prevents movement of the tray 102 to the open position. In the embodiment depicted in FIG. 1, operation of the handle 110 disengages the engagement members. Such disengagement permits movement of the tray 102 from the closed position to the open position. In one form, the first engagement members 108 disengage from the second engagement members 104 when the handle 110 is displaced in a direction parallel to the movement of the tray 102 across the arms 116 (i.e., in the direction of arrow 126). For example, movement of the handle away from the bracket engagement members 112 disengages the first engagement members 108 from the second engagement members 104. As another example, the handle 110 may displace in a somewhat rotational manner. For example, the handle 110 can be affixed to the tray 102 near a leading edge of the tray (i.e., a portion of the tray opposite the bracket engagement members 112). The handle 110 is operated from an end of the handle 110 opposite a side of the handle 110 affixed to the tray 102. In such embodiments, the handle 110 displaces in a somewhat rotational direction that, for purposes of this specification, can be considered to have a displacement in a direction parallel to the motion of the tray 102 and in a direction perpendicular to the motion of the tray 102.

In one form, the product display merchandiser 100 can include a mechanism that prevents the tray 102 from moving from the open position to the closed position during restocking. For example, the arms 116 and the tracks 120 can include complimentary engagement members that engage when the tray 102 is in the open position. Such engagement members can provide mechanical resistance which must be overcome to move the tray 102 from the open position to the closed position. For example, FIG. 1I depicts a product display merchandiser 100 with arms having an arm engagement member 144 which engages a track engagement member 136. When the tray 102 is in the open position, the track engagement member 136 engages the arm engagement member 144 and provides resistance against the tray 102 moving from the open position to the closed positon. In some embodiments, such resistance is physical and is overcome by force being exerted on the tray 102 in a direct of the closed position. In other embodiments, there can be a hook, latch, lever, or other release mechanism which must be utilized to disengage the track engagement members 136 from the arm engagement members 144.

Figure 1B:
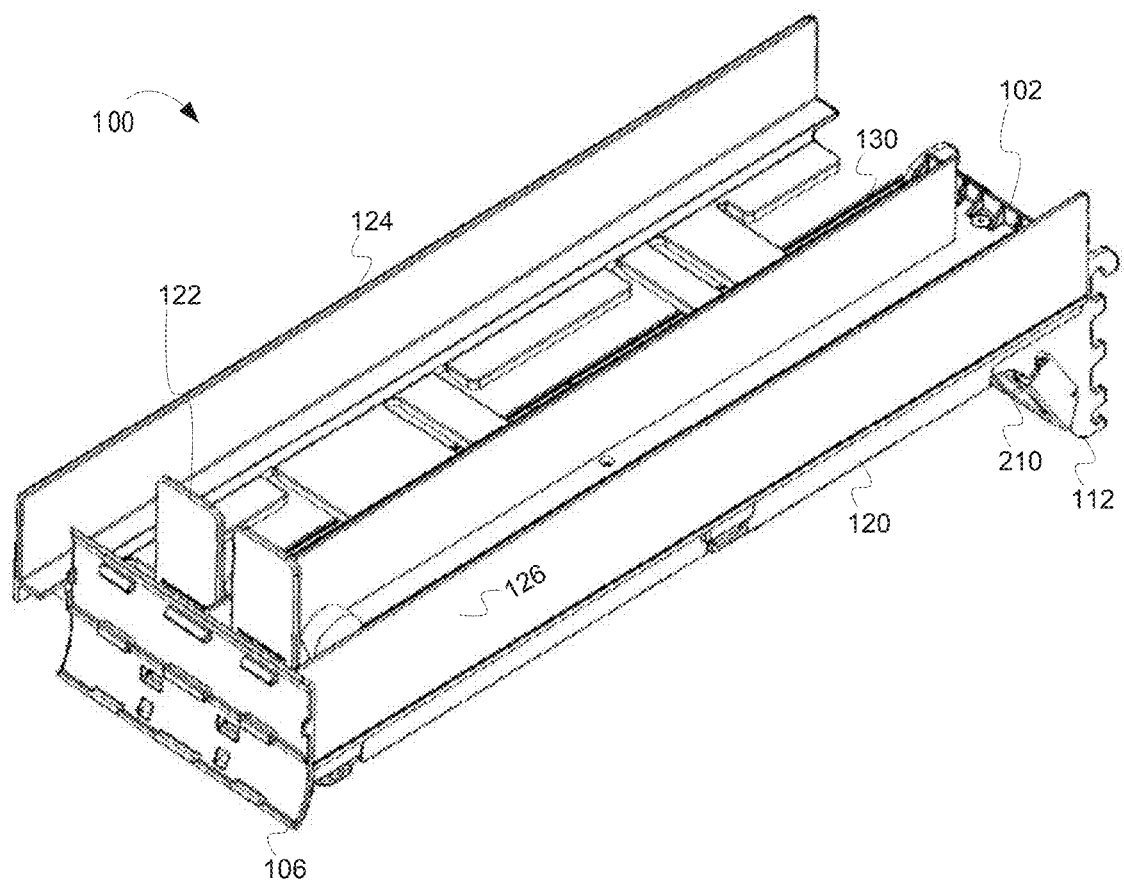
FIG. 1B is an alternate perspective view of the product display merchandiser of FIG. 1, taken from above and in front of the merchandiser (or the upper left front of the unit).
Figure 1C:
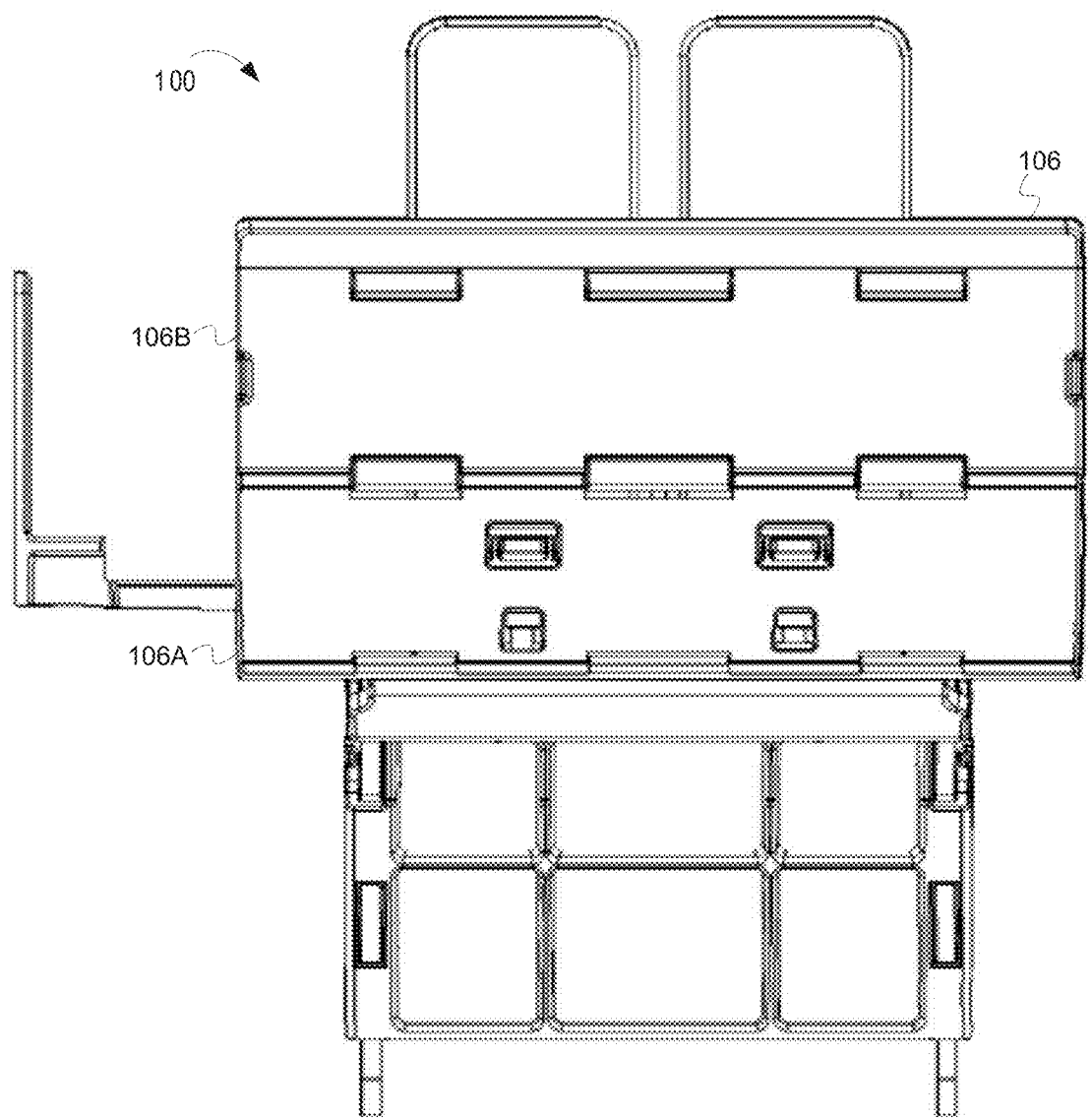
FIGS. 1C, 1D, and 1E are front elevation, left side elevation, and rear elevation views, respectively, of the product display merchandiser of FIGS. 1A-1B, the right side elevation view being a mirror image of the left side elevation view.
Figure 1D:
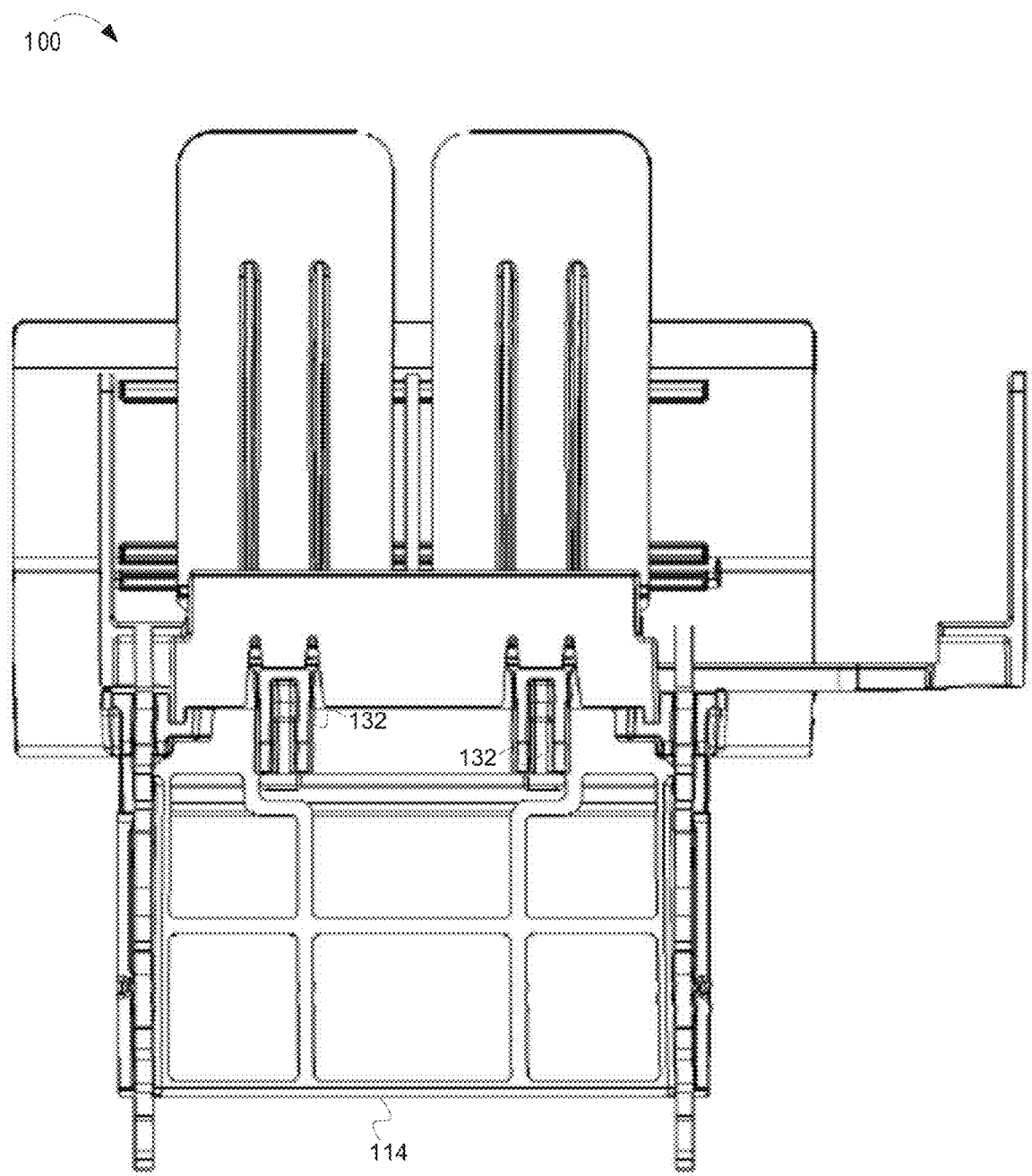
Figure 1E:
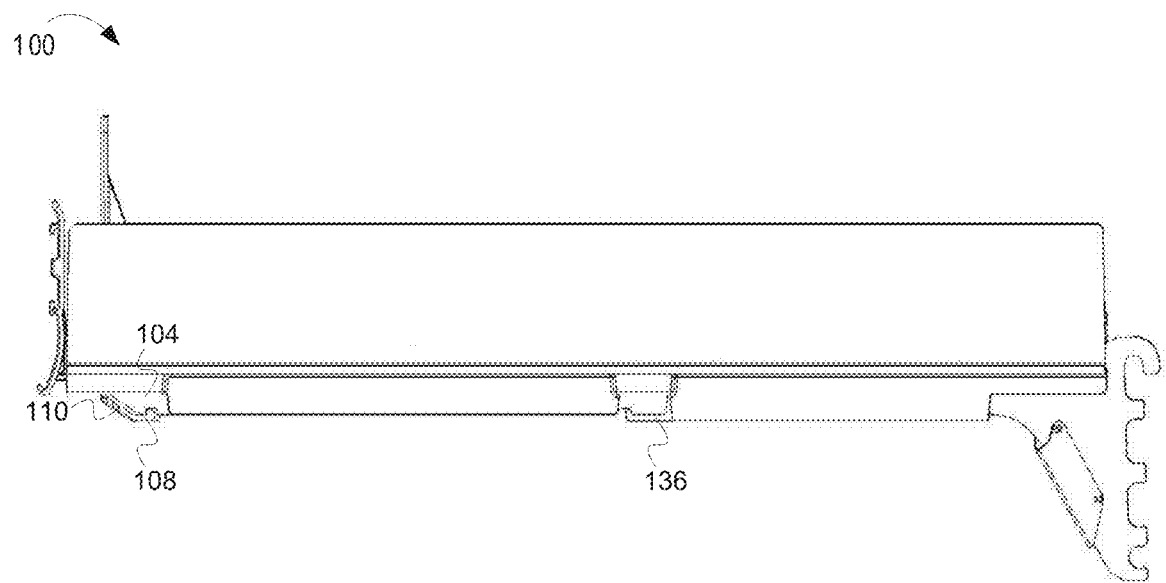

As shown in FIG. 1B the product display merchandiser 100 includes a tray 102 and arms 116. The tray 102 includes tracks 120 through which the arms 116 extend. The tray 102 displaces along the arms 116. The arms 116 can include bracket engagement members 112 configured to mount to a rear support member (not shown). Although FIG. 1B depicts the product display merchandiser 100 configured with bracket engagement members 112 to mount to a rear stabilizer, in some embodiments, the product display merchandiser 100 can be configured to be supported by, attach to, and/or rest on a shelf.

The tray 102 includes a right sidewall 124 and a left sidewall 126 (also referred to as a "side members" or "wings"), as well as a lens 106. In some embodiments, as depicted in FIG. 1B, either (or both) of the right sidewall 124 and the left sidewall 126 are extendable to accommodate product of varying dimensions. The tray 102 of FIG. 1B is depicted with the right sidewall 124 extended. In one form, the right sidewall 124 and left sidewall 126 are incrementally extendable. Additionally, the right sidewall 124 and the left sidewall 126 can be individually extendable or mechanically coupled in such a way that extension of one of the right sidewall 124 and the left sidewall 126 cause extension of the other of the right sidewall 124 and the left sidewall 126.

To further increase compatibility with product of varying dimensions, some embodiments of the product display merchandiser 100 include a removable divider 130. The removable product divider 130 is shown in greater detail in FIG. 1L. The removable divider 130 can attach to the product display merchandiser 100 in any suitable manner. For example, as shown in FIG. 1L, the removable divider 130 can include divider protrusions 148 that mate with slots 118 on the tray 102 (as shown in FIG. 1G), slots which mate with protrusions on the tray 102, a bar that mates with a track on the tray 102, etc. In some embodiments, the removable divider 130 is mountable at multiple locations of varying distance from the right sidewall 124 and the left sidewall 126. When removed, the product display merchandiser 100 preferably includes a storage space for the removable divider 130. FIG. 1M depicts one example by which the removable divider 130 can be stored onboard the product display merchandiser 100. In one form, the tray 102 includes a recess on a bottom side of the tray 102 configured to accommodate and store the removable divider 130. Alternatively or additionally, as depicted in FIG. 1M, the tray 102 can include clips 150 (or other suitable connectors) which hold the removable divider 130 in a stored position on the product display merchandiser 100.

Figure 1F:
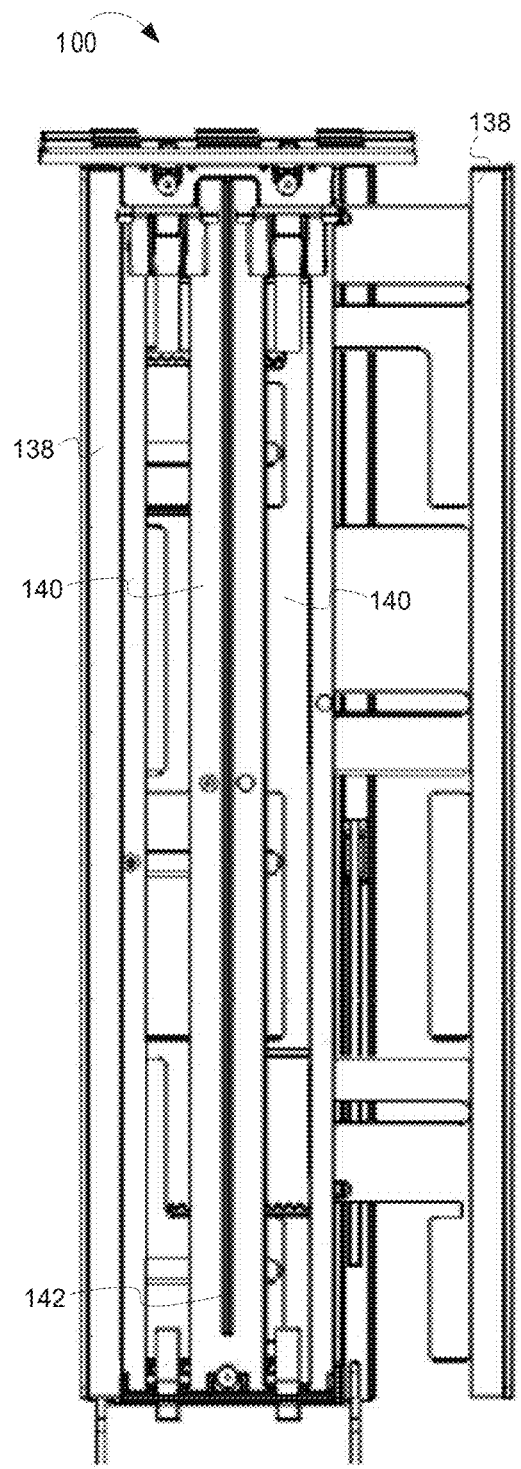
FIGS. 1F and 1G are top and bottom views, respectively, of the product display merchandiser of FIGS. 1A-E illustrating the merchandiser with the tray in a first, retracted position.
Figure 1G:
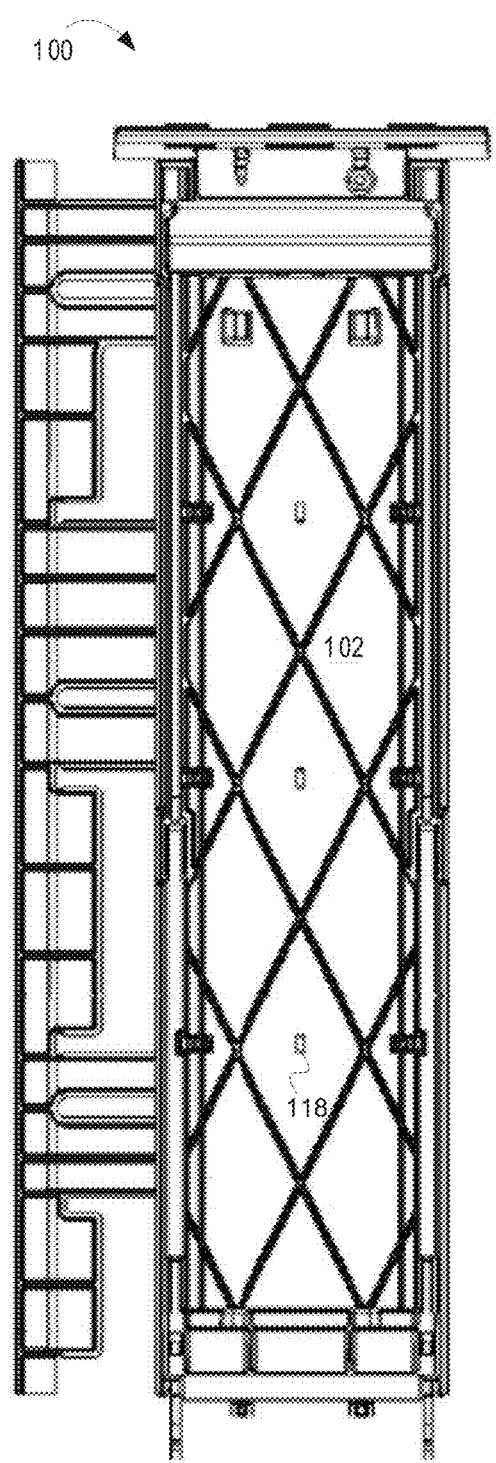

In some embodiments (as depicted in FIG. 1F) a divider 142 (whether or not removable) can take the form of a "T-shape." A horizontal portion of such divider 142 can form a product support surface 140. This product support surface 140 can support a portion of product displayed in the product display merchandiser and a second product support surface 138 located on the sidewall can support another portion of the product displayed in the product display merchandiser 100.

Figure 1H:
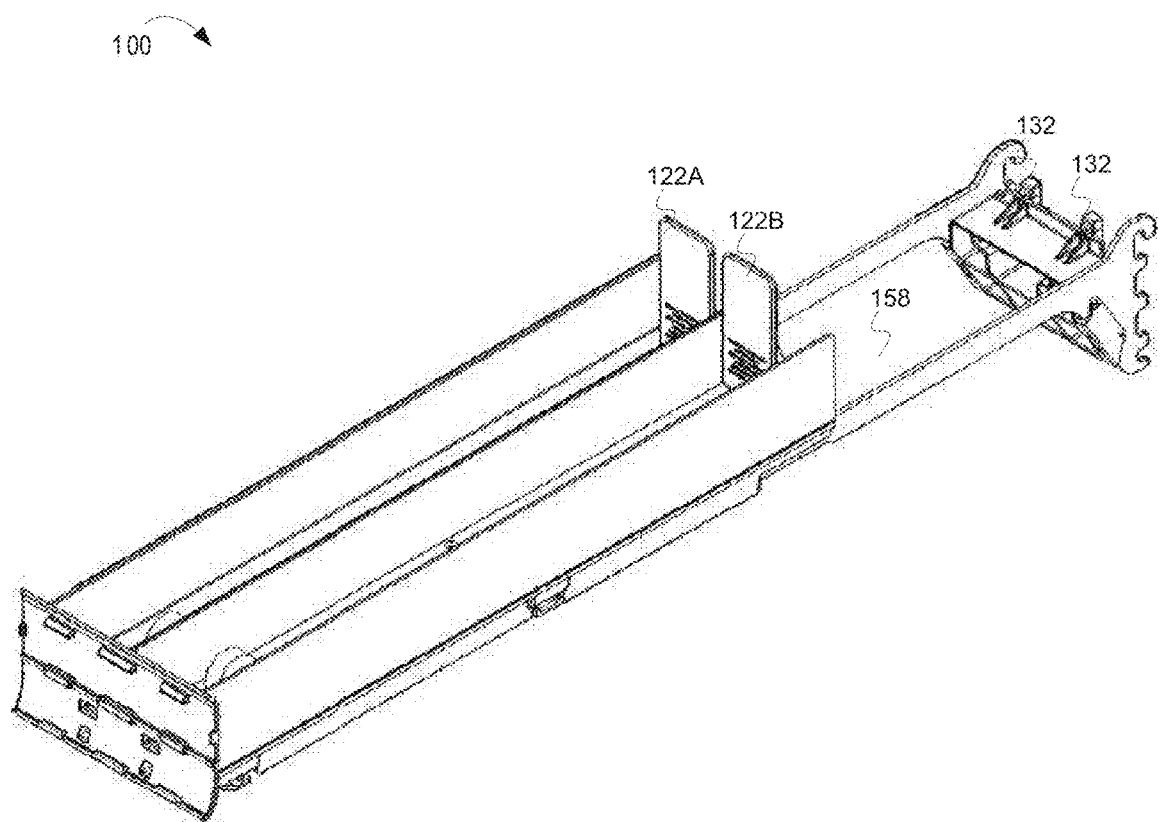
Figure 1I:
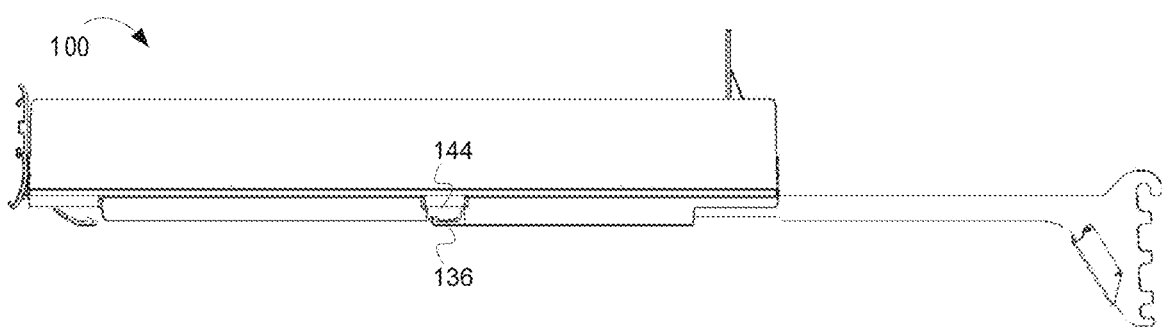
Figure 1L:
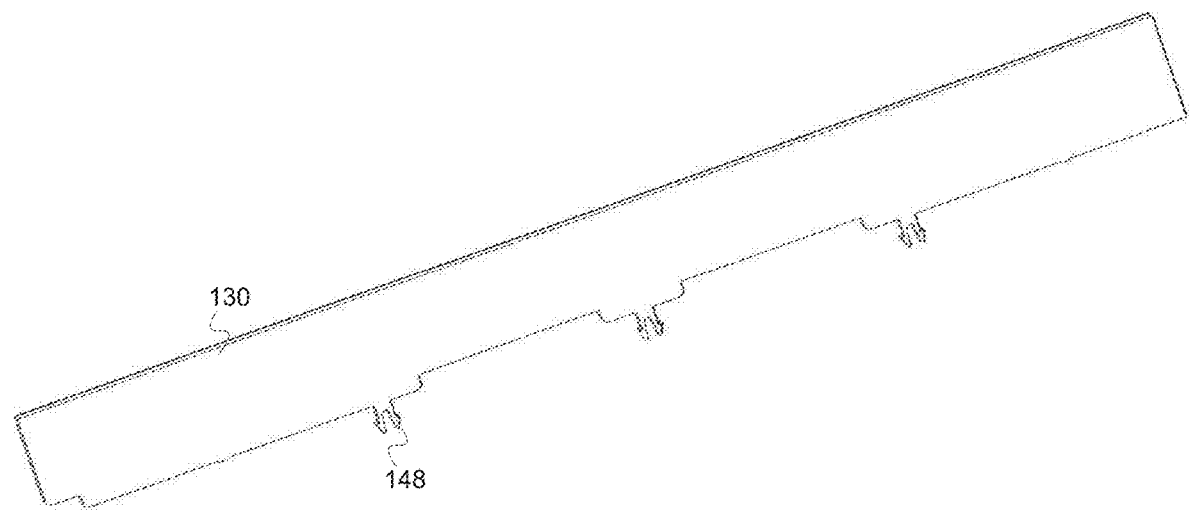
FIGS. 1L and 1M are perspective views of an exemplary removable divider illustrating, in FIG. 1L, one form of mating structure that may be used to mate the divider to the merchandiser unit, and illustrating in FIG. 1M, an exemplary manner in which the removable divider may be stored on the merchandiser for future use.
Figure 1M:
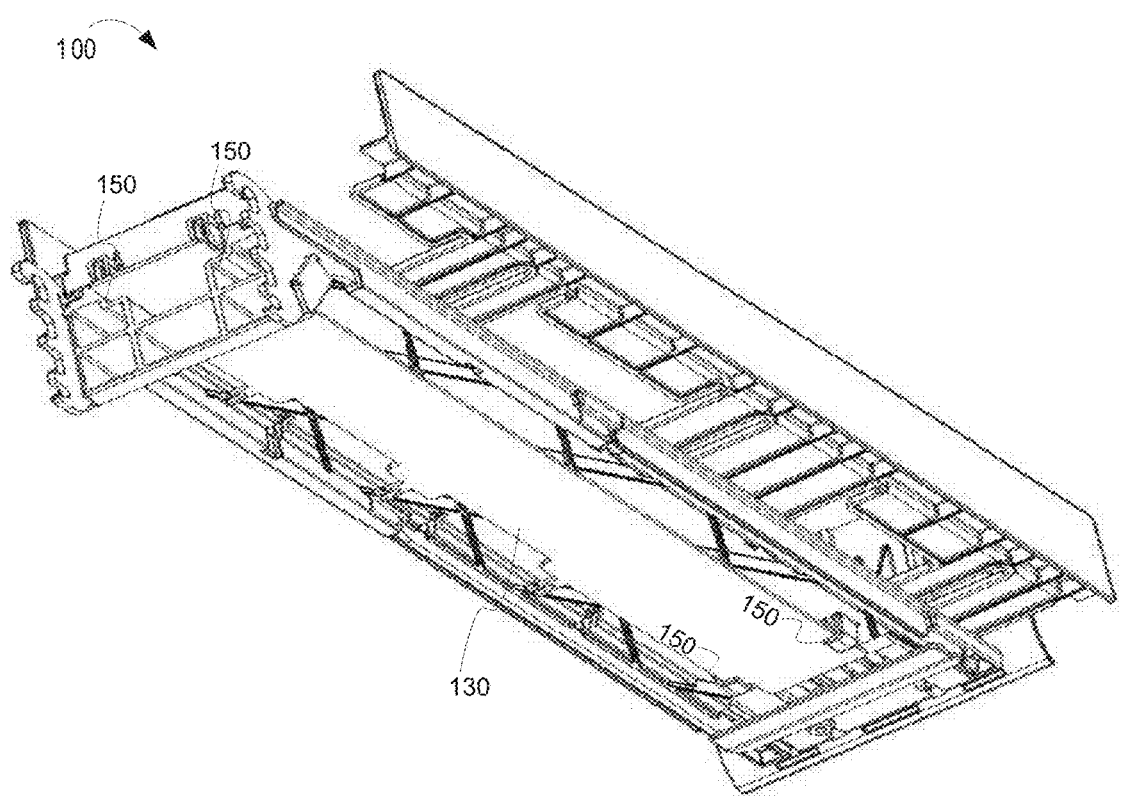

The tray 102 also includes pushers 122. The pushers 122 act to urge product toward the front of the tray 102 (i.e., front face product) making the product easier to access. Although FIG. 1B depicts the tray 102 as including pushers 122, some embodiments of the inventive subject matter do not include pushers 122 to urge product to the front of the tray. For example, instead of pushers 122, the product display merchandiser 100 may be configured to incline, or mount on an incline, in a manner in which gravitational force is employed to urge product to the front of the tray 102. Additionally, although FIG. 1B depicts a product display merchandiser 100 including two pushers 122, some embodiments of the inventive subject matter can include fewer than two pushers or more than two pushers. In embodiments that include pushers 122, the pushers 122 generally comprise a vertical member and a biasing mechanism. The pushers 122 can employ any suitable biasing mechanism, such as a spring, a counterweight, a pulley system, etc. In some embodiments, the pushers 122 include engagement members (e.g., clips, latches, detents, etc.) that engage with complimentary engagement members located on the tray 102, tracks 120, and/or arms 116. The engagement members and the complimentary engagement members act to maintain the pushers 122 in a restocking position when the tray 102 is in an open position. Maintaining the pushers 122 in the restocking position not only makes restocking easier but also helps prevent product from being damaged during the restocking process. In some embodiments, the pushers 122 are maintained at a backmost portion of the tray 102 during restocking. In some embodiments, the engagement members and the complimentary engagement members automatically disengage when the tray 102 is moved from the open position to the closed position. For example, the tray 102, tracks 120, and/or arms 116 can include disengagement members that cause disengagement of the engagement members from the complimentary engagement members. FIGS. 1D, 1H and 1J depict one embodiment of such engagement and disengagement members. FIG. 1J depicts two engagement members 146 coupled to the pushers 122. Although FIG. 1J depicts an embodiment including two pushers 122 and two engagement members 146, it is not necessary that there be a one-to-one correspondence between the pushers 122 and engagement members 146. The two engagement members 146 act (in concert with the complimentary engagement members) to maintain the pushers 122 in the restocking position when the tray 102 is in the open position. FIGS. 1D and 1H depict a product display merchandiser 100 having disengagement members 132. In one form, the disengagement members 132 are linearly aligned with the pushers 122 and correspond one-to-one with the pushers 122, although embodiments exist that do not have either of these features (e.g., one form may have one disengagement member 132 and three pushers 122). The disengagement members 132 act to disengage the engagement members 146 and the complimentary engagement members when the tray 102 is moved from the open position to the closed position. Such action by the disengagement members 132 cause the pushers 122 to be automatically removed from the restocking position. In one form, the disengagement members 132 are protrusions that physically contact one or more of the engagement members and the complimentary engagement members to force disengagement of the engagement members and the complimentary engagement members.

FIG. 1C is a front view of a product display merchandiser 100, according to some embodiments of the inventive subject matter. The product display merchandiser 100 includes a lens 106. As previously discussed, the lens 106 can hold and/or display signage, prevent product from falling out of the tray 100, etc. Such a lens can be formed from any suitable material and in any suitable manner. For example, the lens can be extruded or injection molded plastic. Additionally, in one form, the lens can have perforations which allow for easy snap-off type custom-sizing of the lens. Additionally, the lens 106 can have multiple display sections or channels. For example, the lens 106 may have a first display portion 106A and a second lens portion 106B. Although FIG. 1C depicts lens 106 as having the second display portion 106B arranged above the first display portion 106A, many other configuration exist. For example, the lens 106 may have left and right display sections, or any other combination of two or more display sections.

Figure 2:
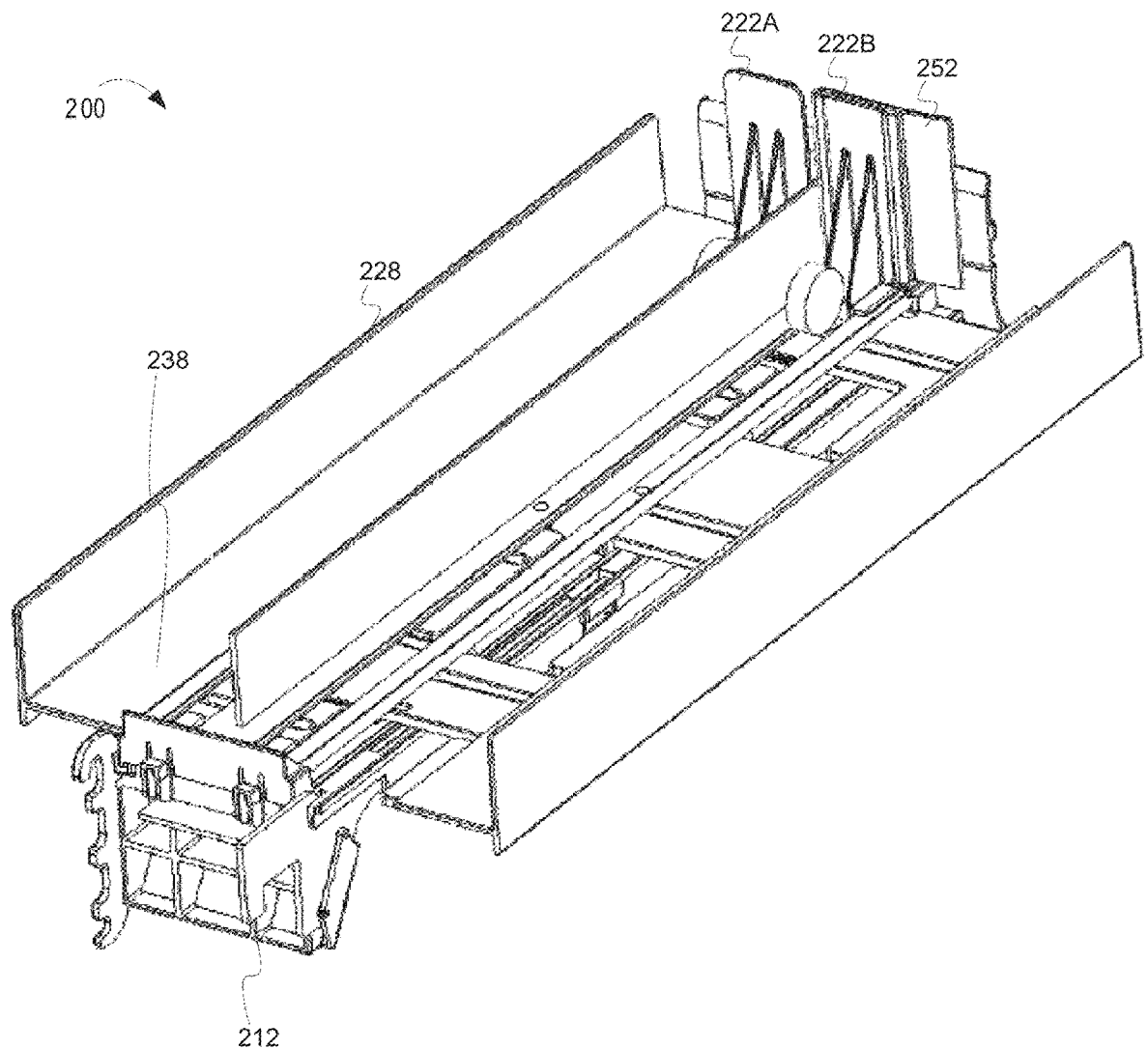
FIG. 2 is a perspective view of an alternate product display merchandiser in accordance with aspects of the invention taken from above the rear right corner of the merchandiser and illustrating the merchandiser with an alternate form of mounting bracket intended for use with bar mounted systems rather than grid systems, including alternate side members or wings for larger product and an exemplary pusher attachment accessory (note: while a bar mounting bracket and a grid mounting bracket are shown for comparison purposes, it should be understood that the merchandiser would be equipped with either two bar mounting brackets or two grid mounting brackets, rather than a combination of either).
Figure 3:
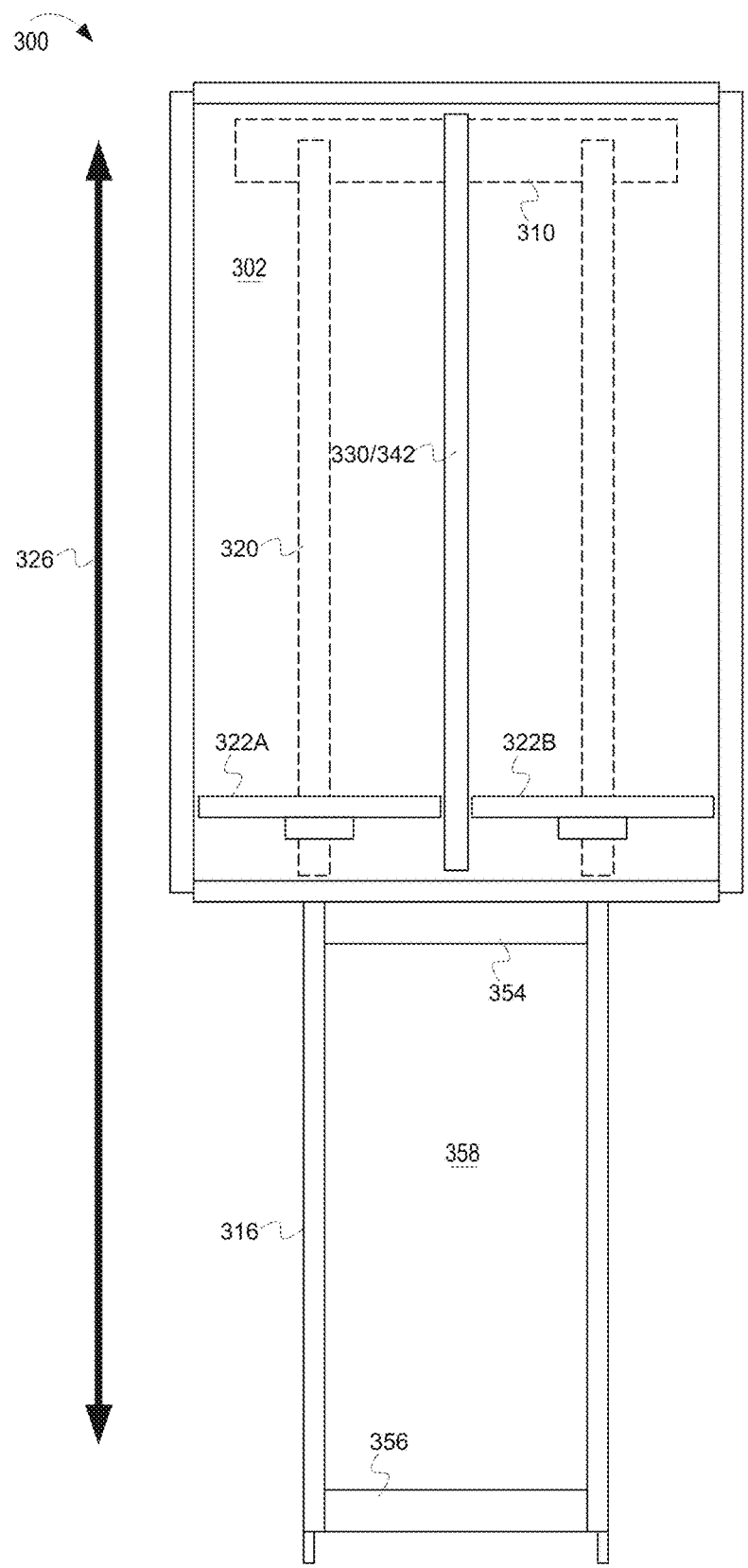
FIG. 3 is a top view of an alternate product display merchandiser in accordance with embodiments of the invention illustrating an optional front and/or rear stabilizer member connected to the mounting brackets for stabilizing same.

The remaining figures and text describe alternative embodiments of a product display merchandiser. For purposes of convenience, items that are similar to those discussed above with respect to FIGS. 1A-1M will be referenced using the same last two-digit number but using a first digit corresponding to the figure number simply to distinguish from one another. For example, in FIG. 1, the product tray is referred to generally by reference number 102, while the product tray is referred to as 202, 302, and 402, in FIG. 2, FIG. 3, and FIG. 4, respectively. FIG. 2 depicts a second embodiment of a product display merchandiser 200. The product display merchandiser 200 includes sidewalls 228, pushers 222A and 222B, bracket engagement members 212, and a pusher attachment 252. The pusher attachment 252 attaches to the pusher 222B to expand the surface area of the pusher 222B. Additional types of pusher attachments exist. For example, pusher attachments can be designed for specific products, to minimize the surface area of the contact point with a product, to extend the depth of the pusher, etc. Additionally, FIG. 2 depicts a bracket engagement member 212 that is configured to engage a bar mounted system (not shown). Additionally, FIG. 2 depicts an embodiment of a product display merchandiser in which a horizontal portion of the sidewall 228 (i.e., the product support 238 portion of the sidewall) is roughly equal in area to a vertical portion of the sidewall 228. FIG. 3 depicts a third embodiment of a product display merchandiser 300. The product display merchandiser 300 includes a tray 302 that is slidable along arms 316. The tray 302 includes tracks 320 disposed on the bottom side of the tray 302. The arms 316 are seated in the tracks 320. The tray 302 moves in a direction as indicated by arrow 326 from an open position (shown) to a closed position (not shown). When in the open position, a void (or unobstructed opening) 358 is revealed (i.e., the product display merchandiser 300 has a baseless design). The void 358 is bounded on a left side and a right side by arms 416, on a front side by front stabilizer 354, and on a rear side by rear stabilizer 356. The tray also includes pushers 322A and 322B which are movable within in the tray 302 and a handle 310. In some embodiments, the handle 310 is operable to disengage engagement members so as to allow the tray 302 to be moved from the closed position to the open position. In one form, the tray 302 includes a divider 330/342. The divider 330/342 can be fixed to the tray 302 or removably attached to the tray 302.

Figure 4A:
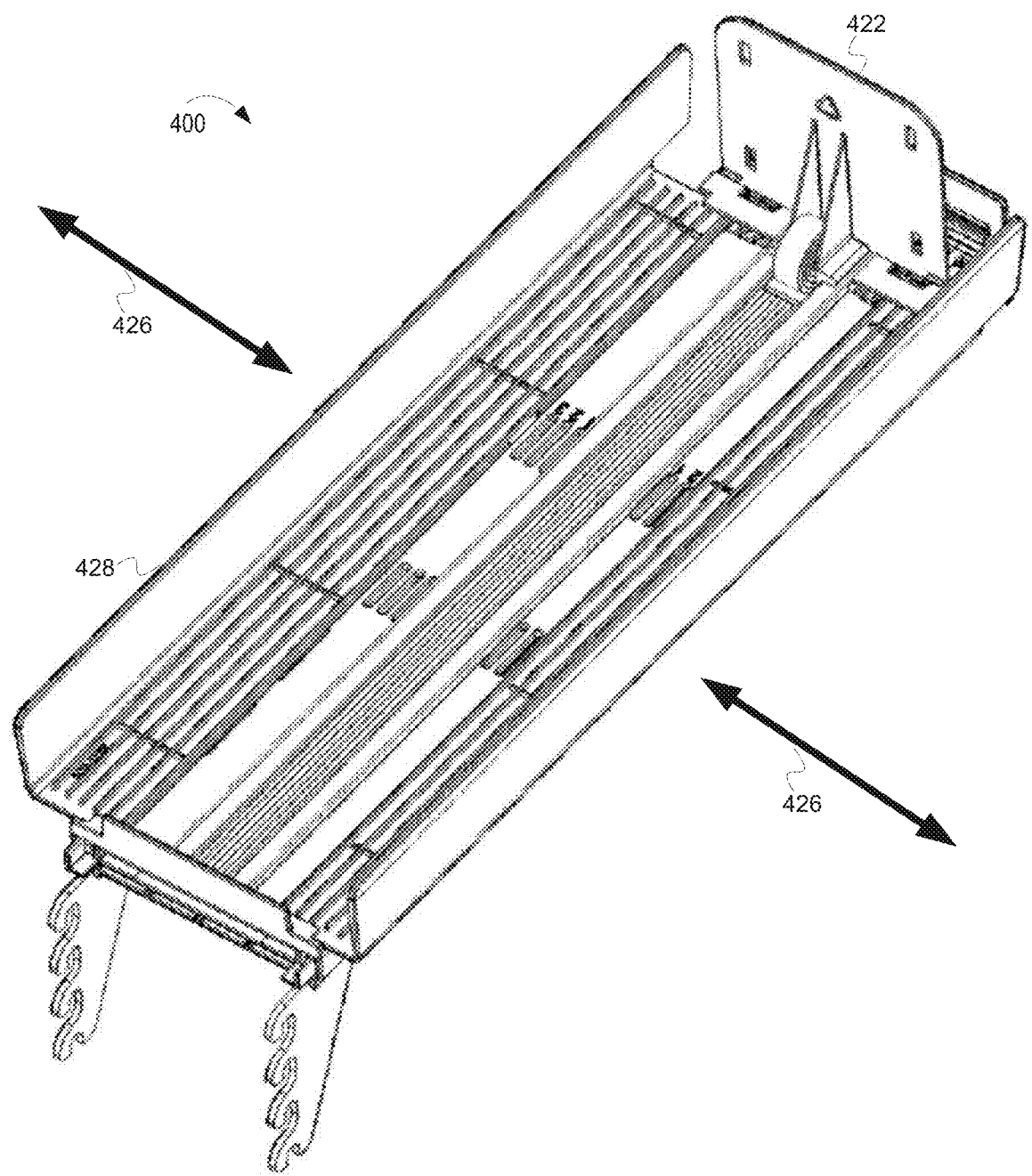
FIG. 4A is a perspective view of another product display merchandiser in accordance with embodiments of the invention taken from above and behind the merchandiser (or the right rear corner of the unit) and illustrating an alternate baseless tray or drawer type merchandiser design with an alternate manner for adjusting the side members or wings of the unit to adjust width of the merchandiser and an alternate means for securing the tray in the first, retracted position so as to avoid inadvertent movement of the merchandiser to the second, extended position (note: the left side member or wing is adjusted to a wider position than the right side member or wing simply to show that the merchandiser does not have to be setup symmetrically if desired).
Figure 4B:
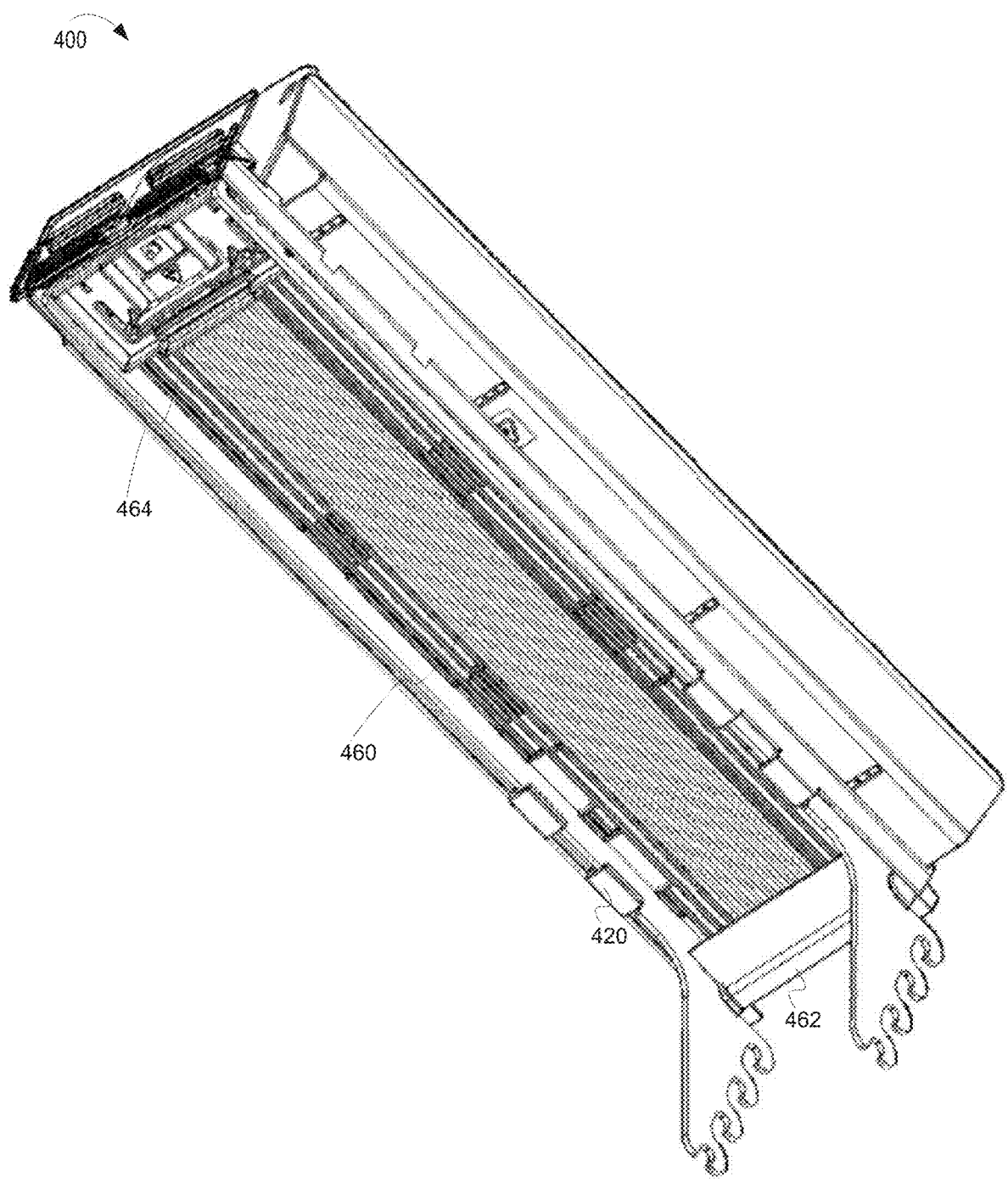
FIG. 4B is a perspective view of the merchandiser of FIG. 4A taken from below and in front of the merchandiser (or the lower left front corner of the unit) and illustrating the alternate rear stabilizer and adjustable width mechanism of the merchandiser.
Figure 4C:
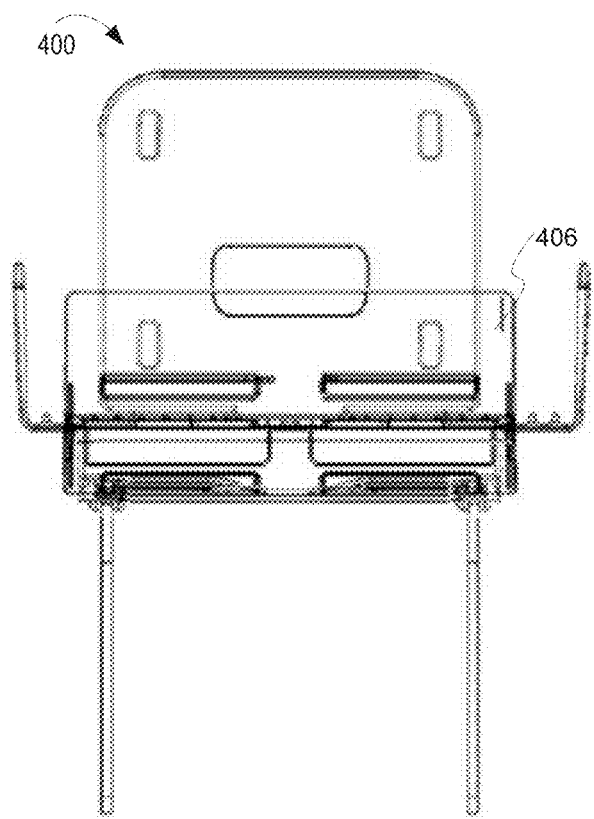
FIG. 4C-D are front elevation and rear elevation views of the product display merchandiser of FIGS. 4A-B again illustrating how the width of the left side member or wing has been adjusted more than the right (or the left side member has been displaced further from the center of the merchandiser or from a central axis running through the center of the merchandiser than the right side member is from the central axis).
Figure 4D:
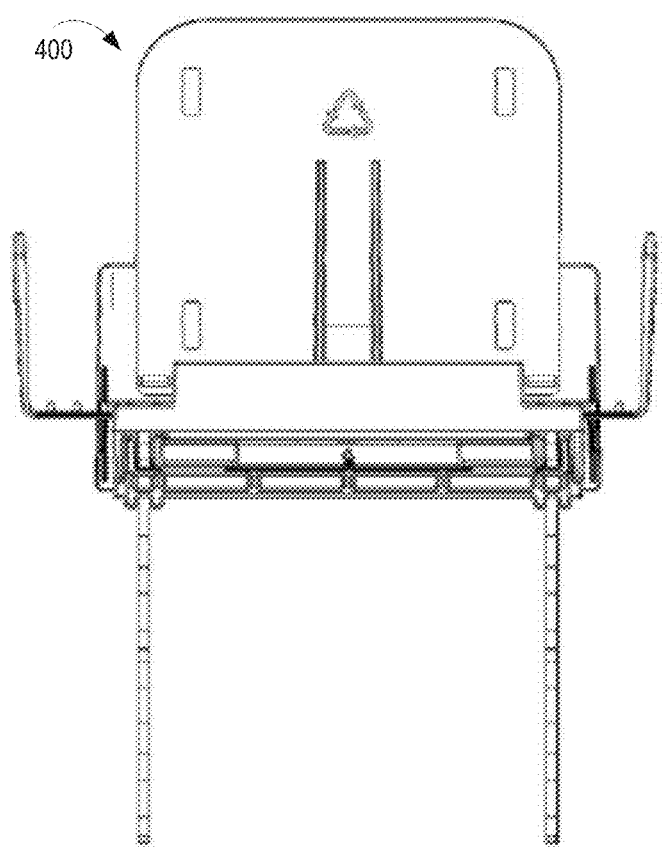
Figure 4E:
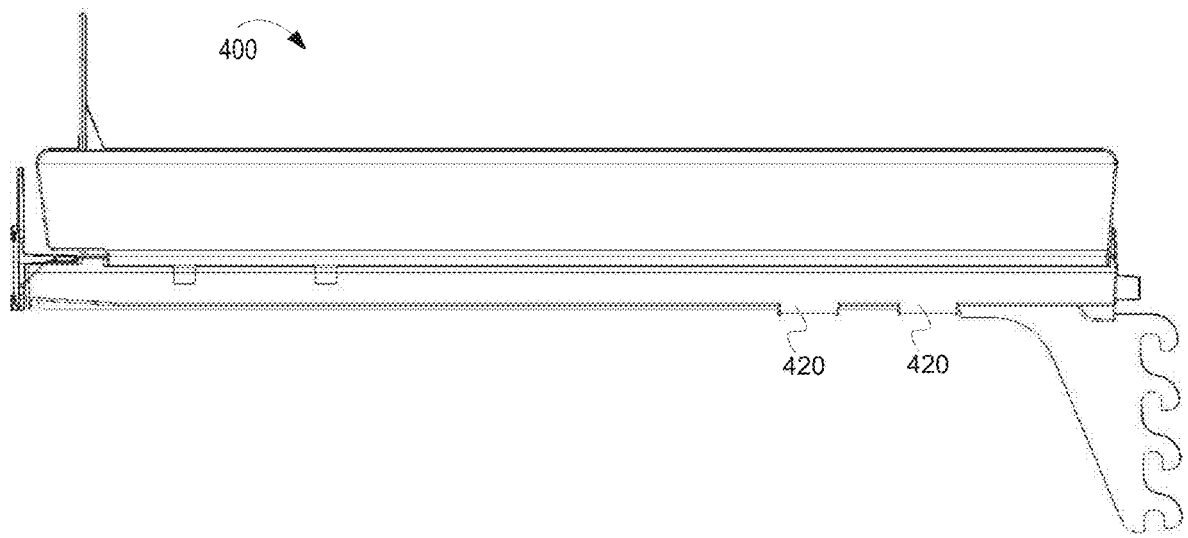
FIGS. 4E, 4F, and 4G are left side elevation, top, and bottom views, respectively of the product display merchandiser of FIGS. 4A-D illustrating the merchandiser in the same first, retracted or closed position the merchandiser is illustrated in for FIGS. 4A-D.
Figure 4F:
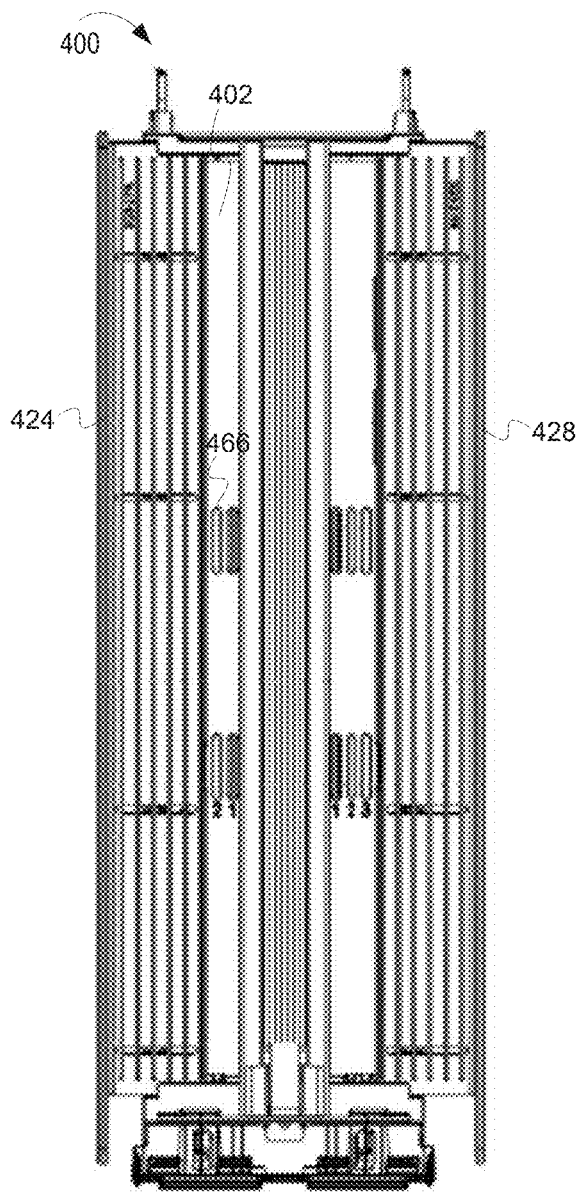
Figure 4G:
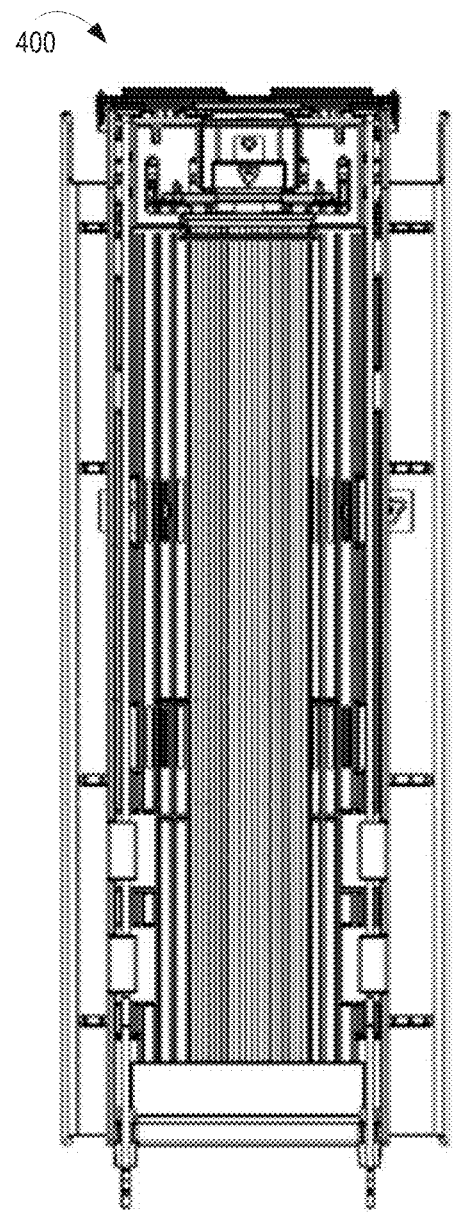
Figure 4H:
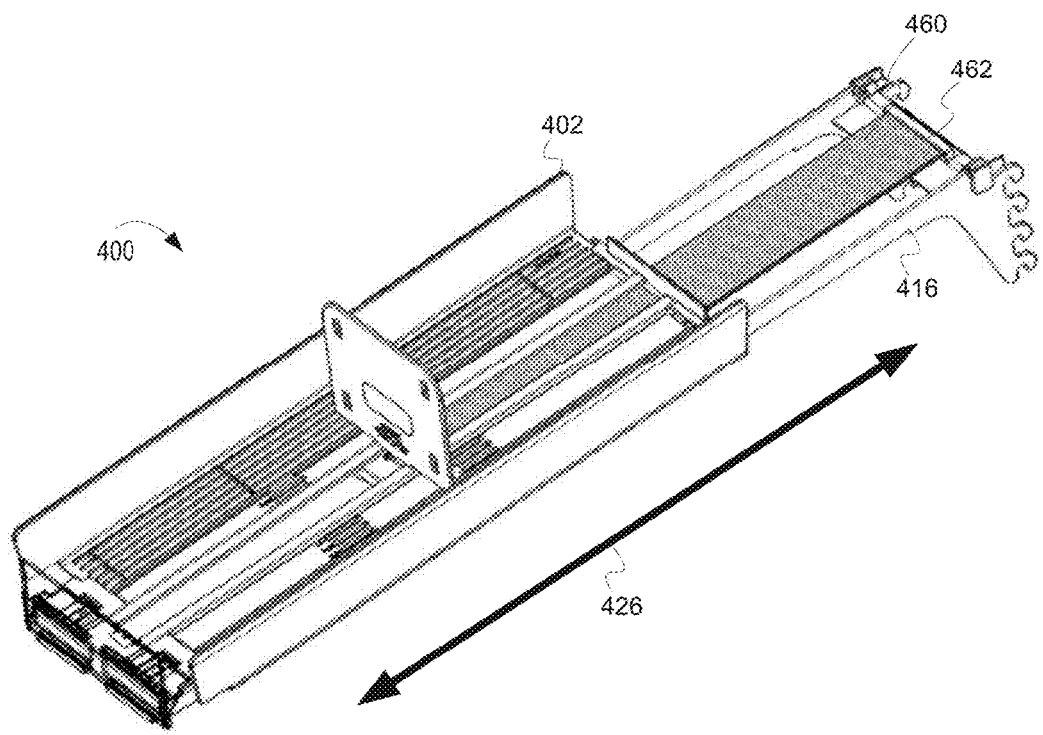
FIGS. 4H and 4I are alternate perspective and left side elevation views, respectively, of the merchandiser of FIGS. 4A-G illustrating the merchandiser in a second, extended or open position which a store associate may place the merchandiser in for stocking or restocking purposes.
Figure 4I:
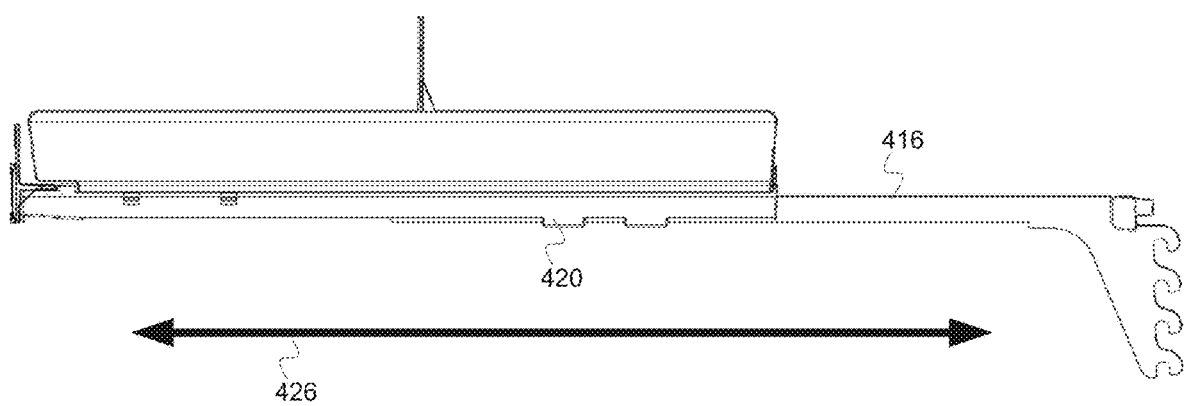
Figure 4J:
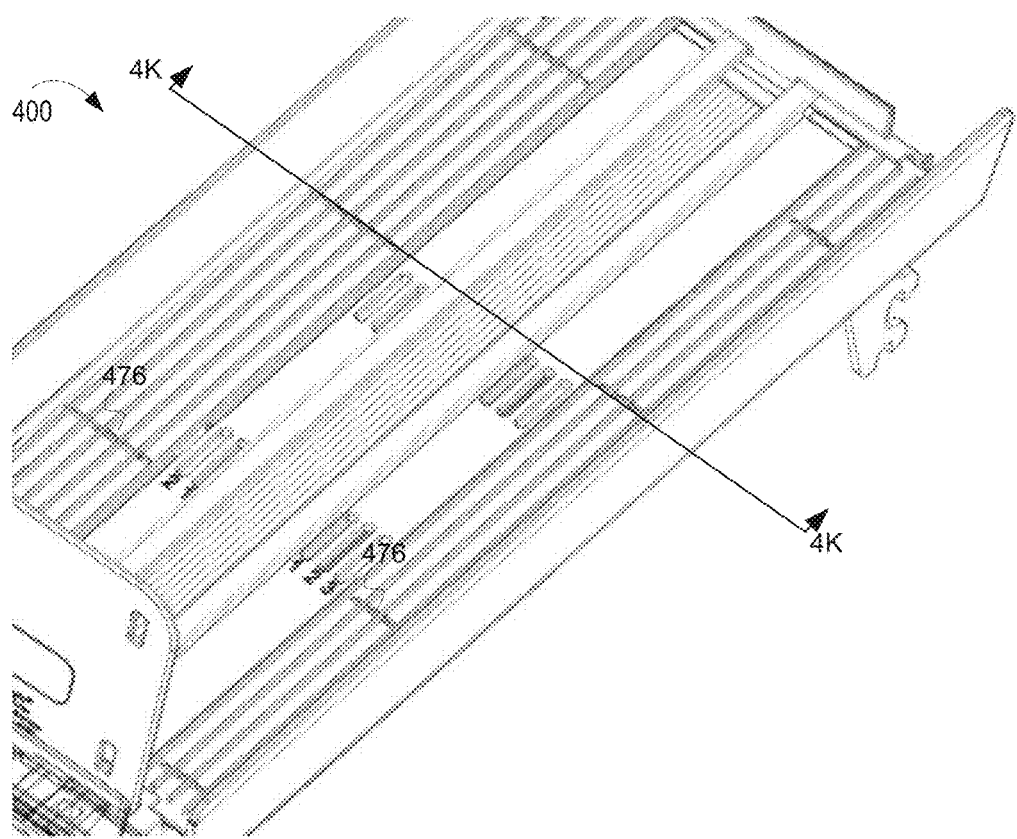
FIG. 4J is an enlarged, partial perspective view of the tray portion of the merchandiser of FIGS. 4A-4I illustrating how the width of the side members may be adjusted and how a user may keep track of same (again noting the left side member is illustrated as being adjusted to a wider position than the right side member).
Figure 4K:
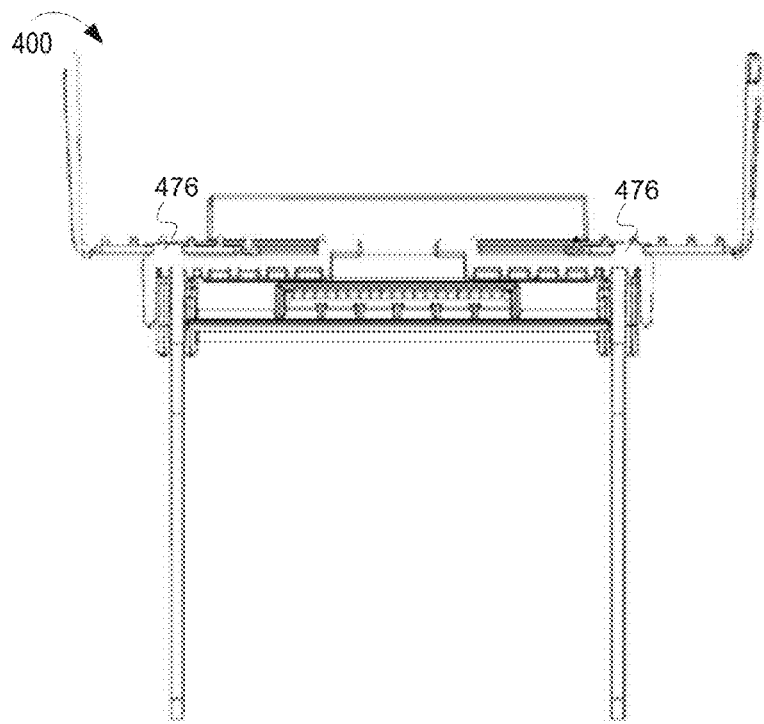
FIG. 4K is a cross-section of the merchandiser of FIG. 4J taken along line 4K-4K.
Figure 4L:
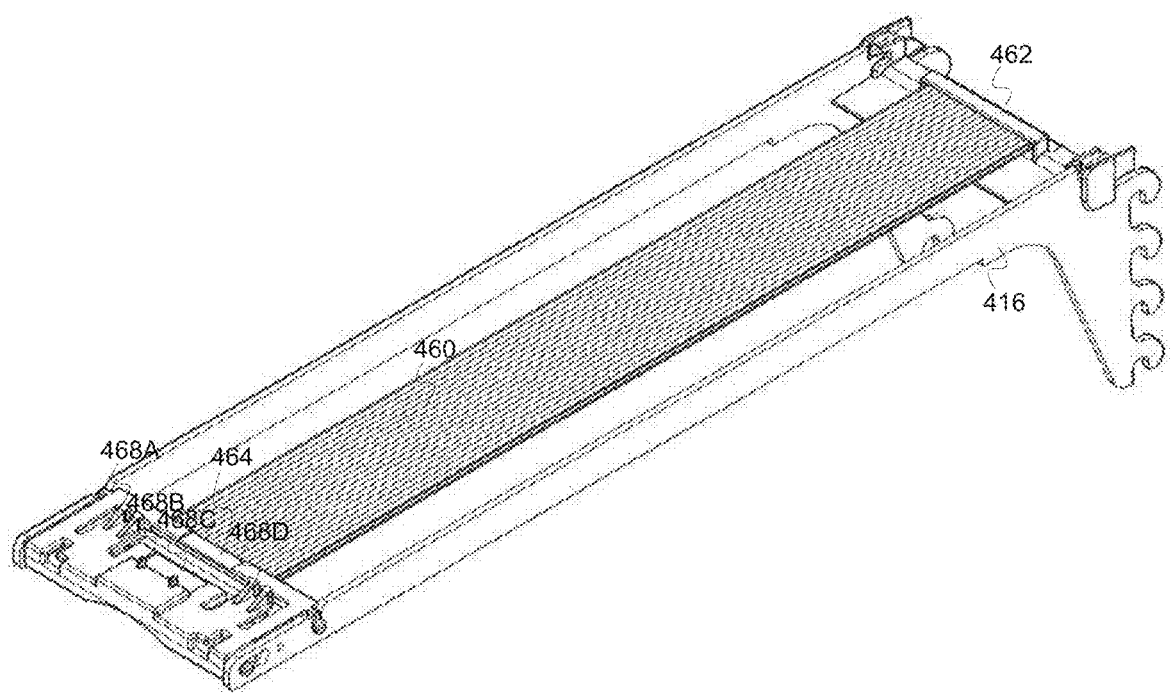
FIG. 4L is a partial perspective view of only a portion of the merchandiser of FIGS. 4A-4K illustrating the support brackets, first and second stabilizing members and a baffle structure for directing air from a rear of the merchandiser toward the front of the merchandiser and, thus, from the rear of any open-air refrigeration unit the merchandiser may be installed in toward the front of the open air refrigeration unit in order to assist in keeping product within the refrigeration unit at a generally uniform temperature. The front stabilizer also having a first mating structure for engaging a portion of the remainder of the merchandiser unit in order to retain the unit in the retracted position and/or prevent inadvertent movement of the merchandising unit to the second, extended position.
Figure 4M:
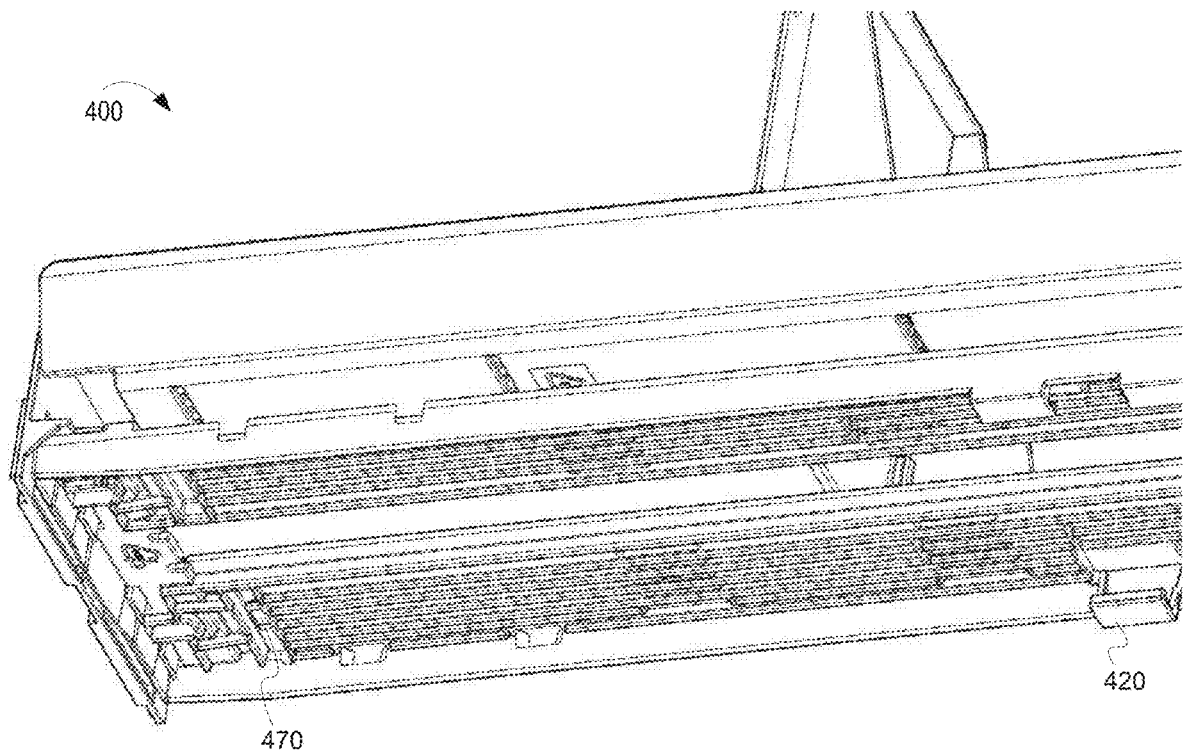
FIG. 4M is a partial perspective view of only a portion of the merchandiser of FIGS. 4A-4K illustrating second mating structures for engaging with the first mating structures of the merchandiser portions of FIG. 4L in order to retain the merchandising unit in the retracted position and/or to prevent inadvertent movement of the merchandising unit to the second, extended position.
Figure 4N:
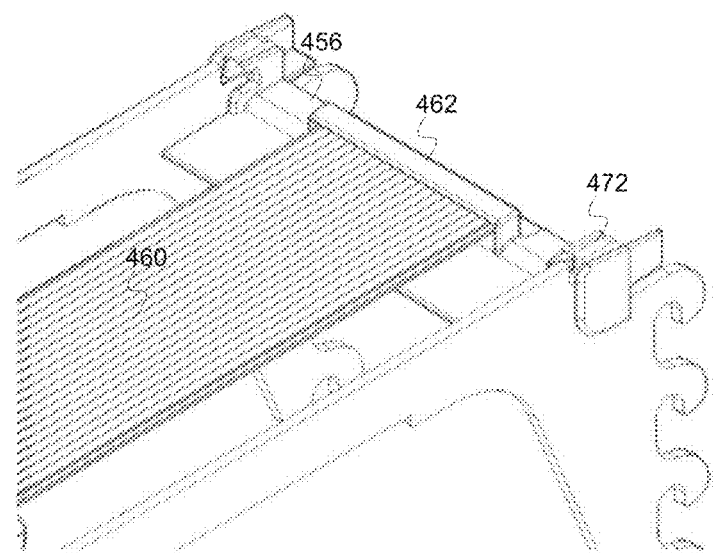
FIGS. 4N, 4O, and 4P are partial perspective views of the stabilizer located at the rear portion of the merchandiser of FIG. 4L illustrating from the front (FIG. 4N) and rear (FIG. 4O) how the baffle is inserted into or nested within the rear stabilizer and how the rear stabilizer is connected to the side members, and further illustrating in FIG. 4P what the rear stabilizer looks like when removed from the merchandiser.
Figure 4O:
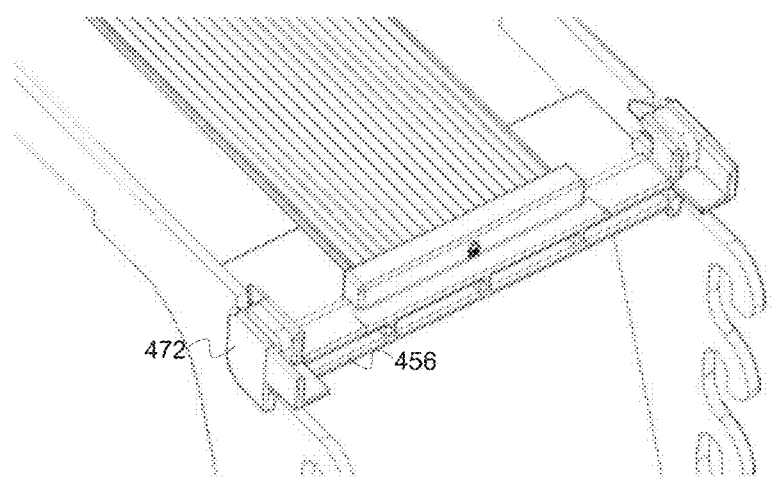
Figure 4P:
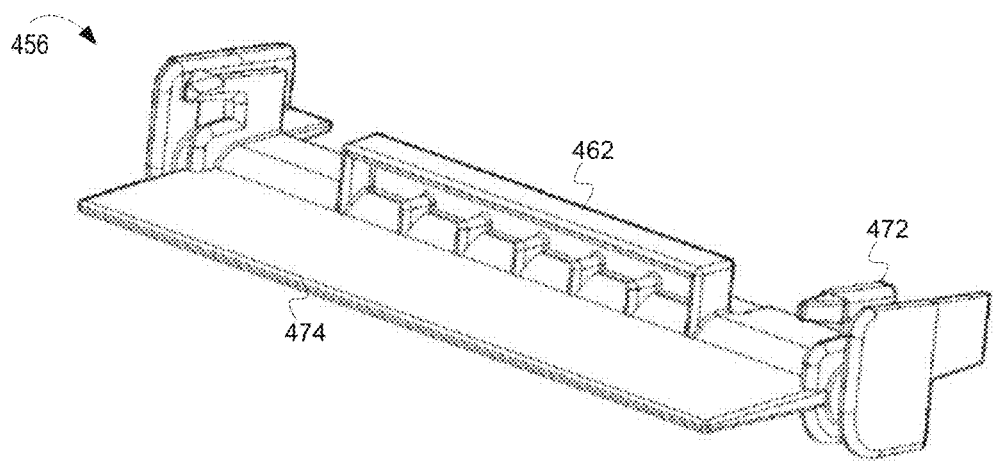
Figure 4Q:
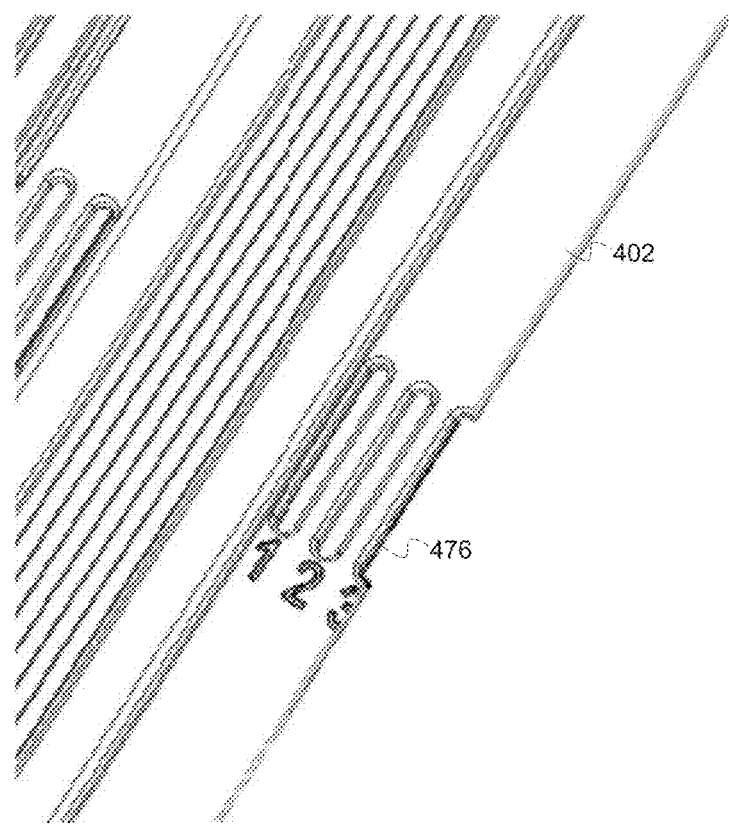
FIGS. 4Q and 4R are partial perspective views of the tray and a side member, respectively, depicted one exemplary mechanism for securing a side member to the tray.
Figure 4R:
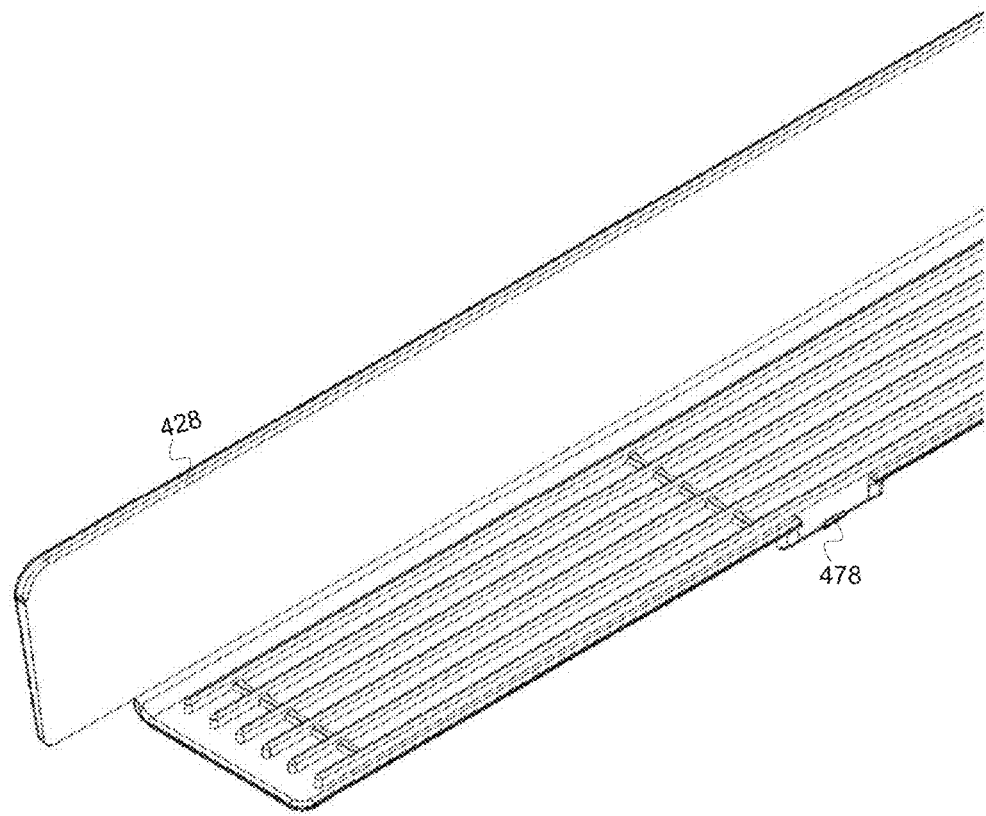

FIGS. 4A-4R depict a fourth embodiment of a product display merchandiser 400 having an extendable tray width. FIG. 4A is an upper perspective view of a fourth embodiment of the product display merchandiser 400 having adjustable side members 428, according to some embodiments of the inventive subject matter. The product display merchandiser 400 depicted in FIG. 4A has one pusher 422 and movable sidewalls 428. The sidewalls 428 are extendable from the tray in directions indicated by arrows 426. Extension of the sidewalls 428 allows for the tray width to be adjusted. The tray also includes first mating members 476 (best shown in FIG. 4Q) into which corresponding protrusions 478 (best shown in FIG. 4R) can seat to secure the sidewalls 428 in an extended position. In some embodiments, a horizontal portion of the sidewalls 428 includes second mating members (e.g., protrusions 478 extending from the horizontal portion of the sidewalls 428, as depicted in FIG. 4R) which fit into the first mating members 476. In some embodiments, the second mating members "snapfit" into the first mating members 476. For example, a person can lift an edge of one of the sidewalls 428 to disengage the second mating members from the first mating members 428. In one form, the sidewalls 428 are secured to the product display by one or more housing members or cords. Such housing members or cords can prevent the sidewalls 428 from becoming completely detached from the product display merchandiser 400 when disengaged. Once disengaged, the person can slide the sidewall 428 in and out until a desired spacing is achieved. Once the desired spacing is achieved, the person can push the sidewall back into place to reengage the second mating members with the first mating members 476 (i.e., snap the first mating members into the second mating members 476). In some embodiments, each of the sidewalls 428 are independently movable. For example, a first of the two sidewalls 428 can be moved, and then a second of the two sidewalls 428 can be moved independently of the first. In other embodiments, the sidewalls 428 can be coupled in such a manner that when one of the two sidewalls 428 is moved, the other of the two sidewalls 428 moves in a corresponding manner.

In some embodiments, the product display merchandiser 400 includes linear guides 476, depicted in FIGS. 4J and 4K. The linear guides 476 help ensure that the sidewalls 428 travel linearly with respect to the product display merchandiser 400 when moved between positions. In one form, the linear guides 476 are protrusions that are seated in recess disposed in a horizontal portion of the sidewalls 428.

Although FIG. 4Q depicts the first mating members 476 as incrementally spaced slots, any suitable mechanism for securing the sidewalls in an extended position may be employed. For example, one continuous aperture extending in a direction parallel to the direction in which the sidewalls 428 extend can be utilized. In such embodiments, any suitable fastener (e.g., a screw and nut combination) can be used to secure the sidewalls in an extended position. For example, a horizontal portion of the sidewalls can include a threaded shaft which protrudes through the continuous aperture. In such embodiments, the sidewall can be secured with a nut fastened to the threaded shaft. Alternatively, the horizontal portion of the sidewall can include an internally threaded aperture and the sidewall can be secured by inserting a screw through continuous aperture into the internally threaded aperture. Although multiple examples are given for the first mating members 476, numerous additionally possibilities exist and are considered within the scope of the teachings herein.

Additionally, although FIG. 4R depicts the second mating members 478 as protrusions and the first mating members as incrementally spaced slots, any suitable combination of second mating members 478 and first mating members 476 can be used. For example, the second mating members 478 can be shaped as pegs and the first mating members 476 can take the form of complementarily apertures in which the pegs can be seated.

FIG. 4B is a lower perspective view of the product display merchandiser 400 depicted in FIG. 4A. As seen in FIG. 4B, the product display merchandiser 400 includes tracks 420

(also well-depicted in FIG. 4M) through which arms 416 extend. The tray 402 is slidable along the arms in a direction as indicated by arrow 426 from a closed position (shown in FIG. 4E) to an open position (shown in FIG. 4I).

FIG. 4B also depicts a baffle 460 inserted on the underside of the product display merchandiser 400 and secured by a rear baffle mount 462 and a front baffle mount 464. The baffle 460 can server many different purposes, depending on a shape of the baffle 460, a material from which the baffle 460 is made, and a position of the baffle 460 within the product display merchandiser 400. For example, the baffle 460 can server to direct airflow through or around the product display merchandiser 400. Additionally, in some forms, the baffle 460 can be removably attached to the product display merchandiser 400 by insertion and removal from the rear baffle mount 462 and the front baffle mount 464.

The arms 416, baffle 460, rear baffle mount 462, front baffle mount 464 are well-depicted in FIG. 4L. FIG. 4L also depicts a first tray engagement mechanism 468A-468D which acts to maintain the tray 402 in the closed position. A second tray engagement mechanism 470 (best shown in FIG. 4M) mates with the first tray engagement mechanism 468A-468D when the tray is in the closed position. In some embodiments, such as those depicted in FIG. 4P, the rear baffle munt 462 and insert support surface 414 are integral to the rear stabilizer 456. Additionally, the rear stabilizer 456 can attach to the arms 416 via stabilizer engagement members 472.

FIGS. 5A-5E depict a fifth embodiment of a product display merchandiser 500 having an alternate manner for adjusting the width of the side members 528, 524 and securing them in position so that they cannot be moved once the merchandiser is stocked with product and installed on a shelf, grid or bar.

Figure 5A:
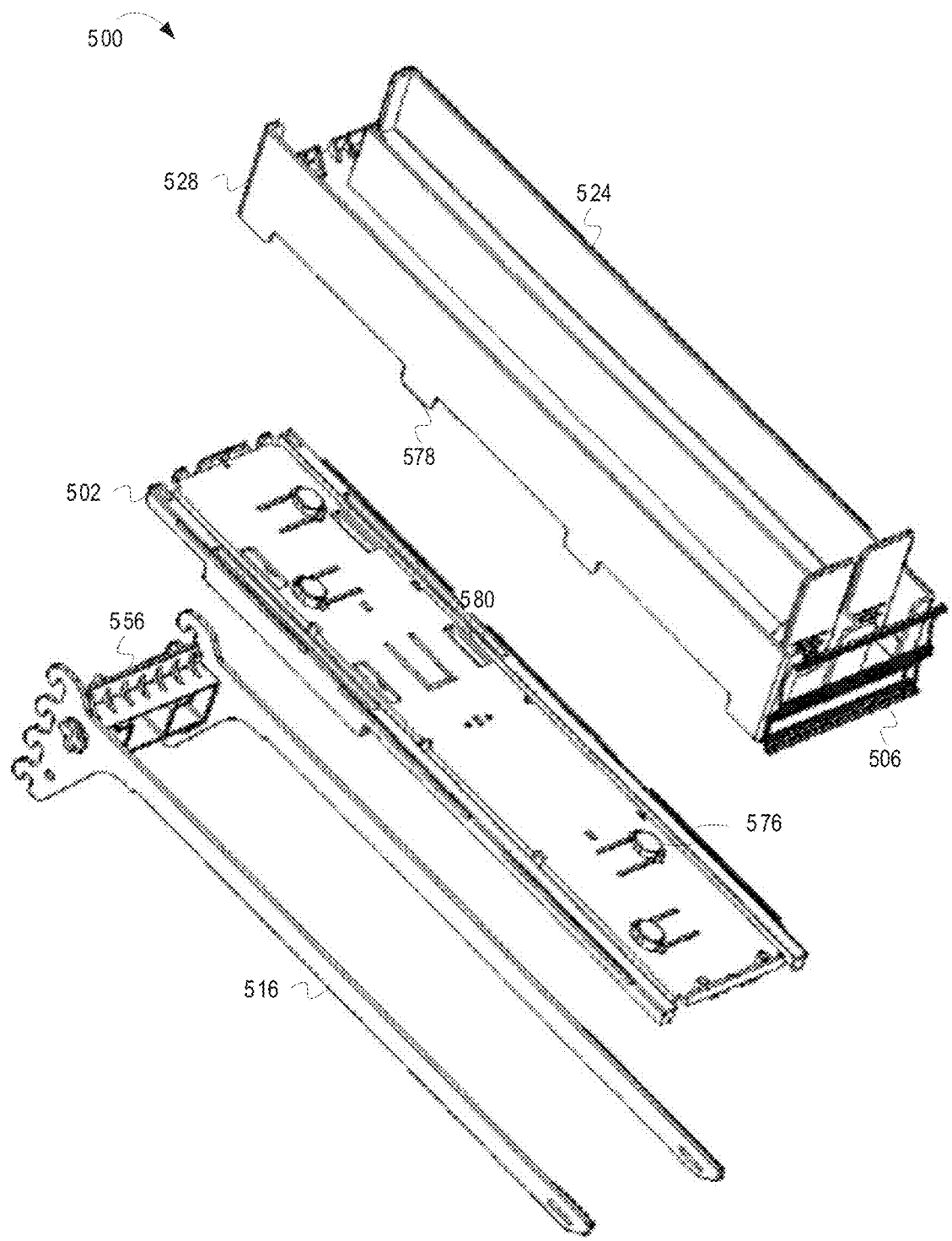
FIG. 5A is an exploded view of another product display merchandiser in accordance with embodiments of the inventive subject matter having an alternate manner for adjusting the side member or wings of the unit to adjust width of the merchandiser.
Figure 5:
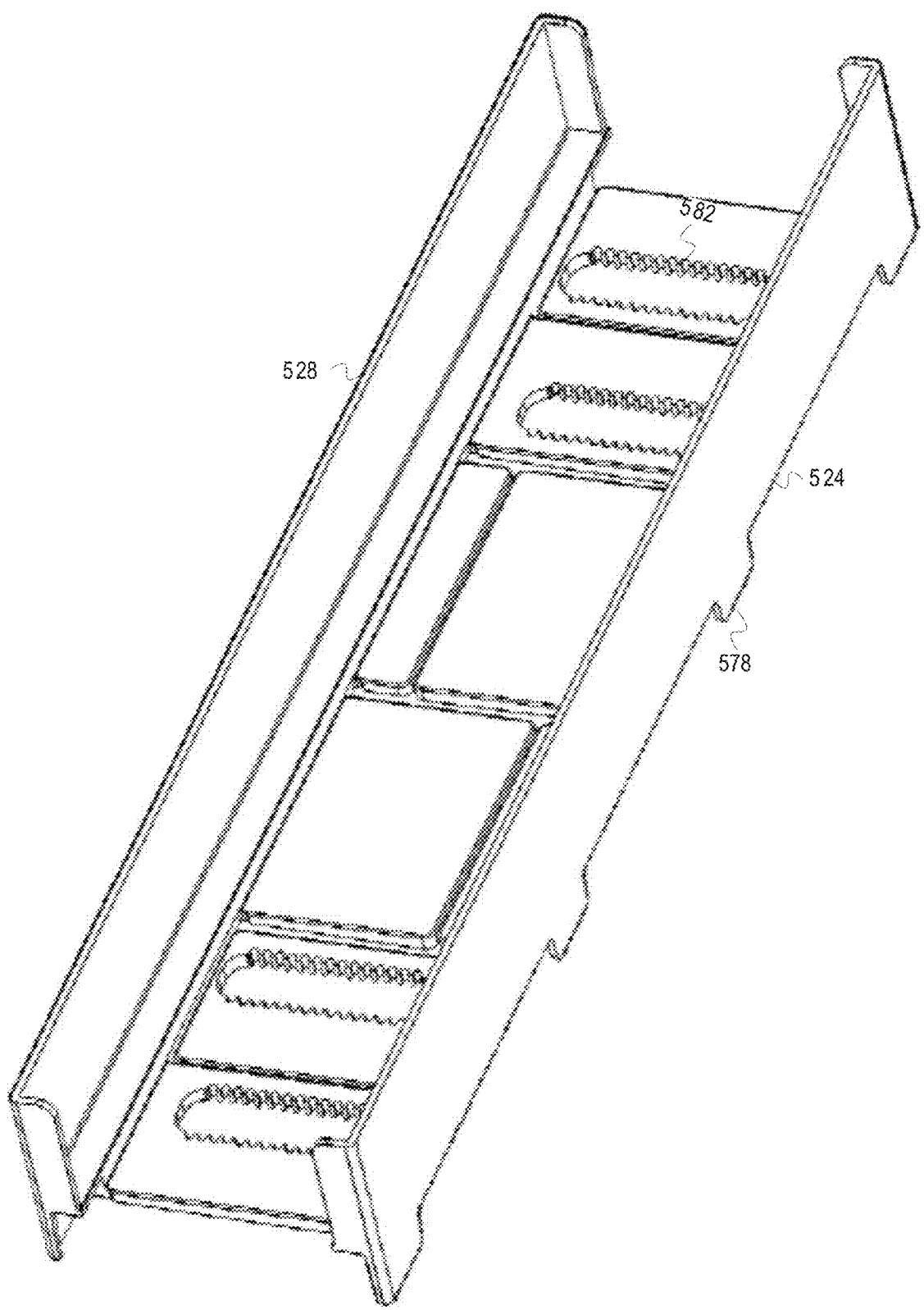
FIGS. 5B and 5C are perspective views of the side members or wings of the product display merchandiser depicted in FIG. 5A.
FIG. 5D is a perspective view of a tray of the product display merchandiser depicted in FIG. 5A.
FIG. 5E is a perspective view of a product display merchandiser with a lens removed.
Figure 6A:
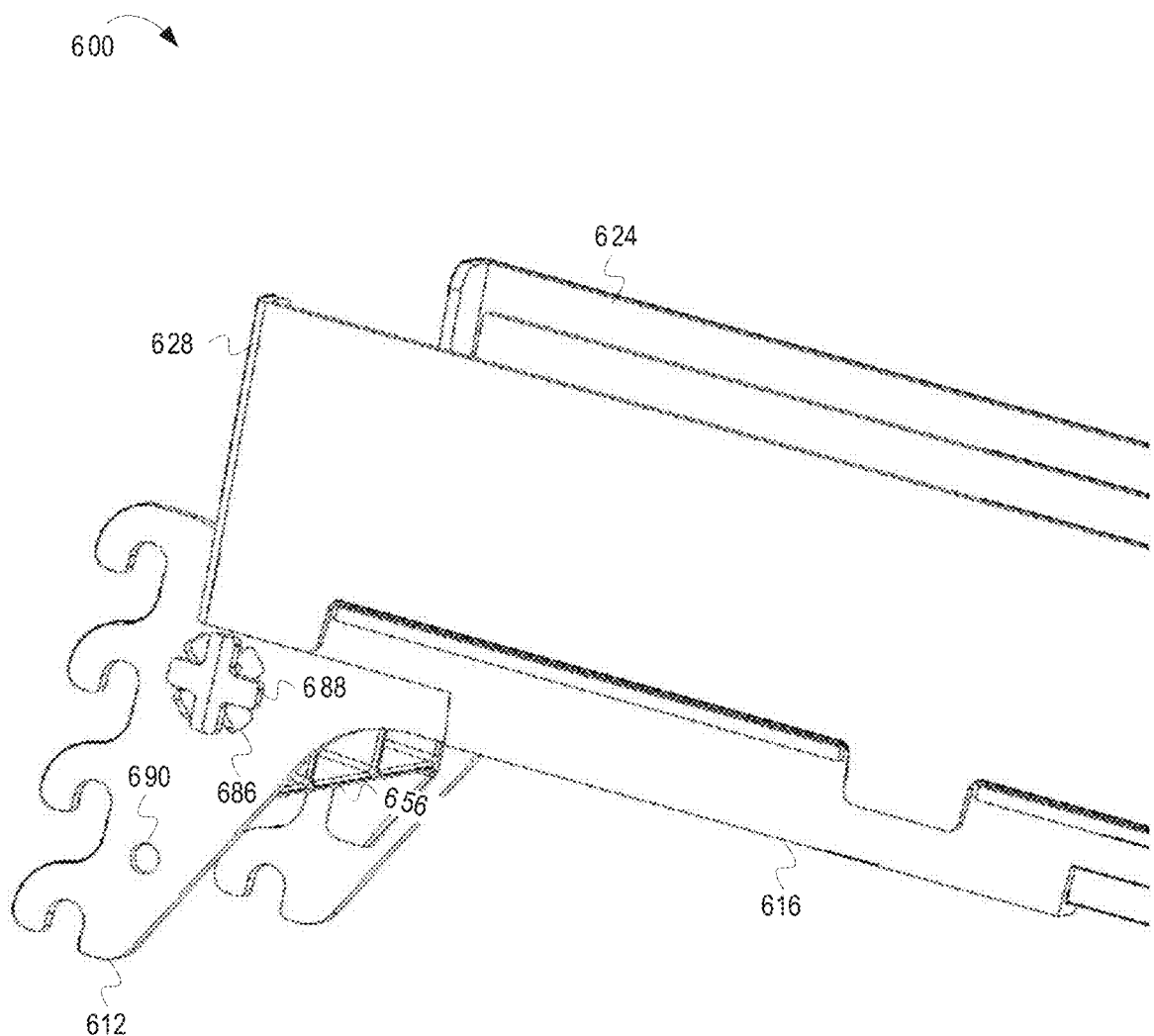
FIG. 6A is a partial perspective view of another product display merchandiser in accordance with embodiments of the inventive subject matter having a mechanism to securely attach a bracket engagement member to a rear stabilizer
Figure 6B:
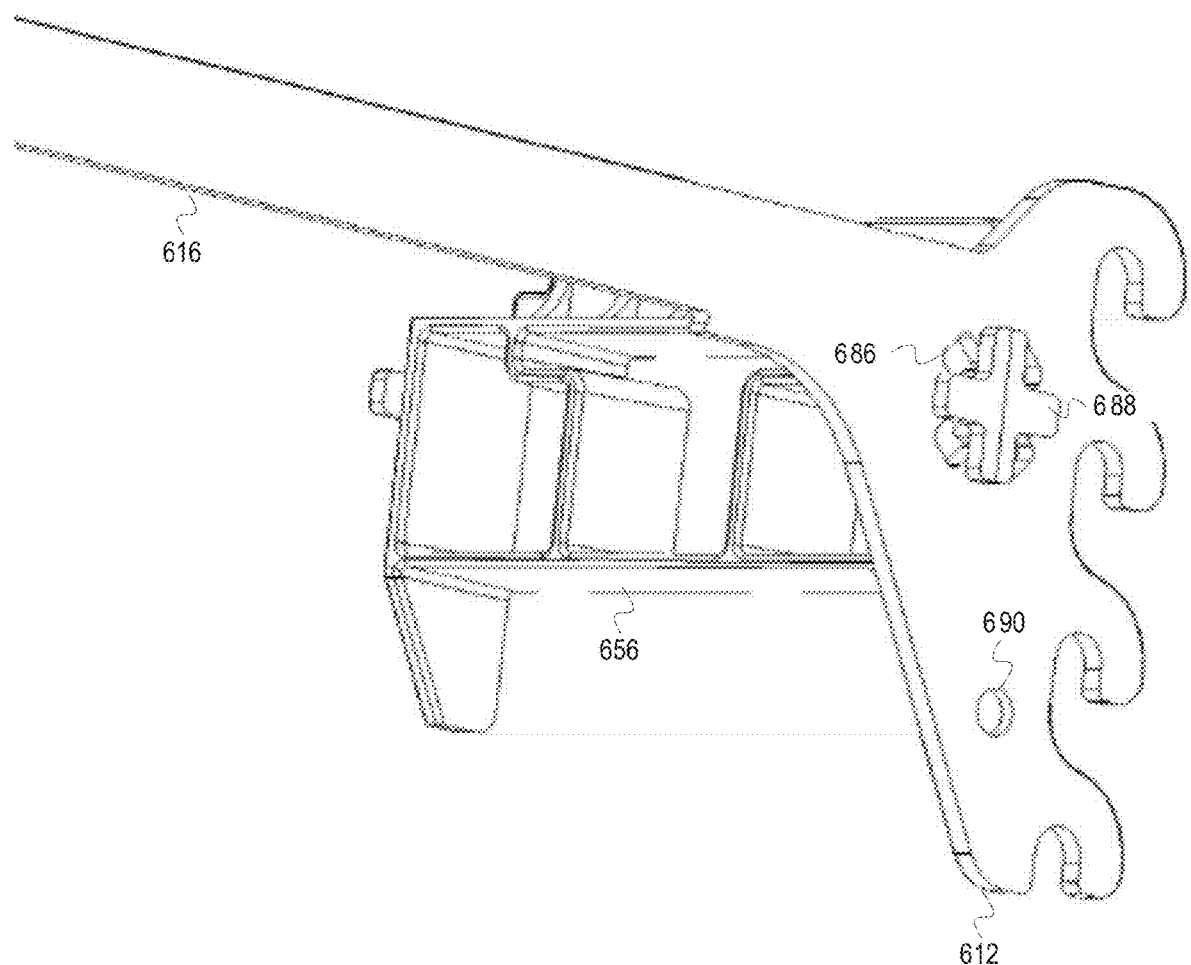
FIG. 6B is an exploded view of the bracket engagement member and rear stabilizer of the product display merchandiser depicted in FIG. 6A.
Figure 6C:
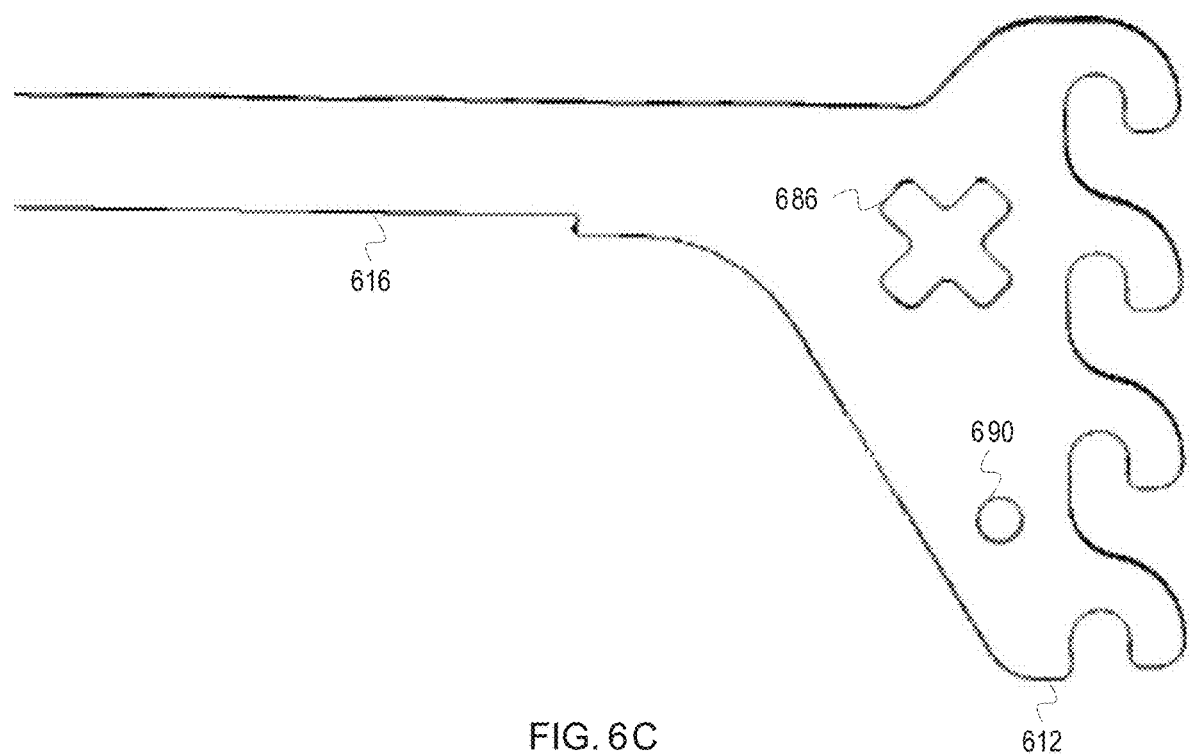
FIG. 6C is an exploded view of the bracket engagement member of the product display merchandiser depicted in FIG. 6A.
Figure 6D:
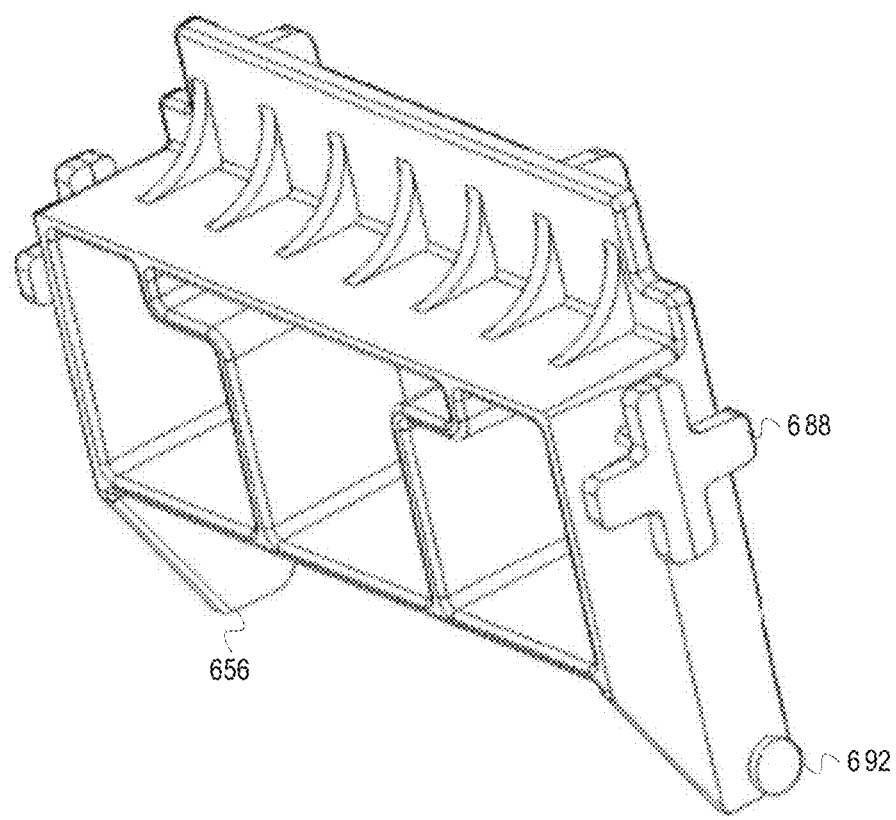
FIG. 6D is an exploded view of the rear stabilizer of the product display merchandiser depicted in FIG. 6A.

The product display merchandiser 500 of FIG. 5A includes a left sidewall 528, a right sidewall 524, a tray 502, arms 516, a removable divider 530, a lens 506, and rear stabilizer 556. The left sidewall 528 and right sidewall 524 are securable to the tray 502. The tray 502 mounts to, and is supported, by the arms 516. In a preferred form, the tray 502 is slidable along the arms 516 to an open or extended position making loading product onto the product display merchandiser 500 easier and in a manner that does not require a separate base structure that the tray slides upon.

The positions of the left sidewall 528 and the right sidewall 524 are adjustable or moveable with respect to the tray 502. Such adjustability or movability allows the distance between the left sidewall 528 and the right sidewall 524 to be adjusted to accommodate products of varying size and dimension.

Figure 5C:
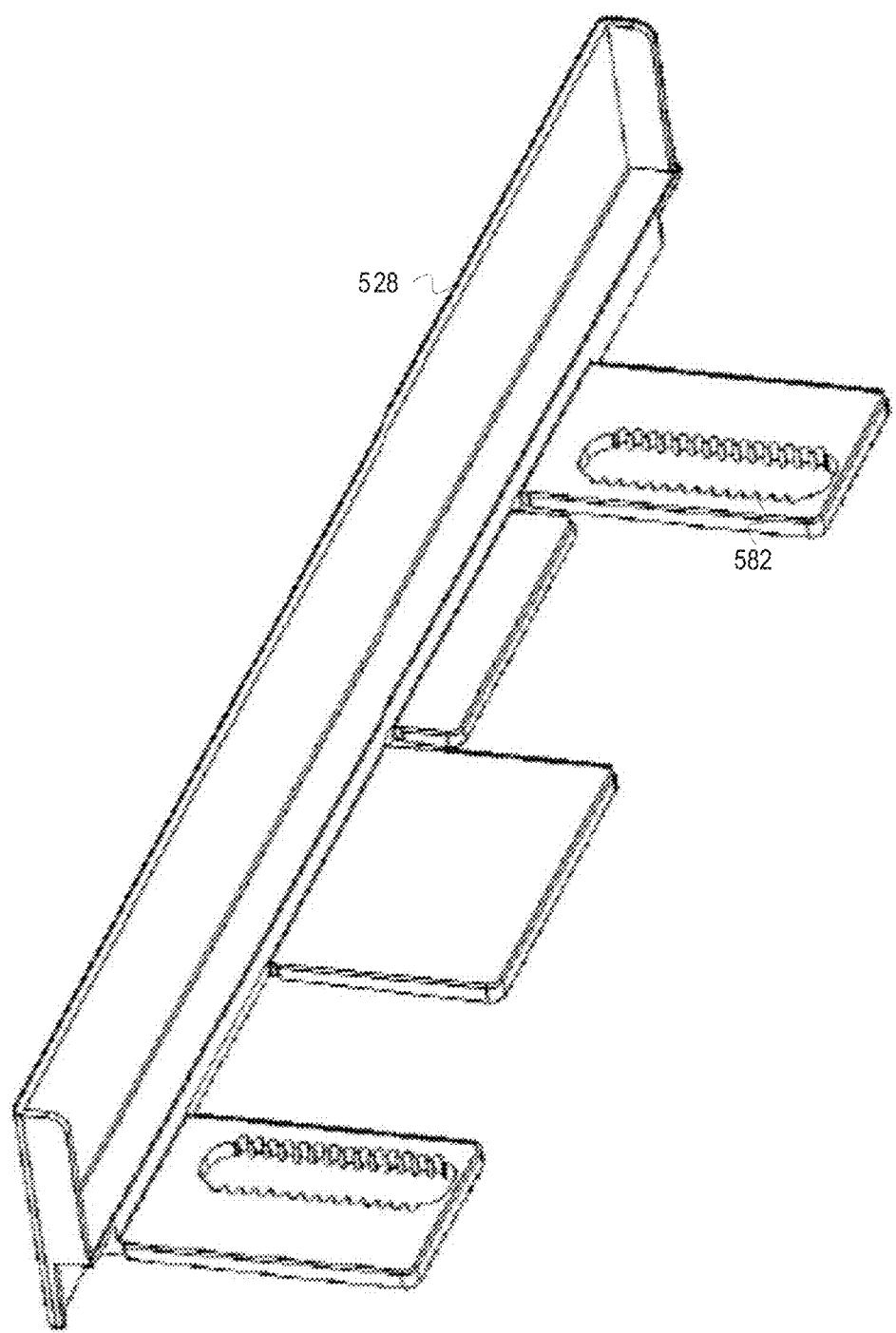
Figure 5D:
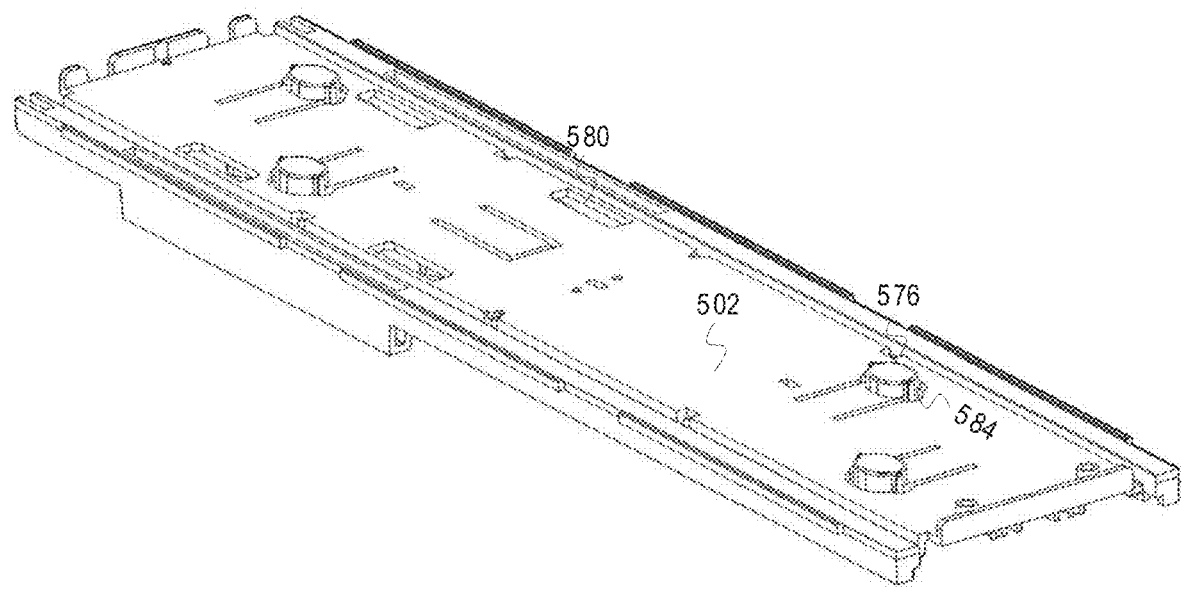

In one form, the left sidewall 528 and right sidewall 524 include tongue engagement portions 582, e.g., grooves, (as shown in FIGS. 5B-5C) that mate with the tongues 576 on the tray 572. Although FIGS. 5A-5E depict the left sidewall 528 and right sidewall 524 as including tongue engagement portions 582, in some embodiments, the tray 502 can include tongue engagement portions or grooves 582 and the left sidewall 528 and the right sidewall 524 can include the tongues 576. In yet other embodiments, the tray 502 may have tongue and tongue engagement portions and the sidewalls 524, 528 may have tongue engagement portions and tongues that correspond with and/or mate with those on the tray 502. In any of these embodiments, the tongues 576 mate with the tongue engagement portions or grooves 582 to secure the left sidewall 528 and the right sidewall 524 in a desired positon on tray 502. In the embodiment shown in FIG. 5E, the tongues 576 are formed into the tray 502 and include a raised portion that engages the tongue engagement portions of the left sidewall 528 and the right sidewall 524. The tongues 576 are deformable (e.g., can be pushed from a first, resting position to a second, deformed positon) to disengage from the tongue engagement portions 582 and allow the position of one or more of the left sidewall 528 and the right sidewall 524 to be adjusted.

In one form, the tongues 576 and/or tongue engagement portions 582 can include a mechanism (e.g., an indexing mechanism) that allows movement of the left sidewall 528 and the right sidewall 524 between predefined or predetermined positions. For example, as depicted in FIGS. 5A-5E, the tongues 584 include protrusions 584 (e.g., finger members) that seat within the serrated boundaries of the tongue engagement portions 582. Such embodiments allow for very fine adjustments of the left sidewall 528 and right sidewall 524. Further, if it is desired to set the width of the sidewalls of numerous merchandisers to the same width setting, this can be done by counting which groove or serration the tongue should be set to and simply setting the protrusion to that serration for each sidewall. To assist in this effort, indicia may be added to one or more serrations or grooves in order to make quick adjustments to that setting on one or many merchandisers.

Although FIGS. 5A-5E depict tongues 576 as having protrusions 584 and left sidewall 528 and right sidewall 524 as having tongue engagement portions 582 with serrated boundaries, other mechanisms exist for allowing movement of the left sidewall 538 and the right sidewall 524 between predefined positons, such as those depicted and described in FIG. 4 and the associated text, or any other suitable mechanism. Additionally, in some forms, the left sidewall 528 and right sidewall 524 include sidewall tabs 578 that mate with sidewall tab recesses 580 located on the tray 502 to aid in securing the sidewalls to the tray 502 and ensuring a desired position of the sidewalls is retained. Further, as mentioned above, while various tongue and groove type mating structures may be used to mate the sidewalls to the tray, other types of mating engagements may be used and, of these, they may be alternated so that some appear on both the tray and sidewalls. For example, in some forms, dovetail mating configurations or mortise and tenon mating configurations may be used. In still other forms, other protrusion and mating recess type configurations may be used.

In addition to simply providing adjustability, the mechanism described above also helps to ensure that the left sidewall 528 and right sidewall 524 will remain in desired positions after the width of the product display merchandiser 500 has been set. For example, to adjust the position of the left sidewall 528 and the right sidewall 524 the tongues 576 must be manipulated so that they no longer engage the tongue engagement portions 582. Because the tongues 576 are positioned on the tray 502, the tongues are not easily accessible when the product display merchandiser 500 contains product. Because the tongues 576 are not easily accessible, it is unlikely that they will be manipulated unintentionally (e.g., by an employee, heavy product, a customer, etc.). Consequently, the left sidewall 528 and right sidewall 524 remain in a relatively fixed position until such position is intentionally altered. Additionally, because the position of the left sidewall 528 and the right sidewall 524 is relatively fixed, some embodiments of the inventive subject matter are able to hold and display heavier products, as it is less likely that such products will cause the left sidewall 528 and the right sidewall 524 to move out of position. This is helpful in avoiding the merchandiser from inadvertently being changed by retailer stocking associates or the like after it has been set or configured in the desired manner to display specific products.

Figure 5E:
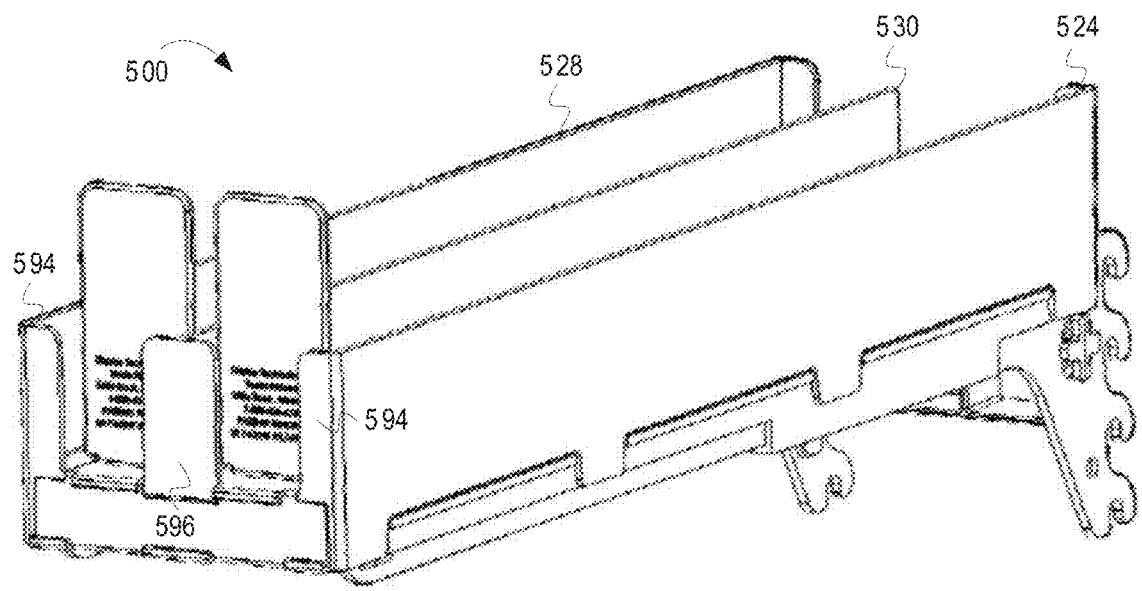

In one form, as depicted in FIG. 5E, the lens 506 of the product display merchandiser 500 may be removable. In such embodiments, the product display merchandiser can include stops, or protrusions, 594, 596. Such stops 594, 596 can prevent product from falling out of the product display merchandiser 500 when the lens 506 is removed. The stops 594 can be integral to the tray 502 or left sidewall 528 and right sidewall 524. The stop 596 can be integral to the tray 502 or the center divider 530 (whether or not the center divider is removable). This allows product in certain situations to be advantageously displayed without a lens so that an unobstructed view of the displayed product may be seen by potential consumers.

In the form illustrated in FIGS. 5A-E the wings or side members 528, 524 preferably will define product support surfaces extending inward toward the opposing side member 528, 524 for supporting at least a portion of the displayed product. An example of this product support surface is illustrated in FIG. 5B for the left side member 528. This product support surface runs from the rear of the merchandiser toward the front of the merchandiser and terminates in the protrusions or stops 594, 596. In some forms, the side members 528, 524 preferably form stops or abutting surfaces that limit how close the side members 528, 524 can be moved toward one another. More particularly, the portions of each side member that define the tongue engagement openings or grooves 582 that protrusions or tongue members 584 engage form distal ends that abut the opposing side member 528, 524 to limit the travel of the side members 528, 524 toward one another. In the form illustrated, the side members 528, 524 contain additional protruding members coplanar with the portions that define the tongue engagement openings 582 that further serve as abutment surfaces that limit travel of the side members 528, 524 toward one another. These additional protrusions or protruding members are illustrated for the left side member 528 best in FIG. 5C and are positioned between the portions that define the tongue engagement openings 582.

FIGS. 6A-6D depict a sixth embodiment of a product display merchandiser 600 having a mechanism to securely attach a bracket engagement member 612 to a rear stabilizer 656. The product display merchandiser 600 includes a left sidewall 628, a right sidewall 624, arms 616, a rear stabilizer 656, a tray, and bracket engagement members 612. The arms 616 support the tray and are connected to the rear stabilizer 656 via the bracket engagement members 612. The arms 616 and rear stabilizer 656 connect to the bracket engagement members 612. For example, in one form, the bracket engagement members 612 can be fastened to the rear stabilizer 656. The bracket engagement members 612 engage a vertical support (not shown) such as a bar mounted system or a grid mount system from which the product display merchandiser 600 can hang. In the form illustrated, the bracket engagement members 612 and one arm 616 are formed integral to one another as a metal support arm.

The bracket engagement members 612 include a locking receiver 686 that mates with a locking protrusion 688 located on the rear stabilizer 656. The locking receiver 686 and the locking protrusion 688 mate in such a way as to securely affix the bracket engagement member 612 to the rear stabilizer 656. The locking receiver 686 and the locking protrusion 688 can take any suitable form. For example, the locking receiver 686 can be an aperture through which the locking protrusion 688 extends, a cavity that receives the locking protrusion 688, a clip to which the locking protrusion 688 attaches, etc.

In the example depicted in FIGS. 6A-6D, the locking protrusion 688 is a piece of material that extends from the rear stabilizer 656. The locking protrusion 688 can be integral to the rear stabilizer 656 or a separate piece that is attached to the rear stabilizer 656. The locking receiver 686 can take the form of an aperture located in the bracket engagement member 612. As depicted in the FIGS. 6A-6D, the locking protrusion 688 and the locking receiver 686 are similarly shaped (or correspond in shape) and have a slightly different orientation (e.g., approximately 45° out of alignment). The locking protrusion 688 and the locking receiver 686 can take any suitable shape. In the example depicted in FIGS. 6A-6D, the locking protrusion 688 and the locking receiver 686 are cross-shaped. In such embodiments, the bracket engagement member 612 is placed onto the rear stabilizer 656 in a first position such that the locking receiver 686 and the locking protrusion 688 are oriented in a similar direction. Once the engagement bracket 612 has passed the locking protrusion 688, the bracket engagement member 612 can be rotated to a second position, the second position being a display position for the product display merchandiser 600. Once in the second position, the locking protrusion 688 acts on the bracket engagement member 612 to securely hold the bracket engagement member 612 and the rear stabilizer 656 together. For example the locking receiver 686 may fit behind a larger portion of the locking protrusion 688 in such a manner as to experience a clamping force or camming force between an inner surface of the locking protrusion 688 and the rear stabilizer 656.

In the form illustrated, the protrusions 688 correspond in shape with the locking receiver opening 686 so that the protrusion may be orientated into a position to be inserted into the opening 686. The protrusion 688 further defines a cutout, channel or groove that the locking receiver may be aligned with and then one or both the rear stabilizer 656 and integrated arm 616 and engagement member 612 are moved with respect to each other to securely clamp or fasten the integrated arm 616 and engagement member 612 to one end of the stabilizer 656. The same process is then repeated with the protrusion located on the opposite end of the stabilizer 656. In a preferred form, the cutout, channel or groove, is configured to either cam against the engagement member 612 or form a friction fit with the engagement member 612. Thus, once fully assembled, the three pieces (i.e., rear stabilizer and support arms/engagement members 612 are securely connected to one another to minimize play between each item.

Additionally, in some embodiments, the rear stabilizer 656 can include an alignment protrusion 692 and the bracket engagement member 612 can include a mating alignment recess 690. The alignment protrusion 692 and the alignment recess 690 can be positioned in such a manner as to engage when the bracket engagement member 612 is in the second position. The alignment protrusion 692 and alignment recess 690 can aid in assembly of the product display merchandiser 600 and provide greater stability to the product display merchandiser 600. In a preferred form, the mating alignment recess 690 and protrusion 692 correspond in shape (e.g., both are circular or other curved structures, rectangular or triangular or other polygonal structures, etc.). In addition, while the illustrated rear stabilizer 656 having protrusions 692 on opposing sides of the stabilizer and, thus, the respective engagement members 612 each have a mating recess 690, it should be understood that in alternate forms, only one side of the stabilizer 656 may include a protrusion and only one bracket engagement member 612 will include a mating alignment recess.

Similarly, although FIGS. 6A-6D depict the rear stabilizer 656 as having the locking protrusions 688 and the bracket engagement member as having the locking receiver 686, embodiments are not so limited. For example, in one form, the rear stabilizer 656 can include the locking receiver 686 and the bracket engagement member 612 can include the locking protrusion 688. Similarly, in some embodiments, the bracket engagement member 612 can include the alignment protrusion 692 and the rear stabilizer 656 can include the alignment recess 690. Additionally, although many of the figures (including FIGS. 6A-6D) depict the arm 616 and the bracket engagement member 612 as a single piece, in some embodiments, the arm 616 is separate from, and attachable to, the bracket engagement member 612.

Similarly, while this engagement has been described as requiring the engagement bracket 612 to be moved or rotated, it should be understood that in the illustrated embodiment, the engagement bracket 612 does not have to move, but rather the rear stabilizer 656 could alternatively be moved or, in yet other forms, both could be moved with respect to each other. The point being that via some movement of either the engagement bracket 612 and/or the stabilizer 656, the two items are moved from a first position wherein the two items can be removed from one another or connected to one another, and then be moved to or toward a second position wherein the two items are secured to one another via a clamping or camming force or other fastening engagement. This same procedure can be done for the protrusion 688 extending from the opposite side of the stabilizer and the other integrated engagement bracket and support arm illustrated on the opposite side of the stabilizer 656.

Figure 7A:
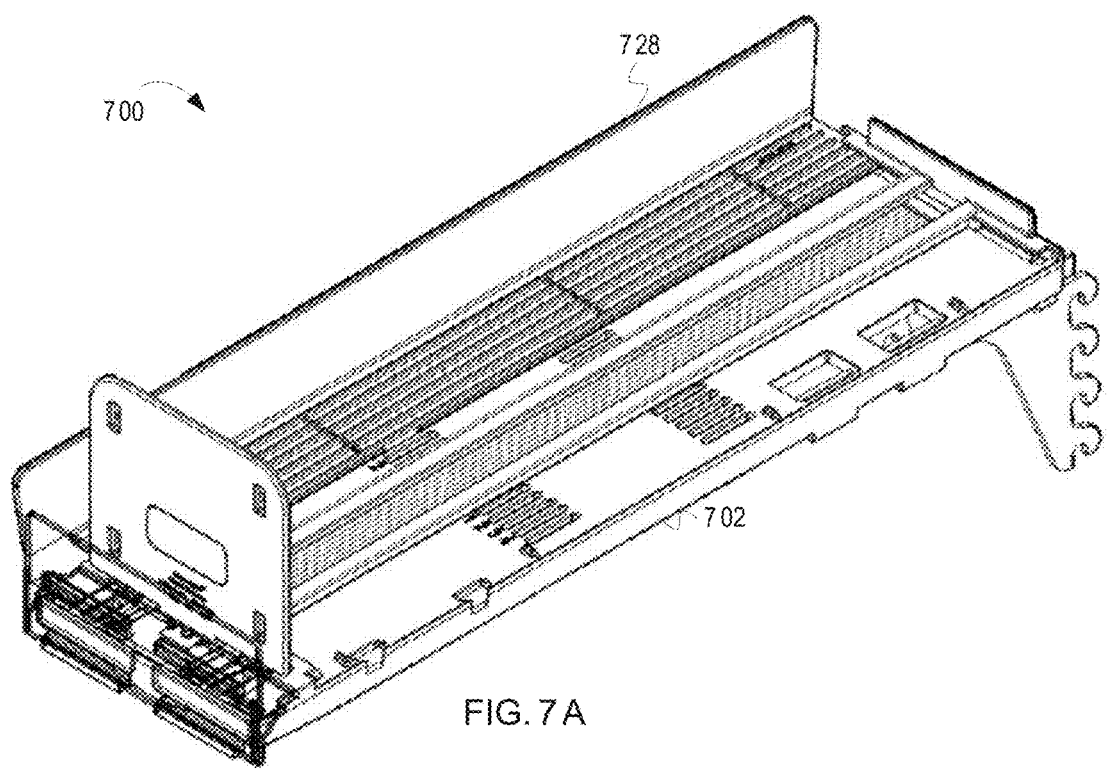
FIG. 7A is a perspective view of another product display merchandiser in accordance with embodiments of the inventive subject matter in which one or more of the product display merchandiser's sidewalls or wings is removable. In some embodiments, such product display merchandisers can be arranged in a linear fashion and a sidewall or wing of an adjacent product display merchandiser can provide support for a product displayed in the product display merchandiser.
Figure 7B:
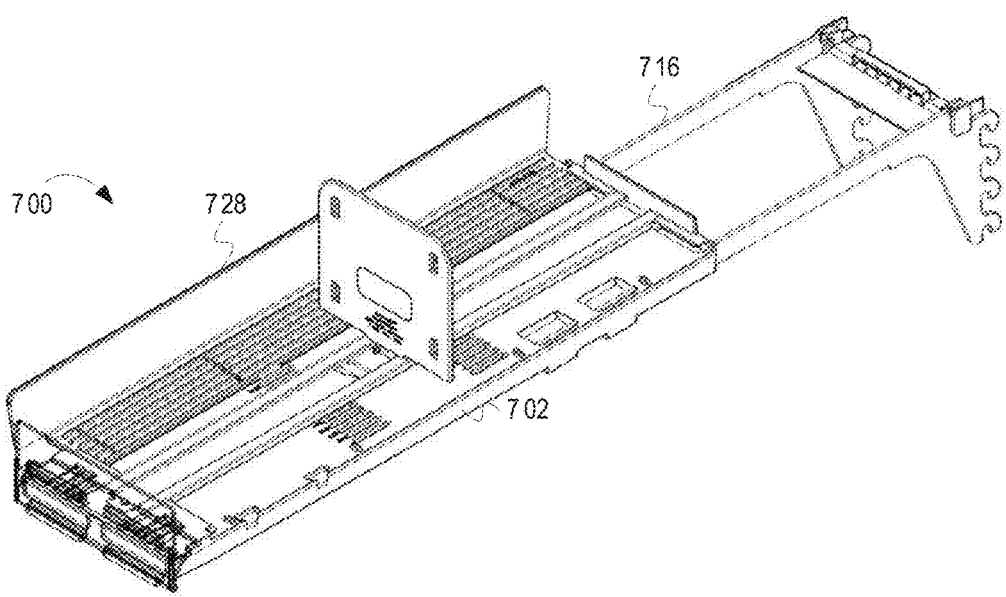
FIG. 7B is a perspective view of the product display merchandiser of FIG. 7A in an extended position in which product can be loaded onto the product display merchandiser from the side.

FIGS. 7A-7B depict a product display merchandiser 700 in which one or more of the product display merchandiser's 700 sidewalls is removable. The product display merchandiser 700 includes a tray 702, a left sidewall 728 attached to the tray 702, an arms 716. The tray 702 is slidable along the arms 716 from a first retracted or closed position (depicted in FIG. 7A) to an open, or extended positon (depicted in FIG. 7B). The product display merchandiser 700 can also include a right sidewall (not shown). In the embodiment depicted in FIGS. 7A-7B, the right sidewall has been removed from the product display merchandiser 700. In such a configuration, two or more product display merchandiser 700 can be mounted adjacent to one another so as to utilize one or more sidewalls of an adjacent product display merchandiser(s). For example, all product display merchandisers 700 in an arrangement of product display merchandisers 700 may have their right sidewalls removed (except for the rightmost product display merchandiser). In such a configuration, product presented in a product display merchandiser 700 will be supported on the left by the left sidewall 728 of the product display merchandiser 700 and on the right by the left sidewall of the right-adjacent product display merchandiser. In such embodiments, the tray 702 and one or more of the left sidewall 728 and the right sidewall can be designed in a complimentary manner such that the tray 702 and the left sidewall 728 and/or right sidewall create a continuous or nearly continuous surface.

Not only does such a configuration allow product display merchandisers 700 to be placed in closer proximity to one another, but also decreases difficulty in loading the product display merchandisers 700. For example, most product display merchandisers have two sidewalls and a base, allowing product stocking to be performed only from above the product display merchandiser (e.g., top loading of the merchandiser). In embodiments in which the product display merchandiser 700 includes sidewalls that are removable, product can be stocked from the side (in addition to from above) (e.g., side loaded vs. top loaded).

Additionally, product display merchandisers that have removable sidewalls can be configured to have interchangeable sidewalls. For example, sidewalls that are different heights, different widths, made of different materials, different shapes, different colors, etc. may be useful for different products or uses. For example, product display merchandisers can be repurposed for different applications or products by changing the removable/interchangeable sidewalls.

Figure 8A:
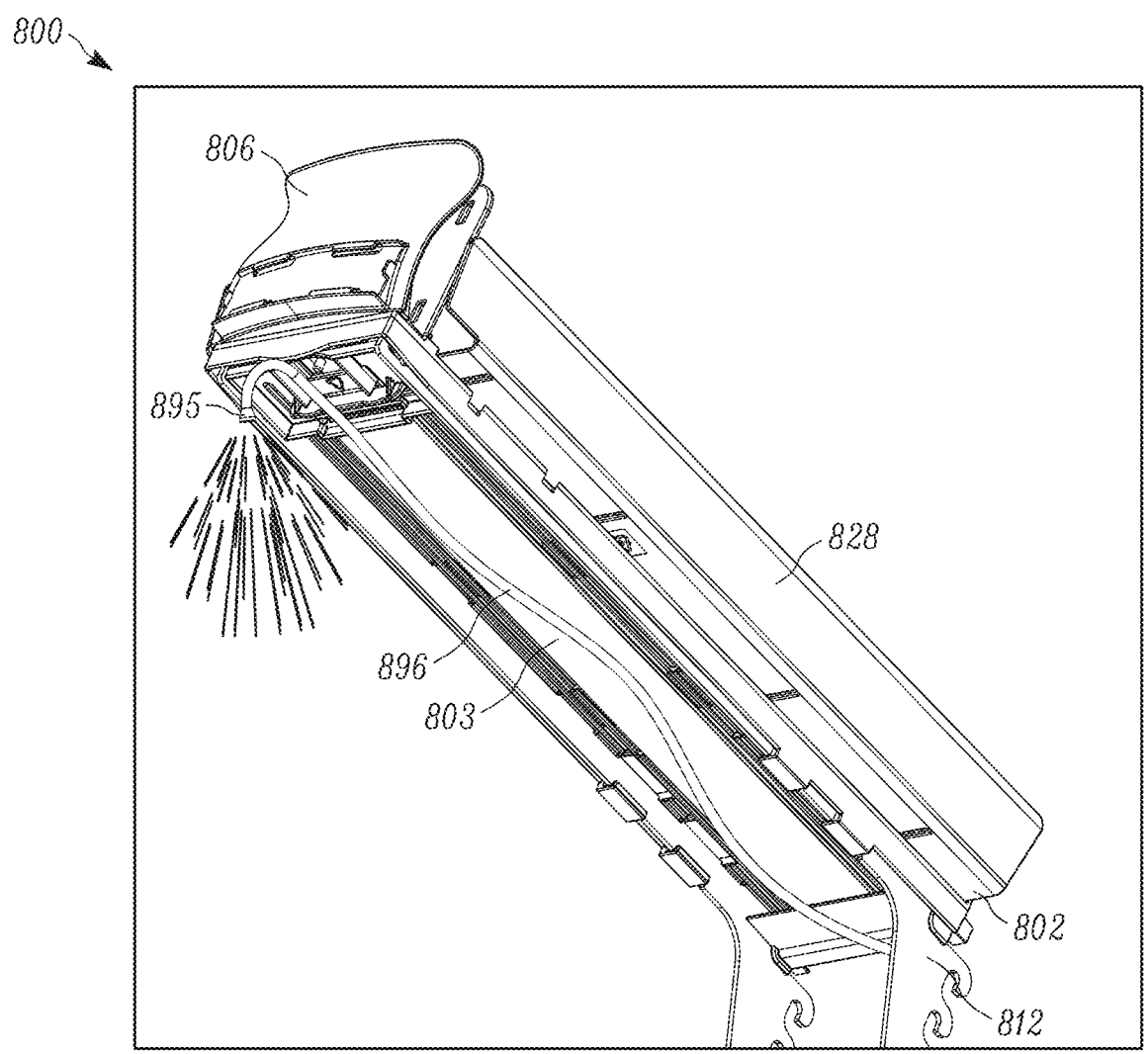
FIGS. 8A-8I are perspective views of alternate illuminated product display merchandisers in accordance with the present invention.
Figure 8B:
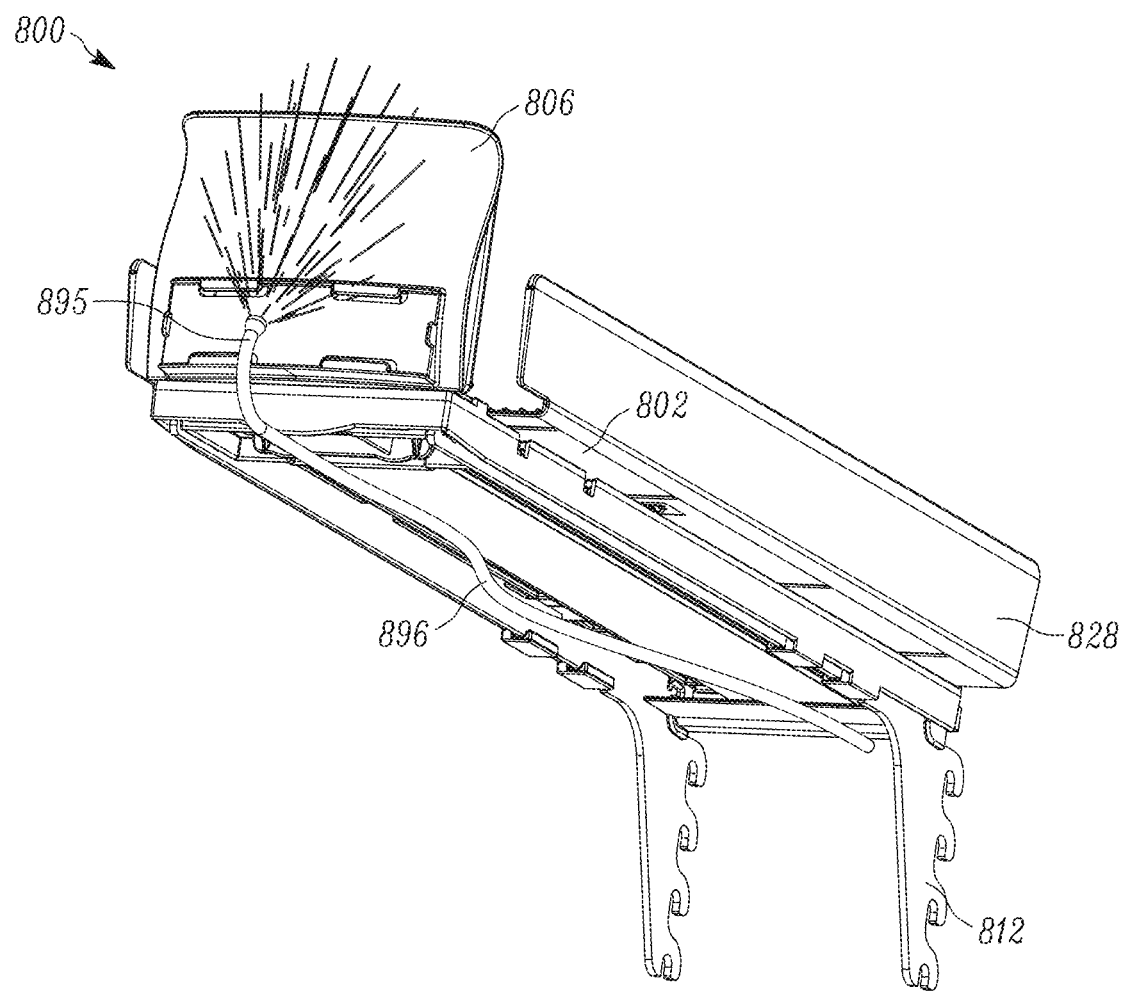

FIGS. 8A-8I depict a series of product display merchandisers 800 with lighting elements 895. The lighting elements 895 are configured to illuminate products held in the product display merchandiser 800 or in one or more adjacent product display merchandisers. FIGS. 8A-8B depict a product display merchandiser 800 wherein the lighting element 895 is a fiber optic light. The fiber optic lighting element 895 extends along the bottom of the product display merchandiser 800 with a distal end near the lens 806. In one form, the fiber optic lighting element 895 is flexible such that it can be oriented to illuminate the products held in a merchandiser below the product display merchandiser 800 (see, FIG. 8A,) or can be oriented to illuminate the products in the product display merchandiser 800 (see, FIG. 8B). The fiber optic lighting element 895 is rigid enough that once bent into a desired orientation it maintains that orientation against standard forces, e.g., gravity. The lighting elements 895 include a cord 896 extending to the rear of the product display merchandiser 800. In some embodiments, the cord is configured to interface with a power channel 897, such as the one shown in FIG. 8I. In alternative embodiments, the cord 896 ends in a plug configured to plug into a standard outlet or socket to receive power for powering the lighting element 895 (such as those conventional sockets utilized by the makers of lighted refrigeration units). The product display merchandiser 800 may include structure to support the cord 896. Exemplary structures include without limitation cord channels, wire ties, wire clamps, adhesive, magnetic strips, hook & loop mating pieces, or others. The structure prevents the cord 896 from sagging down and becoming entangled with products or merchandisers below and/or generally appearing non-presentable (e.g., drooping wires, disorganized or unfinished looking, etc.).

Figure 8C:
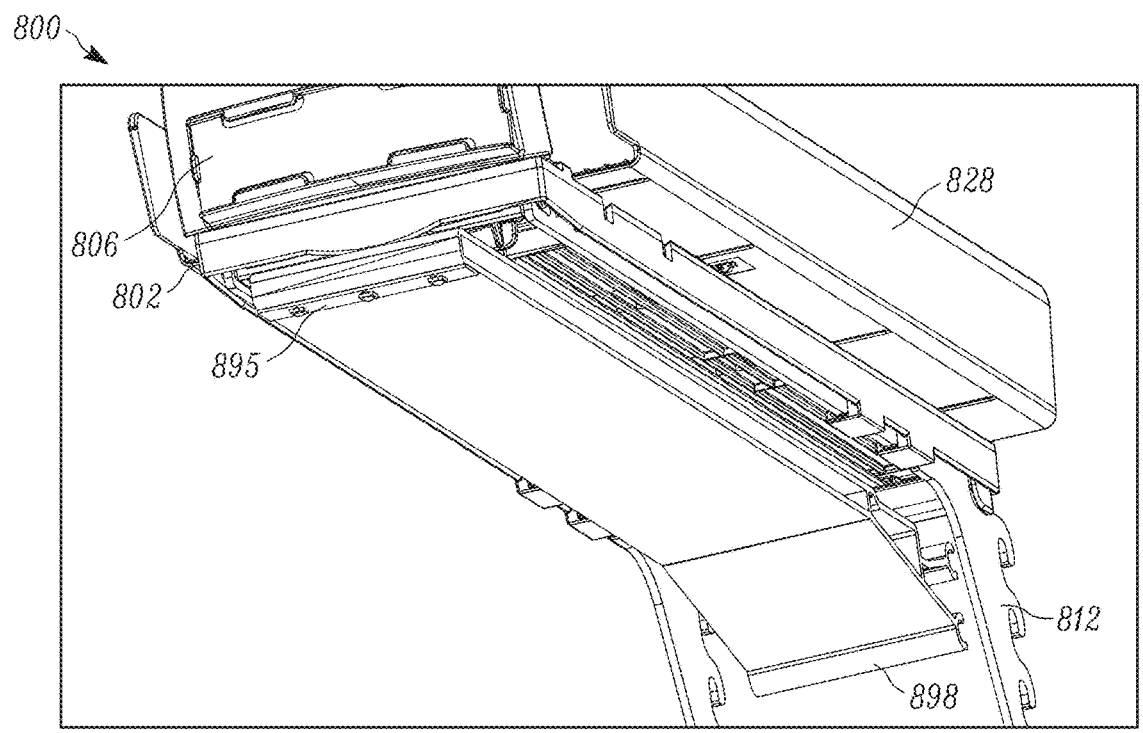
Figure 8D:
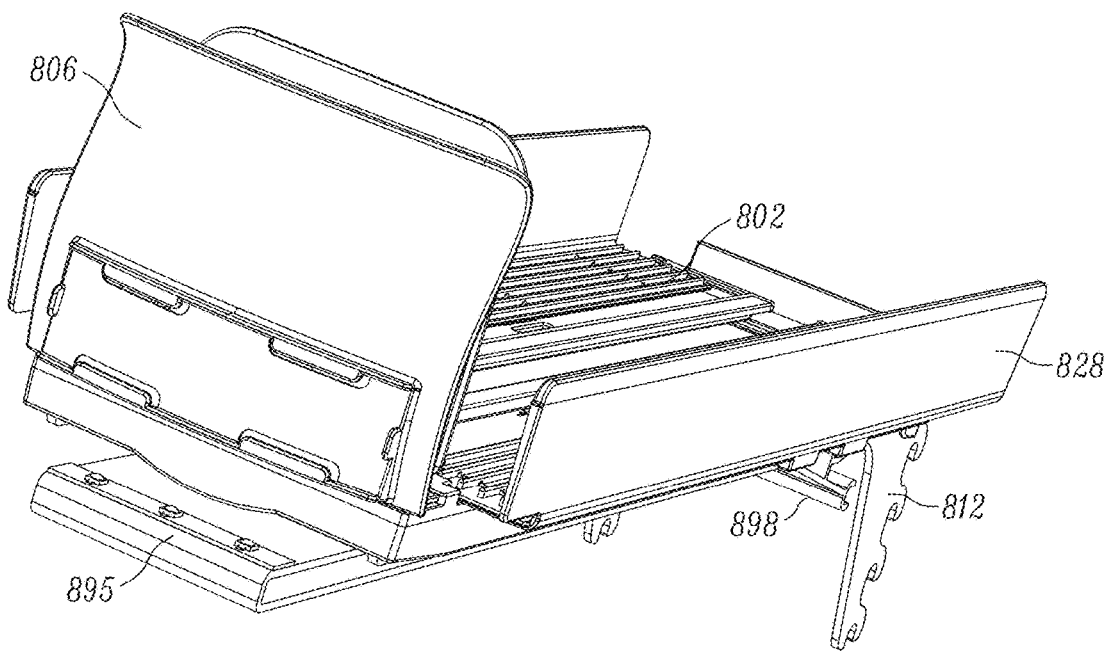

FIGS. 8C-8H depict merchandisers 800 having a lighting element or elements 895 comprising bars or lights, such as LEDs. As with the above embodiments, the lighting elements 895 can be oriented to illuminate products in the product display merchandiser 800 or in adjacent product display merchandisers. In some embodiments, the lighting element 895 is configured to be added to an existing product display merchandiser 800 so that merchandisers can be retrofitted to include lighting elements 895. FIGS. 8C-8D illustrate lighting display elements 895 including attachment brackets 898 configured to mount the lighting element to a grid 801 (see, FIG. 8I). The attachment brackets 898 can be configured to attach to any structure to which the product display merchandiser 800 is configured to attach, such as grids, bars, shelves, etc. In one form, the lighting element 895 extends out past the front of tray 802. This position enables the lighting element 895 to illuminate the front of the front most product and/or the lens and any indicia thereon or therein. FIG. 8C illustrates a downward facing lighting element 895 configured to illuminate the front product and/or lens of a merchandiser directly below the product display merchandiser. FIG. 8D illustrates an upward facing lighting element 895 configured to illuminate the front product of the product display merchandiser 800 and/or its lens. In alternative embodiments, lights are spaced out along the length (extending substantially the entire distance from the mounting brackets 812 to the lens 806) of the lighting element 895 in order to light substantially an entire row of products. In a still further embodiment, the lighting elements 895 extend substantially the entire width of the product display merchandiser 800 (substantially the entire distance between the two sidewalls 828) so as to illuminate multiple columns of products.

In some forms, the lighting elements 895 of FIGS. 8C and 8D are combined such that the lighting element 895 includes both upward facing and downward facing lights. This configuration used on a column of product display merchandisers lights the front of the front most product in the product display merchandisers 800 from both the top and the bottom and/or the lenses for each merchandiser. An additional feature of the lighting element 895 is that it defines a space (e.g., receptacle, duct, interior region, etc.) within which wiring may be disposed and, preferably, hidden out of view from those looking at a product display once the product display merchandisers 800 have been installed (e.g., connected to a grid, bar, shelf, etc.).

Figure 8E:
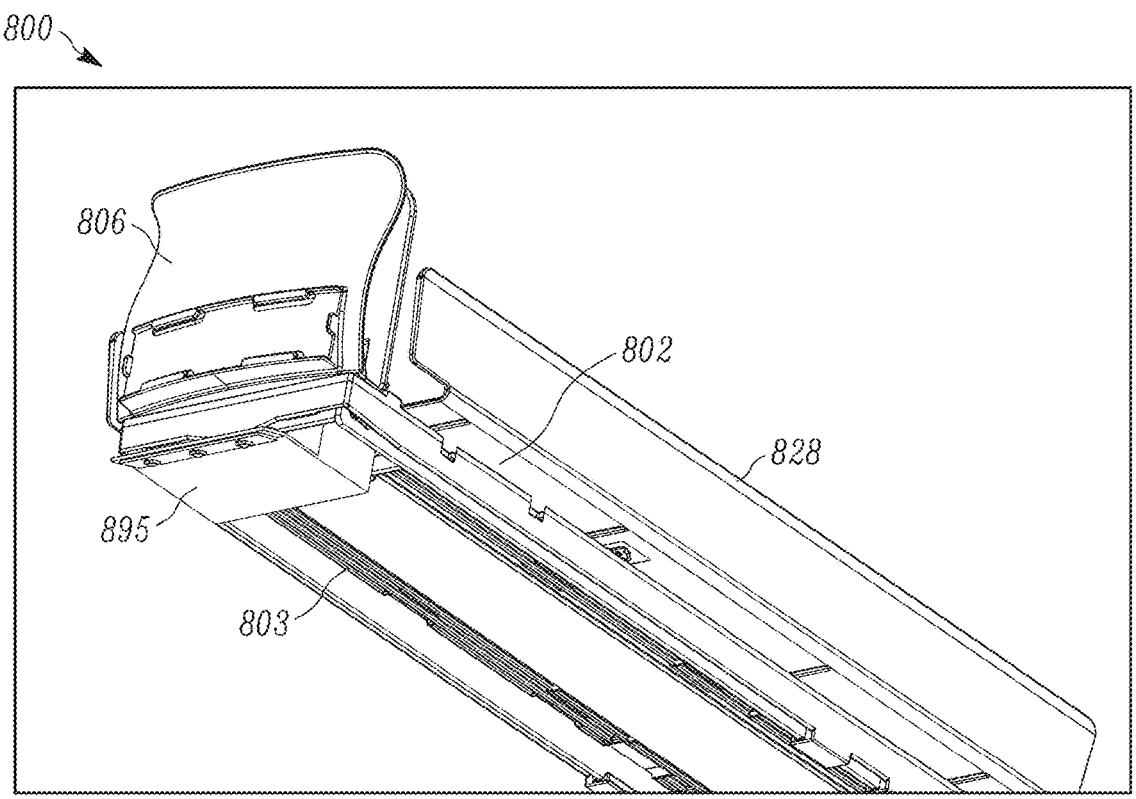
Figure 8F:
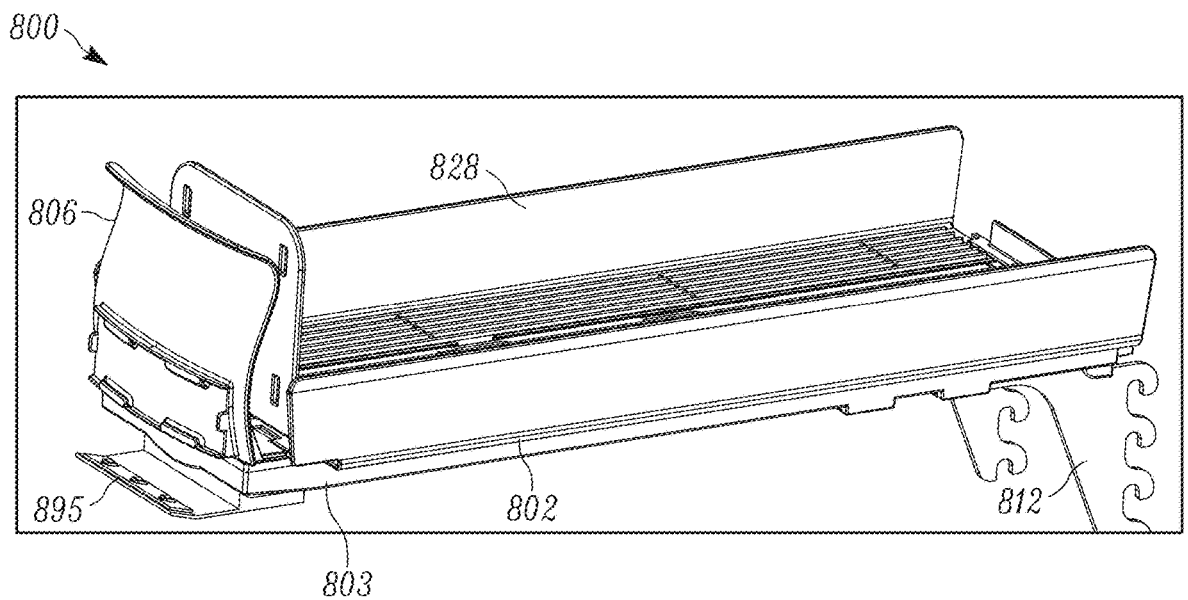

FIGS. 8E-8F depict product display merchandisers 800 having base mounted lighting elements 895. The product display merchandiser 800 includes a base 803 on which the tray 802 is supported. In some embodiments, the tray 802 is slidably mounted on the base 803 such that the tray can be pulled out or moved with respect to the base for restocking. In other embodiments, the product display merchandiser 800 is baseless, with the base 803 being replaced with support arms as described in previous embodiments. In a preferred form, the lighting element 895 may be integrated with a front stabilizer for such baseless trays and, thus, serve the dual purpose of stabilizing the front of the front of the support arms and illumination of stored product and/or lens either within the product merchandiser itself or the product and/or lens in a neighboring merchandiser, or both.

The lighting elements 895 are directional lights, such as LEDs, that are mounted to the base 803 or support arms. In some embodiments, the lighting elements 895 includes a fastener such that the lighting elements 895 can be added to existing product display merchandisers 800. In other embodiments, the lighting elements 895 are integral with the base 803 or support arms. As with above embodiments, the lighting element 895 projects forward from the front of the product display merchandiser 800 so as to illuminate the front of the front most product and/or the merchandiser lens. The lighting element can include downward illuminating lights (see, FIG. 8E), upward illuminating lights (see, FIG. 8F), or both. In some embodiments, the lighting elements 895 extend substantially the entire length (extending substantially the entire distance from the mounting brackets 812 to the lens 806) of the base 803 or support arms such that substantially the entire row of products below the product display merchandiser 800 may be illuminated. In a still further embodiment, the lighting elements 895 extend substantially the entire width of the product display merchandiser 800 (substantially the entire distance between the two sidewalls 828) so as to illuminate multiple columns of products.

Figure 8G:
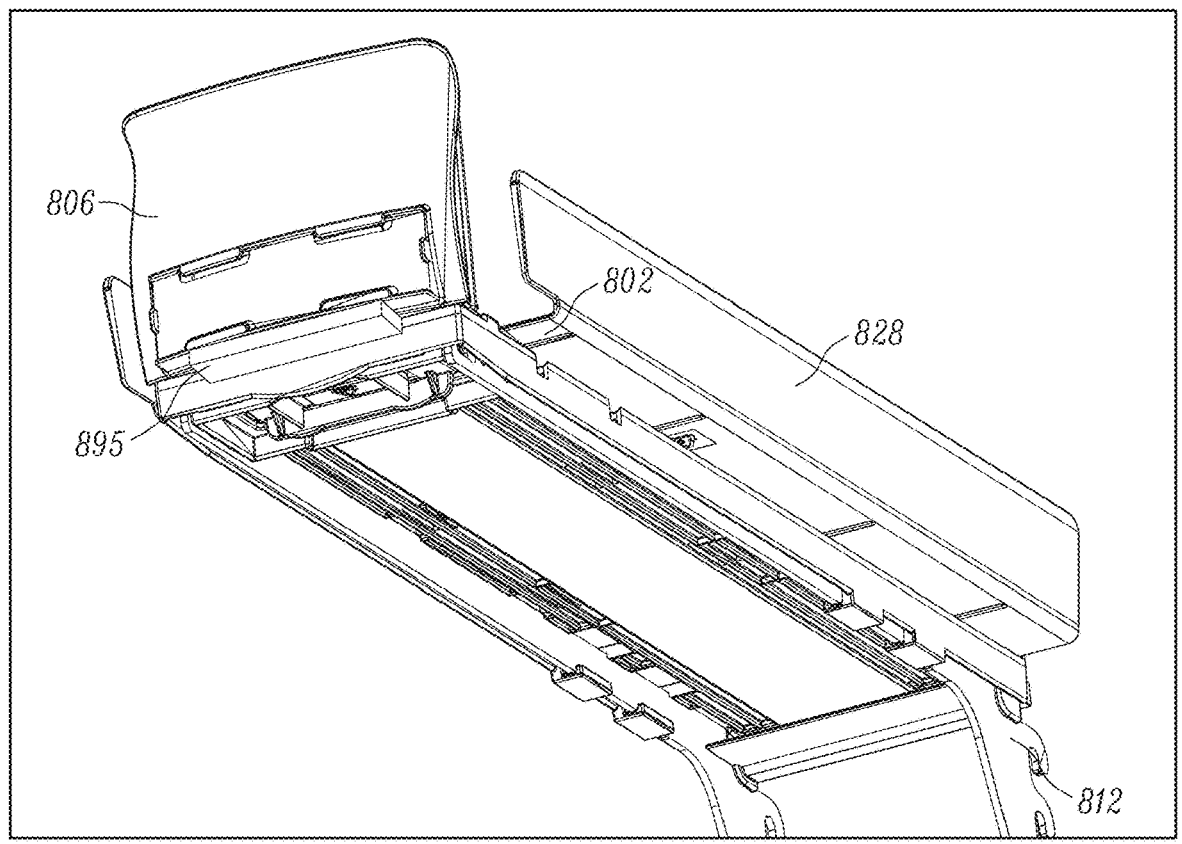
Figure 8H:
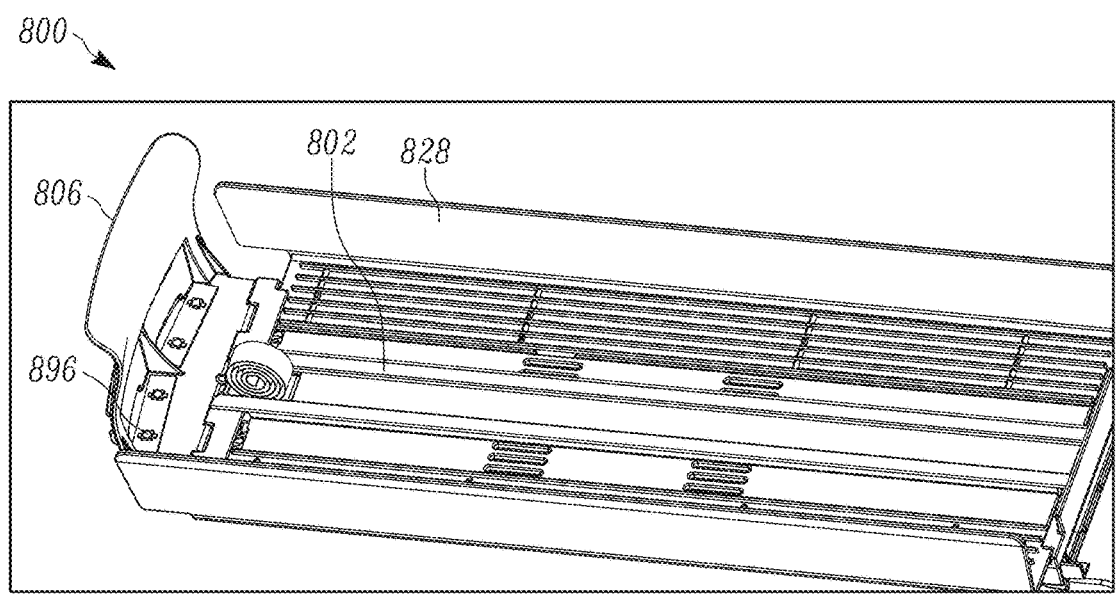

FIGS. 8G-8H depict product display merchandisers 800 having tray mounted lighting elements 895 (meaning they travel with the tray as the tray moves from its retracted/product displaying position to an extended/restocking position). In some embodiments, the tray mounted lighting elements 895 are configured to be added to existing product display merchandisers, while in others they are formed integral with new merchandisers. For example, the tray mounted elements 895 may include fasteners configured to detachably coupled to a portion of the tray 802 or lens 806, or may simply be sized to fit securely between or over one or more portions of the tray 802 and/or lens 806. In other embodiments, the tray mounted lighting elements 895 are integral with the tray 802 or the lens 806. The tray mounted lighting elements 895 may be downward illuminating (see, FIG. 8G), upward illuminating (see, FIG. 8H), or both. In FIG. 8H the pusher has been removed so that the lighting element 895 can be seen more clearly. In some forms, the lighting elements may be positioned on one side of the lens (e.g., exterior or outside of the lens) or the other side (interior or inside of lens), or in some forms, they may extend from one side of the lens to the other or simply protrude through the lens if desired. In addition, the lens can be designed to diffuse the light from the lighting elements such as to illuminate the entire lens and surrounding area, or the lens may be designed to focus or concentrate the light on a desired location (e.g., certain indicia, a product brand or logo, portion of product, etc.). In some forms, the lens will operate like a light pipe for directing light in a desired manner (e.g., over a desired area, focused on one or more spots, etc.). The lighting elements themselves may also be selected to either diffuse or spread light (e.g., flood lights) or focus or concentrate light (e.g., spot lights) on a desired area or spot.

Figure 8I:
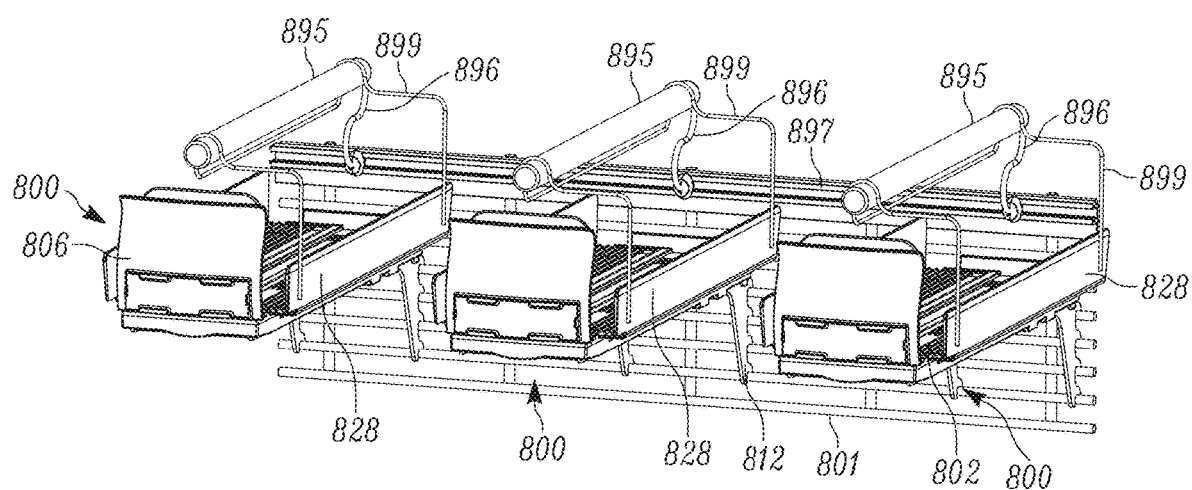

FIG. 8I depicts a product display merchandisers 800 with a sidewall or wing mounted lighting element 895. The wing mounted lighting element 895 includes a frame 899 configured to attach to the wing or sidewall 828 by one or more fasteners. The fasteners may comprise clamps or other fasteners that can be loosened to adjust the position of the lighting element 895 and then tightened to hold the lighting element 895 in position. The fasteners may be used to attach the wing mounted lighting element 895 to existing product display merchandisers 800, such as in retrofit applications. In other embodiments, the wing mounted lighting element 895 is integral with the wing 828.

In some embodiments, the wing mounted lighting element 895 is vertically adjustable, horizontally adjustable, or both, meaning the height or y-axis of the lighting element can be adjusted via the vertical adjustment and the width or x-axis of the lighting element can be adjusted via the horizontal adjustment. In still other forms, the light element may be movable or positionable on the bracket to allow for adjustment of the light element in the z-axis as well. Thus, multi-axis adjustment may be made to customize the lighting solution for a particular display. In the form illustrated, the wing mounted lighting elements 895 may be adjustable relative to the sidewall 828 (e.g., another form of z-axis adjustment), and/or the sidewall 828 on which the wing mounted lighting elements 895 are mounted may be adjustable relative to the rest of the product display merchandiser 800 (e.g., another form of x-axis adjustment). The wing mounted lighting element 895 is configured to extend substantially the entire length of the tray 802 and/or product channel of the merchandiser. In a preferred embodiment, the wing mounted lighting element 895 comprises an LED rope light. In other embodiments, the wing mounted lighting element 895 comprises one or more LED lights, fiber optic lights, incandescent lights, fluorescent lights, halogen lights, neon lights, or a combination thereof.

In some embodiments, the frame 899 of the wing mounted lighting element 895 also serves as an anti-toppling device. This is particularly helpful when the merchandiser is used to display stacked or multiple rows of product. For example, the frame may include a portion configured to contact a side of the product in the product channel or to guide same in order to prevent the product from toppling over.

FIG. 8I further depicts a power channel 897. The product channel 897 runs along the shelving unit on which the product display merchandisers 800 are mounted substantially perpendicular to the longitudinal axis (see axis 426 above) of the product display merchandisers 800. A plurality of the lighting elements 895 positioned along the shelving unit connect to the power channel 897 to receive power therefrom. An exemplary power channel for use in a shelving system is disclosed in U.S. Pat. No. 8,979,296, titled "ILLUMINATED SHELVING" and licensed to DCI Marketing, Inc., which is incorporated by reference herein in its entirety. The power channel 897 may comprise busses carrying electricity along substantially the length of the power channel. The cords 896 of the lighting elements 895 may be configured to interface with the power channel 897 so as to form a conductive connection with one or more busses. In other embodiments, the power channel 897 includes a plurality of plugs or sockets spaced apart along the length of the power channel 897 for dedicated plug-in connection rather than providing an uninterrupted length that plugs can be connected at any desired location. In some forms, the power channel 897 will be run the horizontal length of a shelving unit or of a row of merchandisers suspended from a grid, bar or shelf. In some forms, the power channel 897 may be positioned vertically to run from one row to another row positioned above or below the reference merchandiser. In a preferred form, uninterrupted power channels or strips will run the width of each row of merchandisers and at one or more locations a vertical uninterrupted power channel or strip will be connected to allow the rows of power strips to be interconnected to one another electrically (e.g., via jumpers, etc.) in order to provide a universal power source for an entire product display (meaning a display of multi-row, multi-column merchandisers). Alternative power strips may be connected to displays via magnetic means (e.g., magnetic strips containing low voltage power lines, etc.). In still other forms, the grid, bar or shelf may be provided with dedicated positive and negative power lines or connections, for the merchandisers or merchandiser lighting elements to be connected to at desired positions.

The power channel 897 may be implemented in any of the previous embodiments of the product display merchandisers 800. Each of the lighting elements 895 is connected to a power source in order to power the lights. In some embodiments, the lighting elements 895 include cords 896 which are configured to connect to the power channel 897. In alternative embodiments, a projection from the product display merchandiser 800 is configured to connect to the power channel 897 and electricity is conducted through a portion of the product display merchandiser 800, such as through an embedded wire or bus, to the lighting element 895.

As mentioned above, in some embodiments, the lenses 806 are configured to direct the light emitted from the lighting elements 895. The lenses may be shaped to refract the light such that it illuminates a larger portion of the face of the front most product. In alternative embodiments, the lens 806 is configured to concentrate the light on a specific area of the product. In still further embodiments, the lens comprises one or more light tubes that direct light along their length. In some embodiments, the lighting element 895 includes lights positioned partially or completely within the lens 806.

In some embodiments, any of the lights in the lighting elements 895 described above can be one or more LED lights, incandescent lights, fluorescent lights, halogen lights, neon lights, or a combination thereof. The lights may be white lights or colored lights, or various shades of same (e.g., soft white (2700K-3000K), bright/cool white (3500K-4100K), daylight (5000K-6500K), etc.). In some embodiments, a lighting element 895 includes a plurality of different colored lights that can be used to signify certain events, such as red light sales. In other instances, the merchandiser will allow users to switch between different colors in order to customize the product display to a desired color (e.g., to match trade dress of store or product displayed, to accommodate for certain features of the display such as one shade looks better due to the displays location, etc.).

Any of the variations of lighting elements 895 described above may be implemented in any of the merchandisers 100-700 described above. The lighting elements 895 may include fasteners, such that they can be retrofitted into or onto the merchandisers 100-700. Alternatively, the merchandisers 100-700 may be modified to include integral lighting elements 895. For example, in alternate forms, lighting elements may be added to the wings of the merchandiser or integrated into wings of a merchandiser to provide side lighting to product displayed therein.

FIGS. 9A-9F depict a product display merchandiser 900 with a lighting assembly comprising a lighting circuit 995 and a light pipe 905. The term "light pipe" is used to describe a translucent member used to transmit and refract light from one place to another. Unlike a pipe for fluids, a light pipe is not necessarily round or hollow. For example, the light pipe 905 is a solid body having an L-shape and a rectangular cross-section. The lighting circuit 995 includes an illuminating member, such as one or more lights. In one form the illuminating member comprises LEDs 995$w$ and 995$g$ (see FIG. 9B). A bracket 981 couples the lighting circuit 995 to the tray support or base 903 of the merchandiser 900. While the base 903 shown is a substantially solid base extending most of the bottom of the merchandiser 900, it should be understood that the term "base" as used here also includes tray supports only comprising one or more arms (see arms 116 above) on which the tray rests or a plurality of arms coupled to each other by one or more stabilizers. In some forms, the bracket 981 includes attachment structures, such as tabs 983, configured to couple the bracket to an existing merchandiser 900. By this attachment, an existing merchandiser can be retrofit with the lighting circuit 995 so as to illuminate the tray 902.

The lens 906 includes a light pipe 905 configured to refract light from the lighting circuit 995 upwards to the front of the tray 902. The light pipe 905 includes a rear surface 905$r$ that rests proximate the lighting circuit 995 when the merchandiser 900 is in a retracted position. In a preferred form, the rear surface 905$r$ of the lens 905 rests on the LEDs 995$w$, 995$g$. The LEDs 995$w$, 995$g$ are directional LEDs configured to project light forward, into the rear surface 905$r$. The light is then refracted upward into the front portion of the lens 906. In some forms the rear surface 905$r$ is flame polished to increase translucency.

The bracket 981 includes a plurality of wire holders 985 configured to secure the power and/or control cable 993 of the lighting circuit 995. The cable 993 ends in a plug configured to couple to a socket or a power channel, as described above, to provide power to the lighting circuit 995. In a preferred form, the plug is a water resistant or waterproof plug, such that the merchandiser 900 can be used in a refrigerated environment with condensation. In some forms, the bracket 981 includes a socket 981s configured to receive the lighting circuit 995. The socket 981s is sized and configured to receive the lighting circuit 995 and hold it in a vertical orientation (such that the surface of the circuit 995 on which the components rest has a normal line parallel to the longitudinal axis of the tray 902.

The tray 902 is movable relative to the base 903 from a retracted position to an extended position. In some forms, the tray 902 is secured in the retracted position. In order to extend the tray 902, the user operates a release 907. In some forms, the release 907 comprises a button or lever on the bottom side of the merchandiser 900, thus being easy to reach for the user but obscured from view to discourage customers from operating it. The lens 906 is coupled to the tray 902, while the lighting circuit 995 is coupled to the base 903. When the tray 902 is moved to an extended position relative to the base 903 (see FIG. 9D), the lens 906 pulls away from the lighting circuit 995. In some forms, the lighting circuit 995 includes or is communicatively coupled to a switch configured to detect when the tray 902 pulls away from the base 903 and cutoff power to the LEDs 995w, 995g.

In the shown embodiment, the plurality of lights includes 3 white LEDs 995w and 3 green LEDs 995g. The LEDs are arranged in 3 pairs, each pair including one white LED 995w and one green LED 995g. In one form, the 3 pairs of LEDs are spaced along the width of the lens 906, such that one pair is proximate the center of the width and the other two are proximate respective sides. In alternative forms, additional colors, different color combinations, or multicolor LEDs can be used. The plurality of colors enables the color in which the tray is being illuminated to be changed to indicate certain data. For example, green lights may indicate that the displayed product is organic, red or blue lights may indicate that the product being illuminated is on sale, etc. In one form, the lighting circuit 995 includes a switch allowing a user to manually change the color in which the tray 902 is illuminated. In alternative embodiments, the lighting circuit is communicatively coupled to an external computing device or controller which controls the color of light used. For example, a central computer may track what products are stocked in which merchandisers 900 and automatically change the merchandisers 900 displaying organic products to green.

Figure 9A:
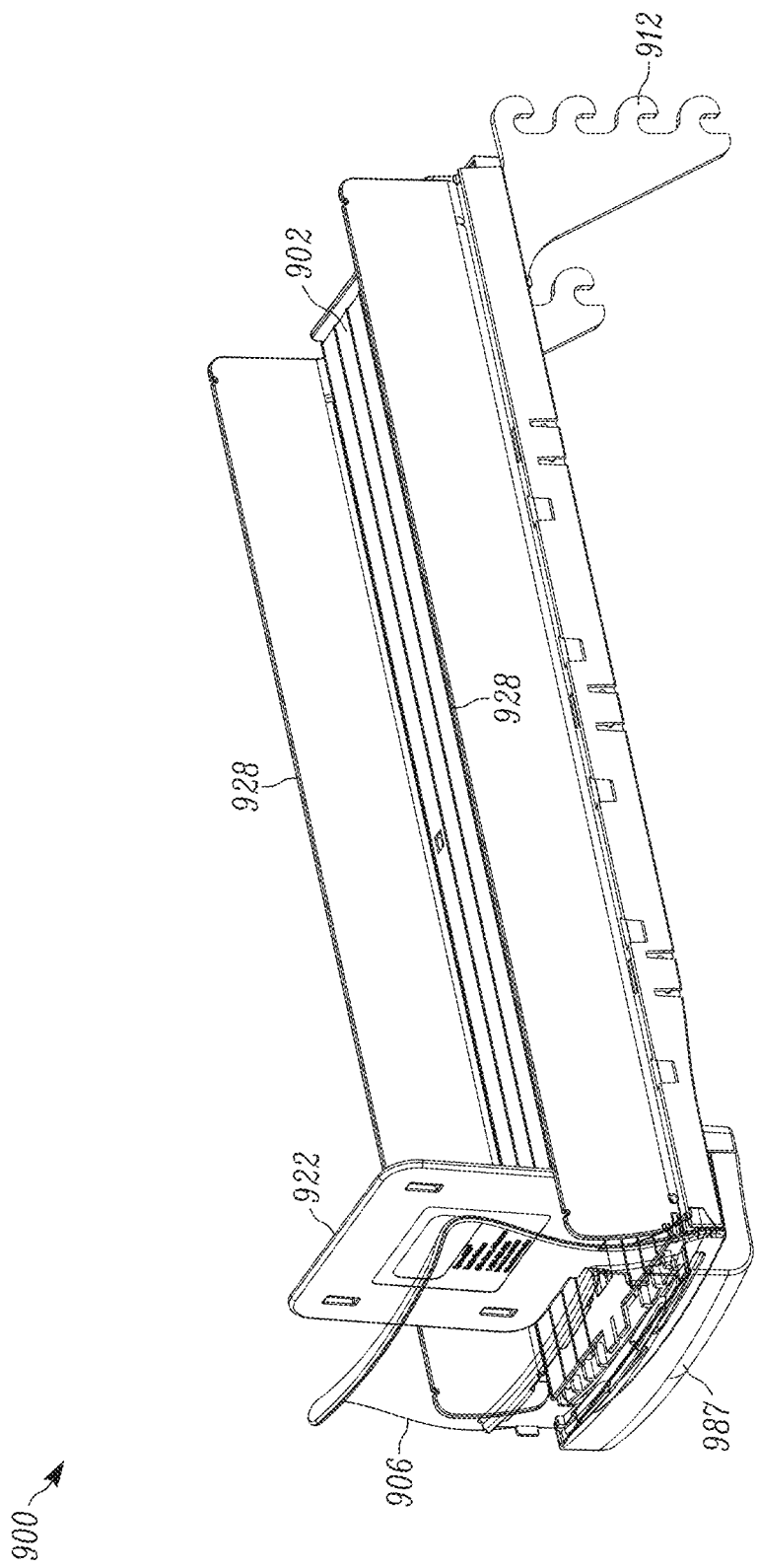
FIGS. 9A-9H illustrate an illuminated merchandiser.
Figure 9B:
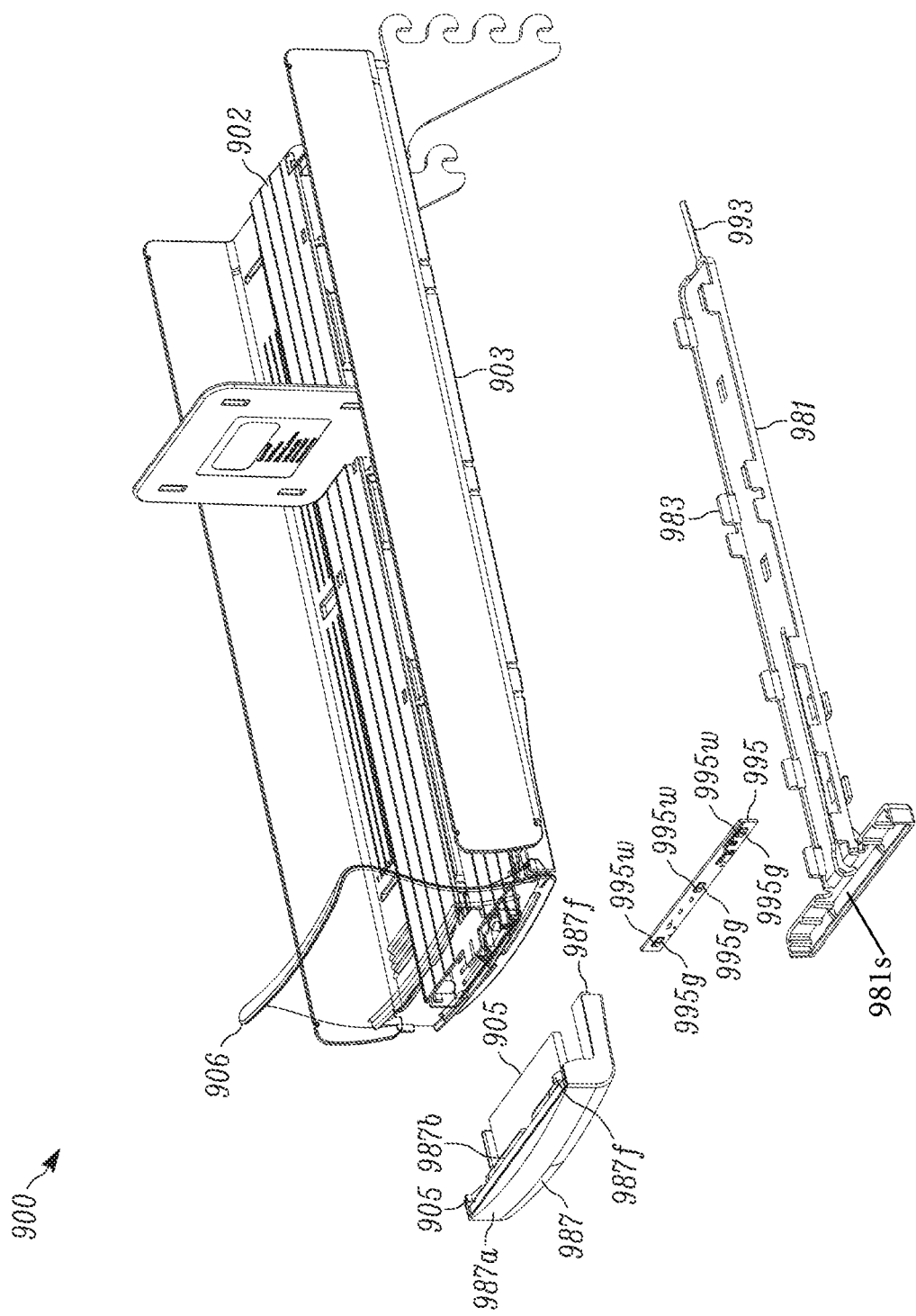
Figure 9C:
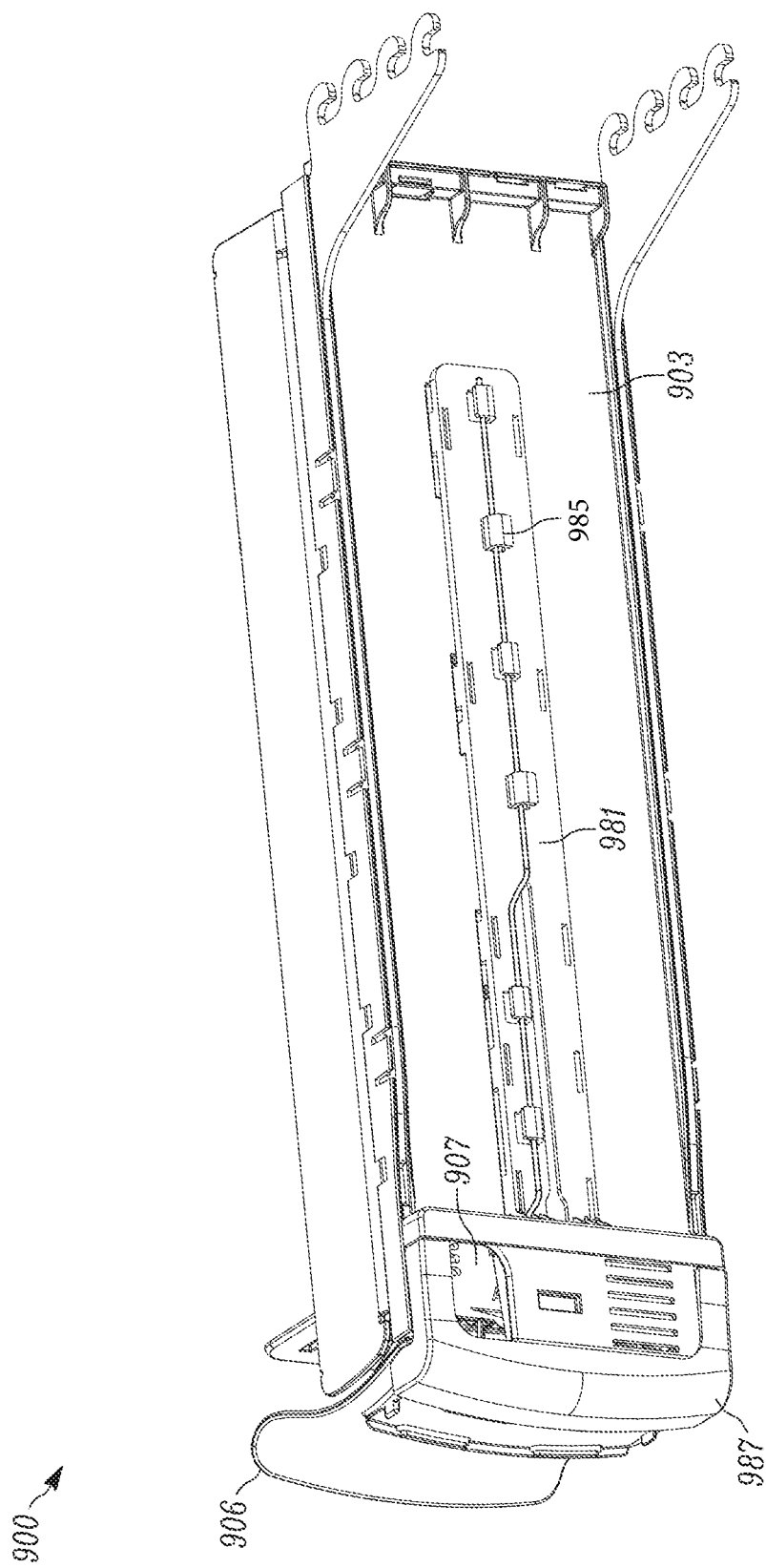
Figure 9D:
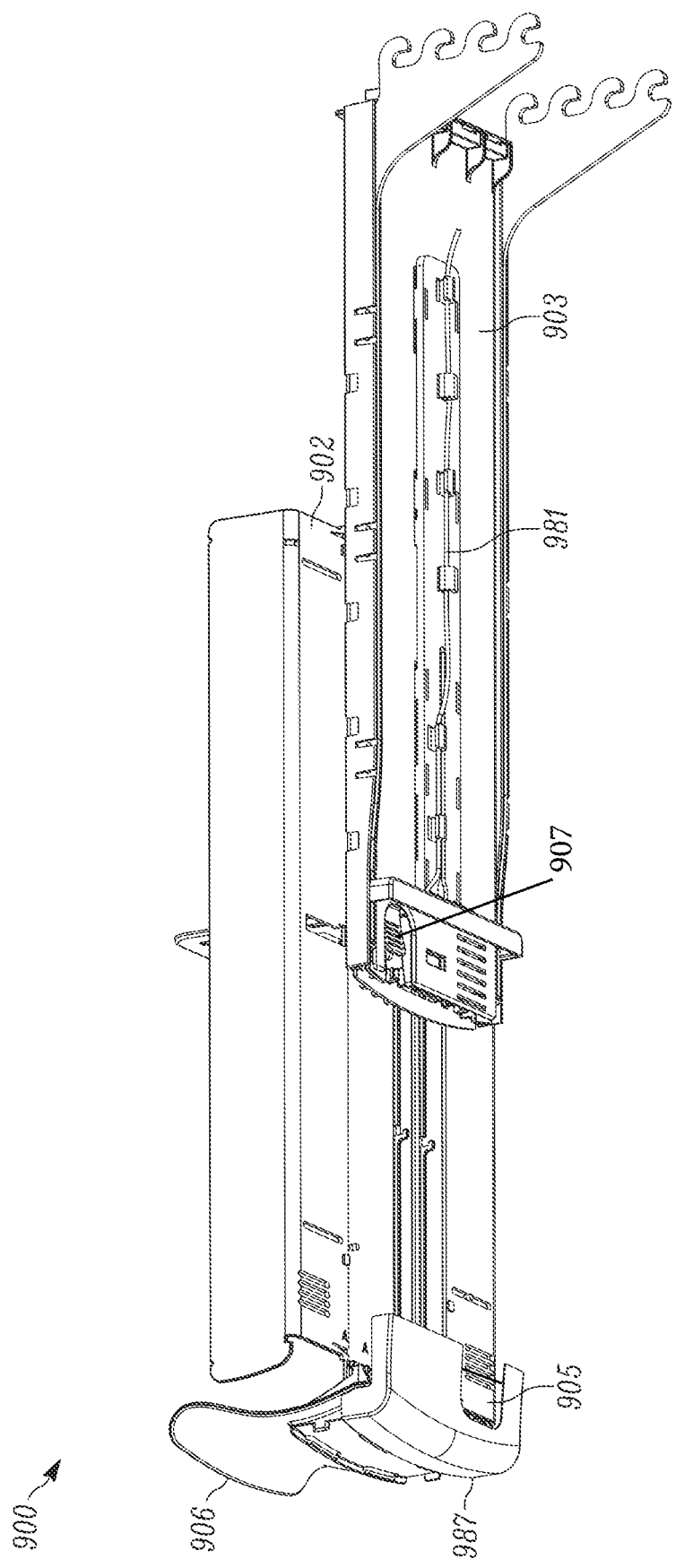
Figure 9E:
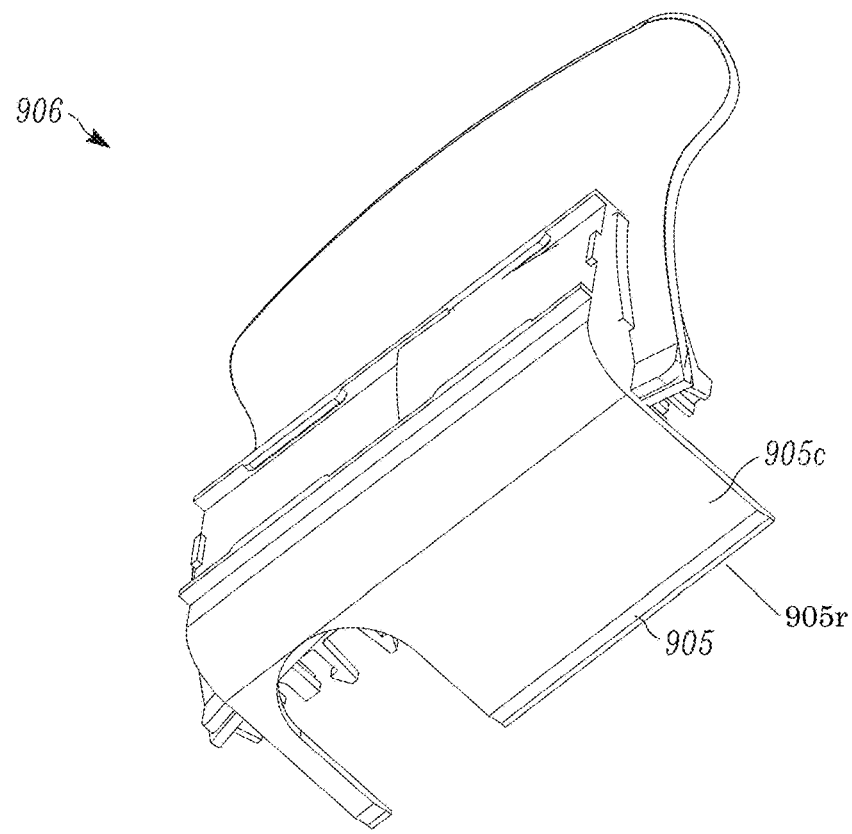
Figure 9F:
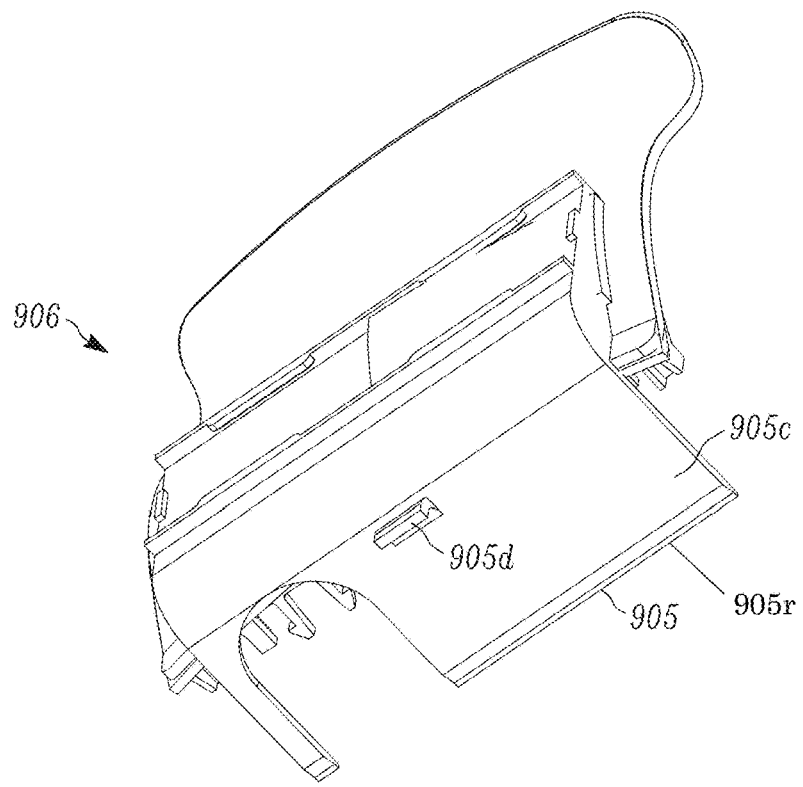

In some embodiments, the merchandiser 900 includes a downward projecting light source for illuminating a tray or shelf located below the base 903. FIG. 9F illustrates an alternative lens 906 including a downward light pipe 905d. The downward light pipe 905d refracts a portion of the light from the lighting circuit 995 downward, while refracting another portion of the light upwards to the front of the tray 902. Alternatively, the lighting circuit includes additional directional LEDs configured to illuminate the area below the base 903. In still further alternatives, the rear surface 905r of the lens 906 is configured to be spaced from the lighting circuit 995 when the merchandiser 900 is in a closed position. The gap between the lens 906 and lighting circuit 995 allows some light from the LEDs 995w, 995g to shine downward.

In alternative forms, the light pipe section 905 is separate from the lens 906. The light pipe 905 is coupled to the tray 902 such that it is secured proximate the lens 906, and the light pipe 905 is configured to refract light from the lighting circuit 995 into the lens 906. Specifically, the top surface of the light pipe is proximate the bottom surface of the lens 906. The light pipe 905 is secured by the bracket 987. The bracket 987 comprises two halves 987a, 987b configured to snap together, sandwiching a portion of the light pipe 905 between the two halves. The bracket 987 is further configured to couple to an existing tray 902, such as via a snap fit connection between the tabs or fasteners 987f and an aperture in the tray 902. In some forms, the light pipe includes both the upward light piping or light path as well as the downward light pipe or light path 905d.

In alternative forms, the lights 995w, 995g are coupled to the tray 902. When the merchandiser is in a retracted position, a portion of the lights 995w, 995g, or a plug operatively coupled to the lights, couples to a socket or plug coupled to the base 903 so as to connect a power circuit to the lights 995w, 995g. When the merchandiser 900 is extended, the connection to the power circuit is broken, causing the lights 995w, 995g to turn off.

Figure 9G:
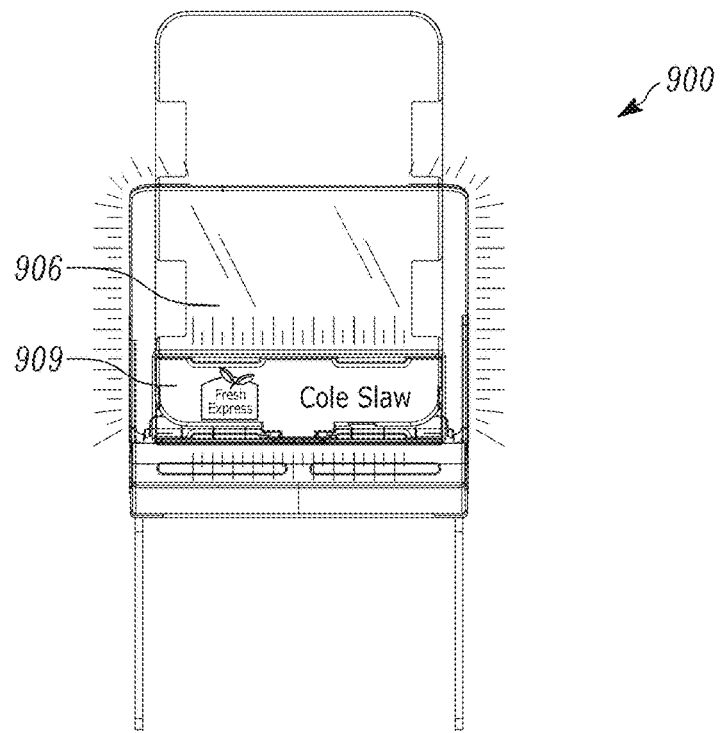
Figure 9H:
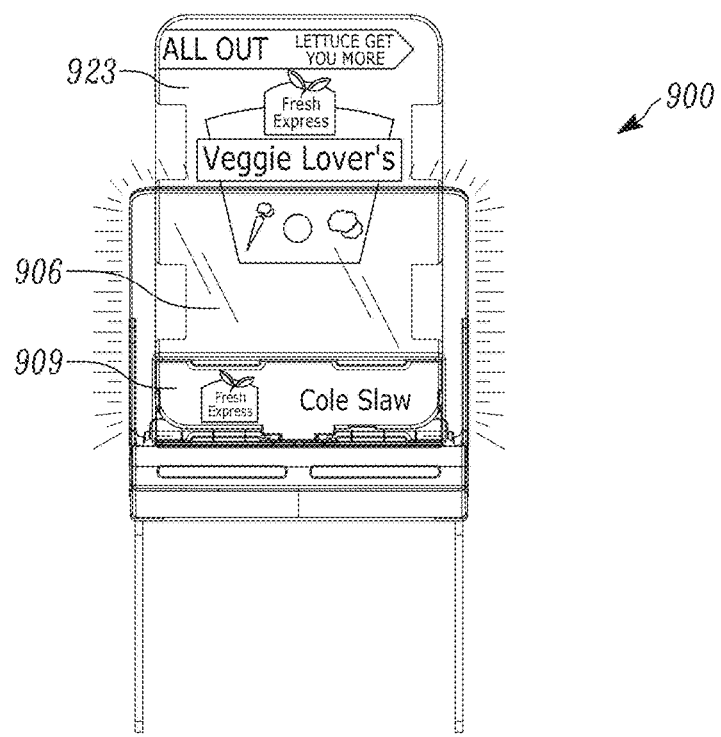

In the embodiment shown, the upward refract light causes the lens 906 to glow, projecting a soft light on the front most product in the tray 902. Alternatively or additionally, indicia containing materials 909, such as price stickers or advertising stickers, are placed on the front surface of the lens 906, such as in the price channel (see FIG. 9G-9H). In some forms, the materials 909 are semitransparent or translucent such that the light from the lens 906 backlights the materials 909, drawing attention to the indicia contained thereon (see FIG. 9G). Alternatively or additionally, the lens 906 is engraved. The edges of the engraving include surfaces substantially perpendicular to the plane of the front of the lens. Light is released from these edge surfaces, effectively outlining the engraving with light. In some forms, the engraving includes indicia of the product being displayed, such as a brand name, logo, or description (such as "organic"). In still further examples, an indicia card 923 is placed on the pusher 922 (see FIG. 9H). In operation, the light from the lens 906 illuminates the front most product. When the front most product is removed, the light from the lens 906 illuminates the indicia card 923, thus still drawing attention of the customer to advertising even when no product is stocked.

In summary, a lighting accessory is described for retrofitting conventional product displays. The lighting accessory comprises a light pipe 905 for directing light from a light source to a targeted area for illumination and a body 987 for securing the light pipe to a first portion 902 of a conventional product display in order to retrofit the conventional product display 900 to provide illumination.

In some forms, the light pipe 905 is a rigid or a flexible light pipe and is either hollow with a reflective inner lining or contains a transparent solid for distributing light to a target area.

In some forms, the light pipe 905 is rigid light pipe containing a transparent solid for illuminating the target area.

In some forms, the body 987 includes a fastener 987f for securing the body to the first portion 902 of the conventional product display 900 to prevent the light from unintentional removal from the conventional product display. In some embodiments, the fastener 987f comprises a pair of hooks or clasps located on opposite sides of the body to engage mating receptacles located on the first portion 902 of the conventional product display.

In some forms, the fastener comprises a first mating structure 987f located on a first portion of the body 987a and a second mating structure 987f located on a second portion 987b of the body for engaging respective parts of the conventional product display on the first portion of the conventional product display to secure the light pipe and body thereto. In some forms, the first portion of the conventional product display 900 is located on a front or forward facing portion of the conventional product display to position the light pipe 905 such that it illuminates a target area.

In some embodiments, the light pipe 905 is a rigid light pipe made of a transparent solid and having a substantially L-shape with a first end for receiving light from an illuminating body and a second end for emitting light and illuminating a target area, the body 987 having a first portion 987a for positioning on a first side of the L-shaped light pipe and a second portion 987b for positioning on a second side of the L-shaped light pipe with the body first portion 987a and body second portion 987b being interconnectable to sandwich the L-shaped light pipe therebetween.

In some forms, the body first portion 987a and the body second portion 987b are interconnected via mating friction fit or snap-fit structures and/or adhesive.

In some embodiments, the light pipe 905 and body 987 form a first retrofit accessory part and the lighting accessory further comprises a second retrofit accessory part comprising an illuminating body 995 for directing light into the first end of the L-shaped light pipe and having second retrofit accessory mating structures 981 for mating the second retrofit accessory part to a second portion 903 of the conventional product display different than the first portion of the conventional product display. In some forms, the first retrofit accessory part 905 is movable with respect to the second retrofit accessory part 995.

In some forms, the illuminating body 995 includes at least one LED 995w, 995g and the first retrofit accessory part 905 is movable between a first position wherein the first end of the L-shaped light pipe is positioned proximate the LED of the second retrofit accessory part to emit light from the second end of the L-shaped light pipe and a second position wherein the first end of the L-shaped light pipe is spaced apart from the LED of the second retrofit accessory part.

In some embodiments, the light pipe 905 and body 987 form a first lighting accessory part and the lighting accessory further includes a second lighting accessory part having at least one illuminating body 995 and the first lighting accessory part is movable with respect to the second lighting accessory part. In some forms, the first lighting accessory part is movable between a first retracted position wherein the first lighting accessory part is positioned proximate the second lighting accessory part so that the first lighting accessory part and second lighting accessory part interact with one another and a second extended positon wherein the first lighting accessory part is spaced apart from second lighting accessory part and the interaction is diminished if not ceased between the first lighting accessory part and the second lighting accessory part.

In some forms, the light pipe defines a first light path (upward to the lens 906) for illuminating a first target area and a second light path 905d for illuminating a second target area different from the first target area.

In some embodiments, the conventional product display 900 is a product merchandiser tray having a tray 902 and a front lens 906 and the fastener 987f of the body connects the L-shaped light pipe 905 to the lens 906 so that the second end of the L-shaped light pipe is aligned with and illuminates the lens of the product merchandiser tray.

In some forms, the product merchandiser tray 900 further includes adjustable width side members 928 for adjusting a product channel width to allow the tray to accommodate products of varying sizes.

In some forms, the tray 902 of the product merchandiser tray is a pullout tray capable of being moved between a first retracted position for normal displaying of product and a second extended position for restocking of product within the tray.

In some forms, the product merchandiser tray includes a spring biased pusher 922 for advancing product stored in the tray as product is removed therefrom to front face product in the product merchandiser tray.

In some forms, the conventional product display is an extendible product merchandiser tray having a base 903, a tray 902 that is connected to the base and defines a product channel and the tray being movable with respect to the base and between a first retracted tray position for normal displaying of product and a second extended tray position for restocking of product within the tray, the extendible product merchandising tray further having a lens 906 connected to the tray, with the fastener 987f of the lighting accessory body 987 connecting the lighting accessory body to at least one of the lens 906 or tray 902 to position the lighting accessory to illuminate at least a portion of the lens and/or product channel of the tray.

In some forms, the illuminating body 995 comprises at least one LED 995w and is capable of being switched between a white light and a colored light and the lighting accessory further includes a switch for switching between white and colored light.

In some forms, the at least one LED comprises at least one white LED 995w and at least one colored LED 995g and the switch allows a user to select between the white and colored LEDs.

It is understood that the present application discloses a number of methods, including a method of illuminating conventional product display comprising providing a first lighting accessory having a body 987 and light pipe 905 and a second lighting accessory having an illuminating body 995, connecting the first lighting accessory to a first portion of the conventional product display to illuminate a target area, and connecting the second lighting accessory to a second portion of the conventional product display different than the first portion to align the illuminating body with the light pipe.

In some forms, the conventional product display is a pullout product merchandiser tray having a tray support 903, a tray 902 movably connected to the tray support and capable of moving between a first retracted position for normal displaying of product and a second extended position for restocking of product, and a lens 906 connected to the tray. The method comprises connecting the first lighting accessory 905 to the lens or tray, and connecting the second lighting accessory 995 to the tray support 903 so that the illuminating body is positioned proximate the light pipe 905 when the tray is in the first retracted position and spaced apart from the light pipe when the tray is in the second extended position.

In some embodiments, an illuminated product merchandiser tray 900 is described comprising a tray support 903 for mounting the product merchandiser, a tray 902 connected to the tray support, a product stop 906 connected to the tray for providing a barrier in front of the tray, a first illumination component 905 connected to the product stop or tray for illuminating at least a portion of the product stop and/or tray, and a second illumination component 995 connected to the tray support for supplying power to an illuminating body when the tray is in the first retracted position.

In some forms, the product stop is a translucent lens 906, the second illumination component 995 includes the illuminating body 995w, 995g and the first illumination component includes a light pipe 905 that has a first end for receiving light emitted from the illuminating body and a second end for emitting light to a target area.

In some forms, the light pipe defines a first light path (up towards the lens 906) for illuminating a first target area and a second light path 905d for illuminating a second target area.

In some embodiments, the illuminating member comprises a first LED 995w for illuminating the light pipe. In some forms, the illuminating member comprises a second LED for illuminating an area other than the light pipe. For example, in some forms the second LED illuminates an area below the tray.

In some forms, the tray 901 is movable with respect to the tray support 903 between a first retracted position and a second extended position where the tray is extended out from the tray support, the first illumination component illuminating at least a portion of the product stop 906 and/or the tray 902 when the tray is in the first retracted position and not illuminating the product stop and/or the tray when the tray is in the second extended position.

In some forms, the illuminating body comprises at least one LED and is capable of being switched between a white light and a colored light and the illuminated product merchandiser tray further includes a switch for switching between white and colored light.

In some forms, the at least one LED comprises at least one white LED 995w and at least one colored LED 995g and the switch allows a user to select between the white and colored LEDs.

In some forms, the product stop is a translucent lens 906, the first illumination component comprises a light pipe and an LED and the second illumination component comprises a connector for connecting the LED to power and illuminating the light pipe when the tray is in the first retracted position but disconnecting the LED from power when the tray is in the second position.

In some forms, the second illumination component includes a water resistant plug.

Another exemplary method is a method of illuminating a product merchandiser tray comprising providing a product merchandiser tray having a tray support 903 for mounting the product merchandiser, a tray 902 connected to the tray support, a product stop 906 connected to the tray for providing a barrier in front of the tray, a first illumination component 905 and a second illuminated component 995, connecting the first illumination component to the product stop or tray for illuminating at least a portion of the product stop and/or tray, and connecting the second illumination component to the tray support for supplying power to an illuminating body when the tray is in the first retracted position.

In some forms, the product stop is a translucent lens, the second illumination component includes the illuminating body and the first illumination component includes a light pipe and the method further comprises illuminating a first end of the light pipe to direct light through a second end of the light pipe to illuminate a target area.

In some forms, the light pipe defines a first light path (up towards the lens 906) and a second light path 905d and the method further comprises directing light through the first light path for illuminating a first target area and directing light through the second light path for illuminating a second target area.

In some forms, the illuminating body is an LED 995w located on the second illumination component and the first illumination component includes a light pipe 905 and the method further includes aligning the LED with the light pipe to illuminate a target area.

In some forms, the product stop is a translucent lens and the illuminating body comprises a first LED 995w for illuminating at least a portion of the translucent lens and/or tray as a first target area and a second LED for illuminating a second target area and the method further comprises illuminating the first and second target areas.

In some forms, the illuminating body comprises at least one LED and is capable of switching between a white light and a colored light and the method further comprises switching the illumination of the LED between the white light and the colored light.

In some forms, the at least one LED comprises at least one white LED 995w and at least one colored LED 995g and the product merchandiser tray further includes a switch to select the illumination of the white LED or the colored LED, the method further comprising switching between the illumination of the white LED and the colored LED via operation of the switch.

In some forms, the tray 902 is movable with respect to the tray support 903 between a first retracted position and a second extended position where the tray is extended out from the tray support, the method further comprising illuminating the illuminating member when the tray is in the first retracted position and not illuminating the illuminating member when the tray is in the second extended position.

Exemplary merchandisers include an illuminated product merchandiser tray comprising a tray support 903 for mounting the product merchandiser, a tray 902 movably connected to the tray support, the tray movable relative to the tray support from a first, retracted position to a second, extended position, and a lighting assembly comprising a first illumination component 905, and a second illumination component 995. Wherein the first illumination component is proximate the second illumination component with the tray in a retracted position, and the first illumination component is separated from the second illumination component with the tray in an extended position.

In some forms, the first illumination component 905 comprises a light pipe.

In some forms, the second illumination component 995 comprises an illuminating body.

In some forms, the illuminating body 995 includes at least one LED 995w.

In some forms, the at least one LED is capable of being switched between white light and colored light, the second illumination component further comprising a switch.

In some forms, the illuminating body includes at least two LEDs 995w, 995g.

In some forms, the at least two LEDs include a white LED 995w and a colored LED 995g, the second illumination component 995 further comprising a switch configured to switch between the white LED and the colored LED.

In some forms, the second illumination component 995 comprises a cord 993 having a water resistant plug.

In some forms, the first illumination component comprises an illuminating body.

In some forms, the first illumination component is electrically coupled to the second illumination component with the tray in a retracted position and wherein the first illumination component id decoupled from the second illumination component with the tray in an extended position.

In some forms, the light pipe 905 comprises at least one flame polished surface.

In some forms, the light pipe 905 comprises at least one flame polished surface, and the at least one flame polished surface is proximate the LED 995w with the tray in a retracted position.

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A lighting accessory for retrofitting conventional product displays, the lighting accessory comprising:
   a first retrofit accessory part comprising:
      a light source comprising an illuminating body; and
      first retrofit accessory mating structures for mating the first retrofit accessory part to a tray support of a conventional product display;
   a second retrofit accessory part comprising:
      a light pipe for directing light from the illuminating body to a first target area for illumination; and
      a body for securing the light pipe to at least one of a tray of the conventional product display and a lens at a front end of the tray in order to retrofit the conventional product display to provide illumination;
   wherein the light pipe has a first end for receiving light from the illuminating body and a second end for emitting light and illuminating the first target area;
   wherein the second retrofit accessory part is movable with respect to the first retrofit accessory part between a first position wherein the tray and lens are retracted with respect to the tray support and the first end of the light pipe is positioned proximate the illuminating body of the first retrofit accessory part to emit light from the second end of the light pipe, and a second position wherein the tray and lens are extended with respect to the tray support and the first end of the light pipe is spaced apart from the illuminating body of the first retrofit accessory part; and
   wherein the tray and lens remain coupled to the tray support in both the first and second positions.

2. The lighting accessory of claim 1 wherein the light pipe is a rigid light pipe.

3. The lighting accessory of claim 1 wherein the body includes a fastener for securing the body to the at least one of the tray and the lens of the conventional product display to prevent the light pipe from unintentional removal from the conventional product display.

4. The lighting accessory of claim 1 wherein the illuminating body is at least one LED.

5. The lighting accessory of claim 1 wherein in the second position interaction is diminished or ceased between the first retrofit accessory part and the second retrofit accessory part.

6. The lighting accessory of claim 1 wherein the light pipe defines a first light path for illuminating the first target area and a second light path for illuminating a second target area different from the first target area.

7. The lighting accessory of claim 1 wherein the illuminating body comprises at least one LED and is capable of being switched between a white light and a colored light and the lighting accessory further includes a switch for switching between white and colored light.

8. The lighting accessory of claim 2 wherein the light pipe comprises a transparent solid for illuminating the first target area.

9. The lighting accessory of claim 3 wherein the fastener comprises a pair of hooks or clasps located on opposite sides of the body to engage mating receptacles located on the at least one of the tray and the lens of the conventional product display.

10. The lighting accessory of claim 3 wherein the fastener comprises a first mating structure located on a first portion of the body and a second mating structure located on a second portion of the body for engaging respective parts of the at least one of the tray and the lens of the conventional product display to secure the light pipe and body thereto.

11. The lighting accessory of claim 3 wherein the light pipe is a rigid light pipe made of a transparent solid and having a substantially L-shape, the body having a first portion for positioning on a first side of the L-shaped light pipe and a second portion for positioning on a second side of the L-shaped light pipe with the body first portion and the body second portion being interconnectable to sandwich the L-shaped light pipe therebetween.

12. The lighting accessory of claim 3 wherein the first target area is at least a portion of the lens and/or a product channel of the tray.

13. The lighting accessory of claim 11 wherein the body first portion and the body second portion are interconnected via mating friction fit or snap-fit structures and/or adhesive.

14. The lighting accessory of claim 11 wherein the fastener of the body connects the L-shaped light pipe to the lens so that the second end of the L-shaped light pipe is aligned with and illuminates the lens of the conventional product display.

15. The lighting accessory of claim 14 wherein the conventional product display further includes adjustable width side members for adjusting a product channel width to allow the tray to accommodate products of varying sizes.

16. The lighting accessory of claim 14 wherein the first position is for normal displaying of product and the second position is for restocking of product within the tray.

17. The lighting accessory of claim 14 wherein the conventional product display includes a spring biased pusher for advancing product stored in the tray as product is removed therefrom to front face product in the conventional product display.

18. The lighting accessory of claim 7 wherein the at least one LED comprises at least one white LED and at least one colored LED and the switch allows a user to select between the white and colored LEDs.

19. An illuminated product merchandiser tray comprising:
   a tray support;
   a tray movably coupled to the tray support;
   a lens coupled to a front end of the tray;

a light source coupled to the tray support, the light source comprising an illuminating body;

a light pipe for directing light from the illuminating body to a target area for illumination; and a body for securing the light pipe to at least one of the tray and the lens of the product merchandiser tray;

wherein the light pipe has a first end for receiving light from the illuminating body and a second end for emitting light and illuminating the target area;

wherein the tray and lens are movable with respect to the tray support between a first position wherein the tray and lens are retracted with respect to the tray support and the first end of the light pipe is positioned proximate the illuminating body to emit light from the second end of the light pipe, and a second position wherein the tray and lens are extended with respect to the tray support and the first end of the light pipe is spaced apart from the illuminating body; and wherein the tray and lens remain coupled to the tray support in both the first and second positions.

20. The illuminated product merchandiser tray of claim 19 wherein the body includes a fastener for securing the body to the at least one of the tray and the lens of the product merchandiser tray to prevent the light pipe from unintentional removal from the product merchandiser tray.

21. The illuminated product merchandiser tray of claim 19 wherein in the second position interaction is diminished or ceased between the light pipe and the illuminating body.

22. The illuminated product merchandiser tray of claim 20 wherein the fastener comprises a pair of hooks or clasps located on opposite sides of the body to engage mating receptacles located on the at least one of the tray and the lens of the product merchandiser tray.

23. The illuminated product merchandiser tray of claim 20 wherein the light pipe is a rigid light pipe made of a transparent solid and having a substantially L-shape, the body having a first portion for positioning on a first side of the L-shaped light pipe and a second portion for positioning on a second side of the L-shaped light pipe with the body first portion and body second portion being interconnectable to sandwich the L-shaped light pipe therebetween.

24. The illuminated product merchandiser tray of claim 23 wherein the fastener of the body connects the L-shaped light pipe to the lens so that the second end of the L-shaped light pipe is aligned with and illuminates the lens.

25. The illuminated product merchandiser tray of claim 24 wherein the light pipe defines a first light path for illuminating the lens and a second light path for illuminating a second target area different from the lens.

* * * * *